United States Patent
Svenson et al.

(10) Patent No.: US 10,943,311 B1
(45) Date of Patent: Mar. 9, 2021

(54) ORDER FULFILLMENT AND TRACKING SYSTEMS AND METHODS

(71) Applicant: Square, Inc., San Francisco, CA (US)

(72) Inventors: Tait Svenson, Walnut Creek, CA (US); Claudia J. Ng, San Bruno, CA (US); Imran Khan, San Rafael, CA (US); Jennifer Murse, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 333 days.

(21) Appl. No.: 15/721,474

(22) Filed: Sep. 29, 2017

(51) Int. Cl.
*G06Q 50/12* (2012.01)
*G06Q 20/20* (2012.01)

(52) U.S. Cl.
CPC ............. *G06Q 50/12* (2013.01); *G06Q 20/20* (2013.01)

(58) Field of Classification Search
None
See application file for complete search history.

(56) References Cited

U.S. PATENT DOCUMENTS

| | | | |
|---|---|---|---|
| 4,485,300 A | 11/1984 | Peirce | |
| 5,980,089 A | 11/1999 | Weis | |
| 6,373,950 B1 | 4/2002 | Rowney | |
| 6,473,740 B2 | 10/2002 | Cockrill et al. | |
| 6,727,925 B1 | 4/2004 | Bourdelais | |
| 6,732,934 B2 | 5/2004 | Hamilton et al. | |
| 6,920,431 B2 | 7/2005 | Showghi et al. | |
| 7,071,842 B1 | 7/2006 | Brady, Jr. | |
| 7,536,307 B2 | 5/2009 | Barnes et al. | |
| 7,571,468 B1 | 8/2009 | Williams | |
| 7,685,052 B2 | 3/2010 | Waelbroeck et al. | |
| 7,748,621 B2 | 7/2010 | Gusler et al. | |
| 7,756,745 B2 | 7/2010 | Leet et al. | |
| 7,797,204 B2 | 9/2010 | Balent | |
| 7,805,382 B2 | 9/2010 | Rosen et al. | |
| 7,958,029 B1 | 6/2011 | Bobich et al. | |
| 8,069,085 B2 | 11/2011 | Ahlers et al. | |
| 8,123,370 B2 | 2/2012 | Maekawa | |
| 8,190,483 B2 | 5/2012 | Woycik et al. | |
| 8,370,207 B2 | 2/2013 | Edwards | |
| 8,671,002 B2 | 3/2014 | Stefik et al. | |
| 8,676,708 B1 | 3/2014 | Honey | |
| 8,694,456 B2 | 4/2014 | Grigg et al. | |

(Continued)

OTHER PUBLICATIONS

Notice of Allowance dated Aug. 14, 2019, for U.S. Appl. No. 14/675,555, of Renke, C.P., et al., filed Mar. 31, 2015.

(Continued)

*Primary Examiner* — Fateh M Obaid
(74) *Attorney, Agent, or Firm* — Lee & Hayes, P.C.

(57) ABSTRACT

Techniques and arrangements for facilitating synchronization of order ticket functionality utilized by point-of-sale (POS) devices with kitchen display systems. In some example, a POS device and a line buster device collectively receive a plurality of customer orders associated with a transaction between a merchant and plurality of customers. Based on individual customer orders, the POS device determines when to fire off the orders to the kitchen display system irrespective of the sequence in which they are received. In some examples, the kitchen display system then synchronizes with a customer device to provide real-time or near-real time updates on the status of the order.

20 Claims, 30 Drawing Sheets

(56) References Cited

U.S. PATENT DOCUMENTS

| | | |
|---|---|---|
| 8,700,659 B2 | 4/2014 | Skeen et al. |
| 8,732,193 B2 | 5/2014 | Skeen et al. |
| 8,738,451 B2 | 5/2014 | Ahlers et al. |
| 8,762,207 B2 | 6/2014 | Kobres |
| 8,799,111 B2 | 8/2014 | Prellwitz et al. |
| 8,831,677 B2 | 9/2014 | Villa-Real |
| 8,856,170 B2 | 10/2014 | Skeen et al. |
| 8,862,504 B2 | 10/2014 | Sobek |
| 8,977,567 B2 | 3/2015 | Aabye et al. |
| 9,002,584 B2 | 4/2015 | Van Wiemeersch et al. |
| 9,037,491 B1 | 5/2015 | Lee |
| 9,064,359 B2 | 6/2015 | Lert, Jr. et al. |
| 9,195,982 B2 | 11/2015 | Orr et al. |
| 9,218,413 B2 | 12/2015 | Skeen et al. |
| 9,230,292 B2 | 1/2016 | Amin et al. |
| 9,311,639 B2 | 4/2016 | Filler |
| 9,349,108 B2 | 5/2016 | Skeen et al. |
| 9,355,470 B2 | 5/2016 | Merrell et al. |
| 9,390,424 B2 | 7/2016 | Hendrickson |
| 9,409,978 B2 | 8/2016 | Doxsey et al. |
| 9,430,784 B1 | 8/2016 | Frederick et al. |
| 9,444,932 B2 | 9/2016 | Ravenel et al. |
| 9,515,999 B2 | 12/2016 | Ylonen |
| 9,536,243 B2 | 1/2017 | Khan |
| 9,563,890 B2 | 2/2017 | Zhou |
| 9,569,757 B1 | 2/2017 | Wilson et al. |
| 9,576,285 B2 | 2/2017 | Zhou |
| 9,576,289 B2 | 2/2017 | Henderson et al. |
| 9,582,797 B1 | 2/2017 | Holmes et al. |
| 9,633,344 B2 | 4/2017 | Nathanel et al. |
| 9,666,023 B2 | 5/2017 | Irwin, Jr. |
| 9,734,463 B2 | 8/2017 | Skeen et al. |
| 9,785,930 B1 | 10/2017 | Terra et al. |
| 9,799,028 B2 | 10/2017 | Dickelman |
| 9,799,380 B2 | 10/2017 | Liabraaten |
| 9,817,646 B1 | 11/2017 | Chen et al. |
| 9,824,233 B2 | 11/2017 | Kaplan et al. |
| 9,824,408 B2 | 11/2017 | Isaacson et al. |
| RE46,731 E | 2/2018 | Woycik et al. |
| 9,922,324 B2 | 3/2018 | Wilson et al. |
| 9,934,784 B2 | 4/2018 | May et al. |
| 9,940,374 B2 | 4/2018 | Orumchian et al. |
| 9,959,529 B1 | 5/2018 | Varma et al. |
| 9,965,755 B2 | 5/2018 | Richelson et al. |
| 9,972,003 B2 | 5/2018 | Mooring, II et al. |
| 10,007,953 B1 | 6/2018 | Nathoo et al. |
| 10,019,011 B1 | 7/2018 | Green et al. |
| 10,019,149 B2 | 7/2018 | Chirakan et al. |
| 10,019,698 B1 | 7/2018 | Scott et al. |
| 10,026,062 B1 | 7/2018 | Sasmaz et al. |
| 10,031,420 B2 | 7/2018 | Ongayi et al. |
| 10,032,171 B2 | 7/2018 | Yeager |
| 10,043,162 B1 | 8/2018 | Renke et al. |
| 10,043,209 B2 | 8/2018 | Cooke et al. |
| 10,055,722 B1 | 8/2018 | Chen et al. |
| 10,068,225 B2 | 9/2018 | Barrett |
| 10,068,272 B1 | 9/2018 | Varma et al. |
| 10,074,148 B2 | 9/2018 | Cashman et al. |
| 10,078,820 B2 | 9/2018 | Renke et al. |
| 10,091,617 B2 | 10/2018 | Chicoine et al. |
| 10,210,569 B1 | 2/2019 | Kim et al. |
| 10,289,991 B1 | 5/2019 | Muller et al. |
| 10,289,992 B1 | 5/2019 | Bell et al. |
| 10,311,420 B1 | 6/2019 | Bell et al. |
| 10,313,383 B2 | 6/2019 | Sommer |
| 10,319,042 B2 | 6/2019 | Arvapally et al. |
| 10,346,605 B2 | 7/2019 | Narasimhan |
| 10,360,648 B1 | 7/2019 | Rocklin et al. |
| 10,467,559 B1 * | 11/2019 | Svenson ............ G06Q 10/0631 |
| 10,528,945 B1 * | 1/2020 | Renke ............... G06Q 20/4033 |
| 10,580,062 B1 | 3/2020 | Abrons et al. |
| 2003/0174823 A1 | 9/2003 | Justice et al. |
| 2004/0243468 A1 | 12/2004 | Cohagan et al. |
| 2005/0004843 A1 * | 1/2005 | Heflin .................... G06Q 10/08 705/15 |
| 2006/0143087 A1 | 6/2006 | Tripp et al. |
| 2006/0178986 A1 | 8/2006 | Giordano et al. |
| 2006/0235755 A1 | 10/2006 | Mueller et al. |
| 2008/0015987 A1 | 1/2008 | Ramavarjula et al. |
| 2008/0313047 A1 | 12/2008 | Casares et al. |
| 2008/0319914 A1 | 12/2008 | Carrott |
| 2009/0063312 A1 | 3/2009 | Hurst |
| 2009/0065572 A1 | 3/2009 | Jain |
| 2009/0083069 A1 | 3/2009 | Tierney et al. |
| 2009/0090783 A1 | 4/2009 | Killian et al. |
| 2009/0157518 A1 | 6/2009 | Bishop et al. |
| 2009/0192913 A1 | 7/2009 | Saito et al. |
| 2009/0228336 A1 | 9/2009 | Giordano et al. |
| 2009/0240624 A1 | 9/2009 | James et al. |
| 2010/0010906 A1 | 1/2010 | Grecia |
| 2010/0088207 A1 | 4/2010 | McLaughlin et al. |
| 2010/0174620 A1 | 7/2010 | Stringfellow et al. |
| 2010/0217674 A1 | 8/2010 | Kean |
| 2011/0022472 A1 | 1/2011 | Zon |
| 2011/0029359 A1 | 2/2011 | Roeding et al. |
| 2011/0087592 A1 | 4/2011 | van der Veen et al. |
| 2011/0215159 A1 | 9/2011 | Jain |
| 2011/0238510 A1 | 9/2011 | Rowen et al. |
| 2011/0251892 A1 | 10/2011 | Laracey |
| 2011/0251909 A1 | 10/2011 | Clark |
| 2011/0288967 A1 | 11/2011 | Selfridge |
| 2011/0320345 A1 | 12/2011 | Taveau et al. |
| 2012/0130787 A1 | 5/2012 | Stouffer et al. |
| 2012/0130899 A1 | 5/2012 | McMonagle et al. |
| 2012/0209749 A1 | 8/2012 | Hammad et al. |
| 2012/0330837 A1 | 12/2012 | Persaud et al. |
| 2013/0226805 A1 | 8/2013 | Griffin et al. |
| 2013/0238455 A1 | 9/2013 | Laracey |
| 2014/0108237 A1 | 4/2014 | Carretta et al. |
| 2014/0156431 A1 | 6/2014 | Morgan et al. |
| 2014/0214534 A1 | 7/2014 | L'Heureux et al. |
| 2014/0244409 A1 | 8/2014 | Nathanel et al. |
| 2014/0257926 A1 | 9/2014 | Rasband |
| 2014/0258011 A1 | 9/2014 | Shore |
| 2014/0263622 A1 | 9/2014 | Babatz et al. |
| 2014/0279534 A1 | 9/2014 | Miles |
| 2014/0351130 A1 | 11/2014 | Cheek et al. |
| 2014/0372300 A1 | 12/2014 | Blythe |
| 2015/0032567 A1 | 1/2015 | Bhatia |
| 2015/0033286 A1 | 1/2015 | Shahidzadeh et al. |
| 2015/0046297 A1 | 2/2015 | Bahrami et al. |
| 2015/0095225 A1 | 4/2015 | Appana et al. |
| 2015/0120345 A1 | 4/2015 | Rose |
| 2015/0213565 A1 | 7/2015 | Garrett et al. |
| 2015/0242854 A1 | 8/2015 | Hayhow |
| 2015/0278789 A1 | 10/2015 | Richelson et al. |
| 2015/0287006 A1 | 10/2015 | Hunter et al. |
| 2016/0171584 A1 | 6/2016 | Cao |
| 2016/0247113 A1 | 8/2016 | Rademaker |
| 2016/0307176 A1 | 10/2016 | Renke et al. |
| 2016/0335613 A1 | 11/2016 | Laracey |
| 2016/0353235 A1 | 12/2016 | Williams et al. |
| 2017/0004475 A1 | 1/2017 | White et al. |
| 2017/0018041 A1 * | 1/2017 | Fox ..................... G06Q 10/02 |
| 2017/0083901 A1 | 3/2017 | Spencer, II |
| 2017/0124671 A1 | 5/2017 | Tam et al. |
| 2017/0161851 A1 * | 6/2017 | Li ....................... G06Q 50/12 |
| 2018/0039965 A1 | 2/2018 | Han et al. |
| 2018/0089658 A1 * | 3/2018 | Bell ................... G06Q 20/204 |
| 2018/0181937 A1 | 6/2018 | Wilson et al. |
| 2018/0249861 A1 * | 9/2018 | Hiatt ..................... A47J 44/00 |
| 2018/0271322 A1 * | 9/2018 | Thai ................... A47J 31/002 |
| 2018/0330346 A1 | 11/2018 | Grassadonia et al. |
| 2018/0341933 A1 | 11/2018 | Renke et al. |
| 2018/0365663 A1 * | 12/2018 | Bell ................... G06Q 20/102 |
| 2019/0228463 A1 * | 7/2019 | Chan .................. G06F 3/0488 |

OTHER PUBLICATIONS

Mercury, "Bar Tabs and Credit Cards: The Mixology for POS Developers," Credit Card Acceptance Procedures When Supporting Bar Tabs, pp. 1-9 (May 29, 2014).

(56) References Cited

OTHER PUBLICATIONS

Non-Final Office Action dated Jun. 25, 2015, for U.S. Appl. No. 14/675,555, of Renke, C.P., et al., filed Mar. 31, 2015.
Final Office Action dated Dec. 31, 2015, for U.S. Appl. No. 14/675,555, of Renke, C.P., et al., filed Mar. 31, 2015.
Non Final Office Action dated Dec. 16, 2016, for U.S. Appl. No. 14/675,555, of Renke, C.P., et al., filed Mar. 31, 2015.
Non Final Office Action dated Jan. 18, 2017, for U.S. Appl. No. 14/675,565, of Renke, C.P., et al., filed Mar. 31, 2015.
Final Office Action dated Jul. 26, 2017, for U.S. Appl. No. 14/675,555, of Renke, C.P., et al., filed Mar. 31, 2015.
Advisory Action dated Nov. 8, 2017, for U.S. Appl. No. 14/675,555, of Renke, C.P., et al., filed Mar. 31, 2015.
Final Office Action dated Dec. 14, 2017, for U.S. Appl. No. 14/675,565, of Renke, C.P., et al., filed Mar. 31, 2015.
Non Final Office Action dated Feb. 27, 2018, for U.S. Appl. No. 14/675,555, of Renke, C.P., et al., filed Mar. 31, 2015.
Notice of Allowance dated Mar. 29, 2018, for U.S. Appl. No. 14/675,565, of Renke, C.P., et al., filed Mar. 31, 2015.
Non Final Office Action dated Jun. 19, 2018, for U.S. Appl. No. 15/905,643, of Wilson, M., et al., filed Feb. 26, 2018.
Non-Final Office Action dated Dec. 19, 2016, for U.S. Appl. No. 15/279,650, of Bell, B., et al., filed Sep. 29, 2016.
Final Office Action dated Jun. 19, 2017, for U.S. Appl. No. 15/279,650, of Bell, B., et al., filed Sep. 29, 2016.
Advisory Action dated Sep. 11, 2017, for U.S. Appl. No. 15/279,650, of Bell, B., et al., filed Sep. 29, 2016.
International Search Report and Written Opinion for International Application No. PCT/US2017/042537, dated Oct. 6, 2017.
Advisory Action dated May 29, 2019, for U.S. Appl. No. 15/195,557, of Abrons, A., et al., filed Jun. 28, 2016.
Notice of Allowance dated Jun. 24, 2019, for U.S. Appl. No. 15/721,522, of Svenson, T., et al., filed Sep. 29, 2017.
Non Final Office Action dated Jun. 28, 2019, for U.S. Appl. No. 15/195,557, of Abrons, A., et al., filed Jun. 28, 2016.
Advisory Action dated Nov. 30, 2018, for U.S. Appl. No. 14/675,555, of Renke, C.P., et al., filed Mar. 31, 2015.
Notice of Allowance dated Dec. 11, 2018, for U.S. Appl. No. 15/905,643, of Wilson, M., et al., filed Feb. 26, 2018.
Notice of Allowance dated Dec. 28, 2018, for U.S. Appl. No. 15/185,383, of Bell, B., et al., filed Jun. 17, 2016.
Notice of Allowance dated Jan. 15, 2019, for U.S. Appl. No. 15/185,354, of Bell, B., et al., filed Jun. 17, 2016.
Advisory Action dated Jan. 24, 2019, for U.S. Appl. No. 14/675,555, of Renke, C.P., et al., filed Mar. 31, 2015.
Advisory Action dated Feb. 21, 2019, for U.S. Appl. No. 14/675,555, of Renke, C.P., et al., filed Mar. 31, 2015.
Notice of Allowance dated Mar. 6, 2019, for U.S. Appl. No. 15/189,131, of Rocklin, W., et al., filed Jun. 22, 2016.
Final Office Action dated Mar. 28, 2019, for U.S. Appl. No. 15/195,557, of Abrons, A., et al., filed Jun. 28, 2016.
Non Final Office Action dated Aug. 14, 2018, for U.S. Appl. No. 15/185,354, of Bell, B., et al., filed Jun. 17, 2016.
Non Final Office Action dated Aug. 15, 2018, for U.S. Appl. No. 15/185,383, of Bell, B., et al., filed Jun. 17, 2016.
Final Office Action dated Sep. 4, 2018, for U.S. Appl. No. 14/675,555, of Renke, C.P., et al., filed Mar. 31, 2015.
Non Final Office Action dated Oct. 2, 2018, for U.S. Appl. No. 15/195,557, of Abrons, A., et al., filed Jun. 28, 2016.
Non Final Office Action dated Oct. 10, 2018, for U.S. Appl. No. 15/189,131, of Rocklin, W., et al., filed Jun. 22, 2016.
Notice of Allowance dated Oct. 23, 2019, for U.S. Appl. No. 15/195,557, of Abrons, A., et al., filed Jun. 28, 2016.
Non Final Office Action dated Apr. 23, 2020, for U.S. Appl. No. 16/219,060, of Kyle, Callender, filed Dec. 13, 2018.

\* cited by examiner

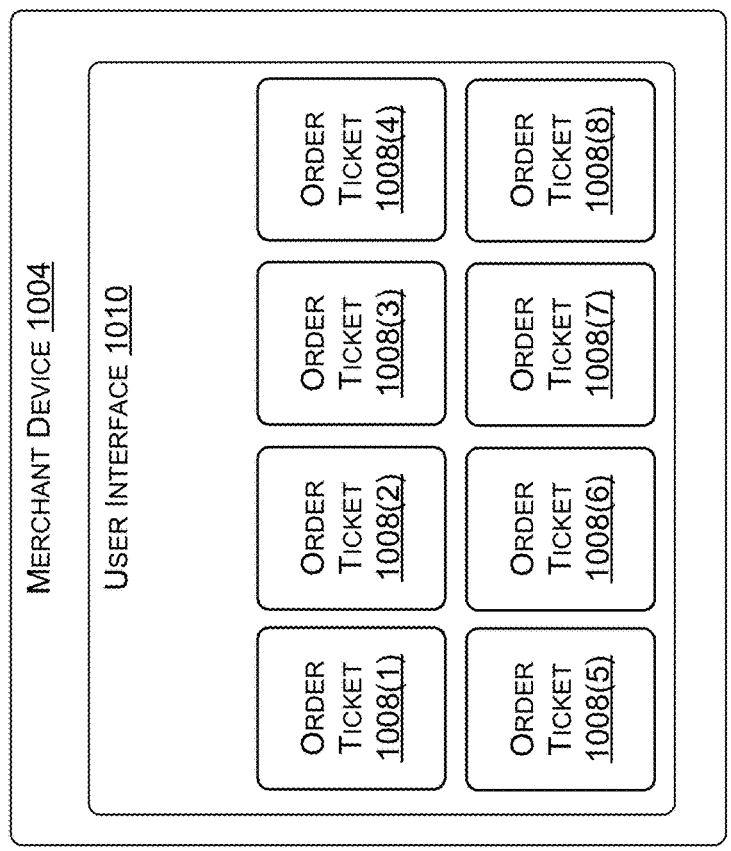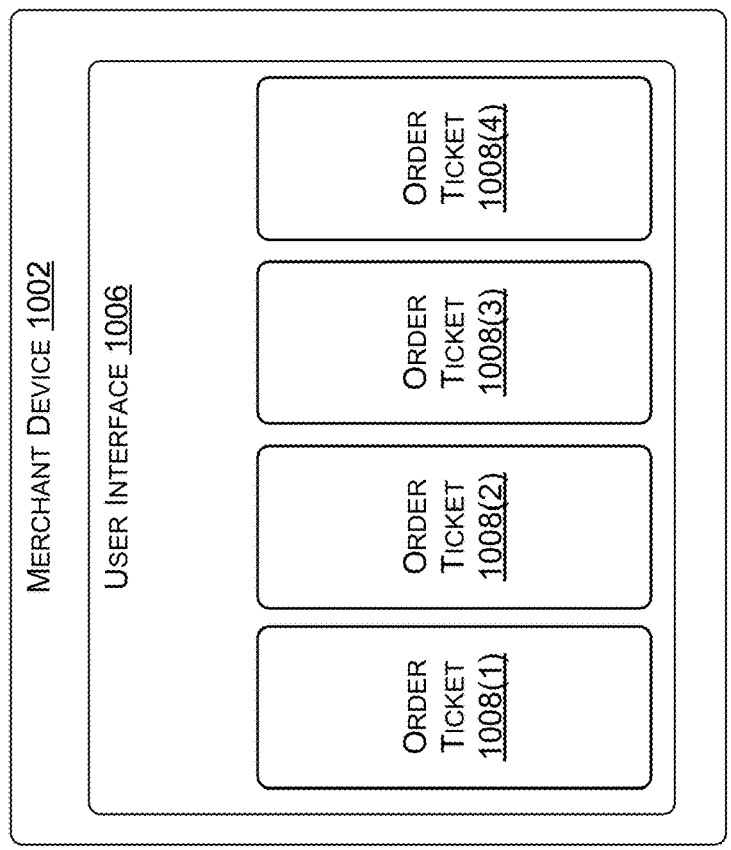
FIG. 10

ORDER FULFILLMENT AND TRACKING SYSTEMS AND METHODS

BACKGROUND

Ease of the purchase and order fulfillment experience, for any product or service, is one of the contributors to customer decisions to purchase from one particular business over another. The rise of online shopping is a good example where ease of use is leading to an increase of use, as customers decide to forego traffic, waiting in queues, parking hassles, and other problems with brick-and-mortar retailers by ordering from the comfort of their homes. Competing with online merchants has proven a significant challenge for brick-and-mortar retailers, even those with a web presence. It takes less time and money to order from home than to travel to a store, look for parking, pay for parking, walk to the store, peruse as they would on-line, wait in payment line, then do it all again in reverse order to return home. The wait times in particular pose a great challenge to brick-and-mortar retailers, especially in urban areas where a customer is likely to leave the queue and go to a competing store with shorter queues.

However, visiting locations associated with traditional brick-and-mortar retailers, such as storefronts, warehouses, service centers, and/or the like, may remain preferable for customers with time-relevant needs, as picking up an item from a nearby retail location may still be faster than waiting for a delivery to arrive. Likewise, for perishable goods such as food take-out, or for personal goods such as dry-cleaning, visiting a brick-and-mortar retailer may remain the most practical option. For prepared food or simple errands, take-out/pickup may be an increasingly popular option, especially when it can be done as part of an efficient travel stream in a string of errands. Brick-and-mortar retailers should be playing up this inherent advantage, and should try to minimize the greatest difficulties of visiting retail locations: waiting in a queue to place an order and then waiting additional time for the ordered products to be ready.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

FIG. 10 is an example illustration of merchant devices providing various layouts for order tickets, according to an embodiment of the present subject matter.

DETAILED DESCRIPTION

Figure 1:
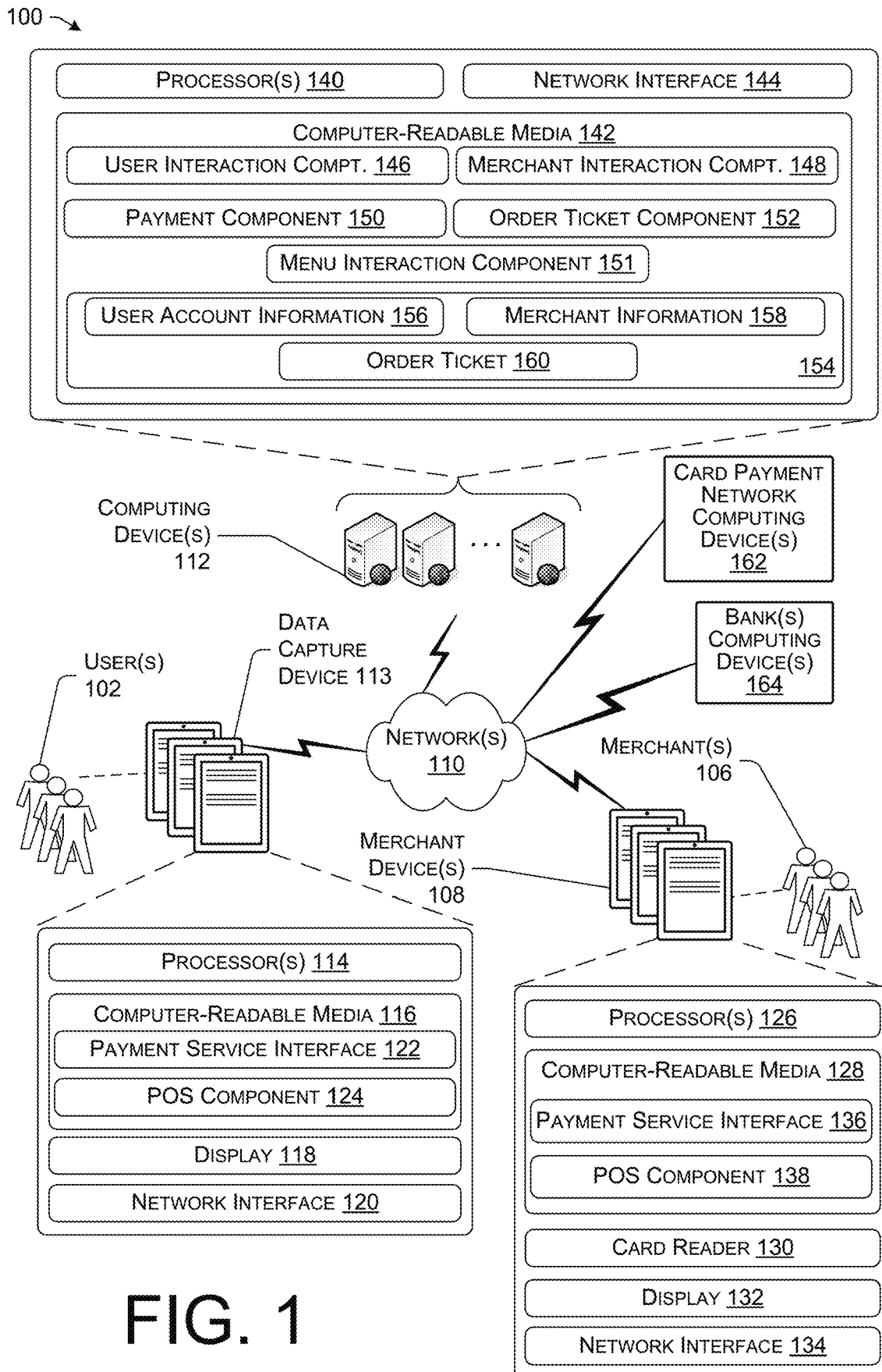
FIG. 1 illustrates an example system for handling order ticket transactions among customers and merchants, according to an embodiment of the present subject matter.

This disclosure describes systems and processes for facilitating expedited ordering or "line-busting" via hand-held devices to help stores checkout, recommend products relevant to customers by checking inventory in real-time, generate a dynamic menu based on real-time inventory or availability of the kitchen staff, provide product descriptions, and trigger mobile payment option either before or after the customer receives the product or service.

Traditionally, the check-out counter or register station is in a central location and customers typically must line up at the checkout register bringing with them all the products to be purchased. As the register stations are the only means for the POS transaction, customers are required to wait, often in a line, to checkout via either self-checkout at a register station or at a traditional check-out register operated by an employee of the retail establishment. However, these barcode scanning devices and software implemented therein, fail to provide a combination of mobile technology with POS technology, and further fail to provide the ability to manage inventory throughout the retailer's franchise.

Another type of barcode reading device is a mobile handheld scanner, which is used by store and warehouse associates to manage inventory tasks such as physical inventory, cycle counting, inventory receiving, store to store transfers, return to vendor and product ticketing. However, these devices are only used for inventory management and have no ability to process sales. And even if it is designed to receive orders, it cannot manage communication with the processor managing orders in the kitchen so as to better recommend products to a customer or even prioritize incoming orders, not just based on the way they are ingested but on other contextual factors such as complexity of the order, customer loyalty, etc. Furthermore, the systems and method described herein determine, for example using machine learning models, whether to receive payment or a portion of payment in advance or after the items are delivered to the customer, thus in a pre-pay or post-pay fashion. This further reduces the wait-time and improves efficiencies in the order fulfillment process.

Additionally, the system and methods described herein facilitate synchronization and sequencing of order tickets utilized by point-of-sale (POS) devices with kitchen display systems. For instance, in some examples, a merchant can utilize a POS device to conduct a transaction with a customer or several customers in line. During a first transaction, at a first period of time, the POS device can receive first input corresponding to a first customer order for first items ordered by the first customer. Based on receiving the first input, the POS device can create a first order ticket for the transaction between the merchant and the customer. For instance, in some examples, the POS device creates the first order ticket using POS functionality included on the POS device. The POS device can then add the first customer order to the open ticket. For instance, the POS device can add first information associated with the first items to cart data included in the open ticket.

Contemporaneously or after the first order, a second customer may place a second order with a data capture device. The server can analyze the two orders to determine when the orders should be fired off, if not in the order they were received, and then also determine whether or not the orders qualify for payment after the order is delivered to the customer. The KDS receives the order based on server applied logic and update the status of the ticket when the order ticket is complete. In some examples, the POS can determine that the first customer order is complete based on determining that a threshold amount of time has passed since receiving the first input. Additionally or alternatively, in some examples, the POS can determine that the first customer order is complete based on receiving input indicating that the first order is complete. Based on determining that the first customer order is complete, the POS device can then synchronize with the kitchen display system. For instance, the POS device can send first data associated with the order ticket to the kitchen display system. In some examples, the first data can include the first information associated with the first customer order and/or an associated versioning data structure for the open ticket.

In some examples, the kitchen display system further includes advanced functionality for providing order ticket data via a kitchen display user interface. For instance, in some examples, the kitchen display system displays order tickets that are in an "in-progress" state. An order ticket is in an "in-progress" state when the order ticket includes at least one item that is still "in-progress" of being prepared by the merchant. As such, in some examples, while displaying the order tickets, the kitchen display system can receive input that one or more of the order tickets is complete. Based on receiving the input, the kitchen display system can remove the one or more order tickets from the kitchen display user interface. Additionally or alternatively, in some examples, while displaying the order tickets, the kitchen display system can receive input that one or more items within an order ticket is complete. Based on receiving the input, the kitchen display system can add an indication to the one or more items that indicates that the one or more items are complete, or remove the one or more items from the order ticket.

In some examples, the kitchen display system can further provide an in flight interface, via the kitchen display user interface, that includes a list of items from the order tickets that are currently in an "in-progress" state. For instance, the kitchen display system can generate the list of items by: (1) identifying items from the order tickets that are currently in an "in-progress" state, (2) determining, for each of the identified items, an item category, and (3) combining the identified items according to the item categories. In some examples, before providing the list of items, the kitchen display system first ranks items within the list of items. For instance, the kitchen display system ranks items within the list of items based on the item categories, a number of items included in each of the item categories, preparation times associated with the items, or the like. The kitchen display system then provides the list of items using the in flight interface of the kitchen display user interface.

In some implementations, the method and system creates tickets at a plurality of POS systems and sends out orders (or items from the orders) to the KDS to be prepared in a non-sequential but probabilistic manner. In some cases, the orders may be sent to the KDS prior to payment, for example based on customer's transaction history and behavior that may indicate whether the customer is likely to leave without paying or without paying and picking up the order. In one example, the system takes input from the queue in which customers may be standing to determine when to fire off orders to the KDS. In one implementation, the system determines a time before payment firing order based on line model rather than, or in addition to, preparation model. That is, the system determines how far customer is from the front of the line, and based on analytics how long it takes for the customer to move to front, accordingly, the system knows when to fire off order. The system may also change the user interface, such as items, based on the position of the customer such that certain easy to make items may be promoted to speed up the line if it is moving slow, for example. The system and method can also, based on the queue length and time it is taking to process orders at the KDS, can also determine whether to make the customer pay for the orders before or after the orders are sent to the KDS.

In another implementation, the payment service can apply feedback system to determine additional analytics on processed, processed but not picked up, and unprocessed orders and so on. The feedback system, based on the analytics, can provide a more estimated wait-time, processing time, position in queue with respect to other customers, as the customers leave the line or re-enter the line, the capacity to process orders at any point in time, remove items from the user interface based on processing or wait time, for example, of order no. 40 corresponding to item no. 10 is taking long, remove the order or any other process. The system can also determine which orders are not going to meet the predicted times, or even get processed at all. In some cases, the KDS may replace the order with some other item or remove the order, for example, in case the availability of staff or inventory changes dramatically, in all such cases, the system may implement to diffuse the situation, for example by automatically sending coupon codes, notifications, or other kind of customer service to the customer, for example on mobile phone. The customers may also look-up a tracking number on their receipts to look-up status of the order, or changes made therein, at any point in time. The tracking number may be in the form of a barcode, a QR code, or a URL. In some analog restaurants that use notepads for order-taking, the system may print pre-barcoded notepads, which may be tracked through the kitchen. In other implementations, the barcode may show up on the digital receipt and the digital order ticket. The barcode, when scanned, can provide more information as to the order and its status. In one case, the user may also photo when the food is being prepared, for example through camera placed at each kitchen station, and use computer vision to identify which order is being prepared and highlight the items on the receipt to indicate preparation in real-time.

In the implementations described herein, the methods and systems facilitate acquisition of customer information more efficiently without requiring significant modifications to the retailer's POS system. POS systems are typically implemented in complex computing environments that include large databases, multiple data capture and/or communication devices, and the like. Changes to the software and/or hardware of the POS system can introduce bugs, memory leaks, or other errors, resulting in downtime and lost revenue for the retailer. Accordingly, although existing mechanisms for acquiring customer information have many drawbacks, retailers may be hesitant to make significant modifications to their POS systems to address these issues. To this end, the POS system along with a novel line-busting technology may help alleviate some of these issues.

Also, typically, to help with long queues at a brick-and-mortar café/restaurant, a store employee equipped with a line buster device may go to each customer in the line, take orders, check the inventory count to see if the order can be fulfilled, and the like. If the order can be fulfilled, the employee will take the payment instantly via a mobile terminal or go to the counter and have their orders processed at the stationary POS terminal. If the order cannot be fulfilled, the employee can recommend other items that they know are available. Once the order is placed, the customer waits until the order is prepared. Typically, the customer is provided an order number and can receive a phone alert (e.g., SMS) or email when the order is available for pick up. Such an implementation, however, cannot predict in real-time when to push a specific order to the Kitchen Display System (KDS) or which items to recommend to the customers based on the front of the house or back of the house status at that time. To that end, the embodiments described herein dynamically modify the user interface of merchant devices, both the fixed terminal and the POS device, to reflect the items that can be prepared within a reasonable time or by the time the customer approaches the stationary/primary POS terminal (as some previously placed orders may have changed). Examples described herein may also determine in real-time when to process the order (pre-pay or post-pay) for best processing time. Also, once the order is placed, the POS system generates a ticket for the back of the house (BOH) entry. As the ticket moves from one station to other, the ticket (having for example, a bar code, a QR code, etc.), when tapped to the KDS can generate a real-time status of the order.

The embodiments described herein are rooted in a particular computer system and overcome problems specifically arising in the context of internet, for example, the problem of prioritizing orders and maintaining efficiency in both firing off the orders and preparation of the orders, while maintaining the position of the customers in the line. Furthermore, due to the intelligent sequencing described herein, the overall network speed, memory allocation and performance are improved since wait and processing times are greatly reduced (e.g., less stale orders). In addition, the embodiments described herein apply specific rules, for example in real-time, to determine when and which orders to push to the kitchen display system so as to improve accuracy and effect of order firing. The embodiments also focus on filtering content in an intermediate location, such as at a payment processor, to determine their status of preparation and whether or not they should be fired to the KDS. Alternatively, the payment service may promote preparation of orders involving items that are "low-hanging fruits" that is easy to prepare to be pushed to the KDS first. The entire order need not be pushed to the KDS, only specific items may be pushed before other items on the order are fired off.

For the last few years, consumers shopping in-store may have been met with checkout procedures that replace a register with a smartphone, aiming to speed up their transaction and utilize a source of modern technology. Some of these efforts are falling short due to a break in execution, perhaps involving an incomplete platform system in place, or lack of associate experience. To this end, the method and system described herein can increase sales by speeding the transaction process and/or eliminating long waits in a checkout line. Through the method, the server can increase return visits by lessening the amount of time it takes for a consumer to make a purchase or by eliminating the need to visit a cash register. The server can also reduce costs by increasing the volume of transactions delivered in the same amount of time for the same transaction cost.

The implementations can also be used to perform operational and point-of-sale tasks such as; in-store pricing/price management (e.g., product labeling, shelf labeling, and price checks); markdown and clearance ticketing (e.g., weekly circulars, shelf talkers, clearance items, standard markdowns, perishables and coupons); mobile point-of-sale transactions (e.g., line busting, sidewalk sales, clearance sales, and one-day sales); holiday and seasonal sales; inventory, receiving, and cycle counting; signage; planograms, DSD (direct store Delivery) verifications, point-of-sale ("POS"); price verification; returns processing; store-to-store transfers; and computer-aided ordering, including shelf ordering and perishable items control. Traditionally, such tasks are resource intensive and entail significant expenditures of time and money at each retail outlet. Also, retailers have been restricted operationally because the computers and printers used to perform these tasks can consume significant amounts of power or time for charging, and most are not portable. Typically, such computers and printers are located in the back office of a retail establishment, instead of on the retail floor, thus becoming very operational expensive. Retailers also have attempted to have employees wear the devices but this has proven to be very cumbersome and not very efficient. To this end, current implementations disclosed herein facilitate the performance of such tasks at the point of activity using a line busting device, also referred to as data capture device. Such data capture devices, when used in a retail environment, can dramatically increase efficiencies for such retailers by creating in effect a wireless modular computing device or computer, and thereby provide wireless computing for in-store operations and customer sales transactions at the point of the activity, while another customer is being served at the POS terminal. Beneficial effects of such a mobile computer system in a retail environment include, but are not limited to improving the efficiency and accuracy of these operations and thereby reducing expenditures of limited resources, including time and money. In this way, the line busting device, removes the restrictions of conventional stationary point-of-sale systems while retaining the ability to carry out the functions associated with such conventional stationary systems contemporaneously. Furthermore, efficiencies in the order fulfillment are further improved using machine learning models for example.

In more particular embodiments, the line busting device may further include other system functionalities such as printers, laser and CCD barcode scanners, credit card readers, cash drawers, and wireless print servers. In addition, the moving device is further configured and arranged so such additional functionalities are removably attached or mounted to the moving device so that the moving device can be selectively moved between different locations with such other functionalities attached thereto.

Even though the descriptions herein describe an environment where sellers and buyers are interacting at a brick and mortar location, it will be understood that the embodiments can be extended to other scenarios where wait times need to be reduced or eliminated, or where FOH and BOH restaurant efficiency is desired. As used herein, the term, "front of the house," refers to all actions and areas that a customer will be exposed to during their stay at a restaurant, such as the entry area, waiting area, restroom, etc. The term, "back of the house," encompasses all the behind-the-scenes areas that customers will not see. This acts as the central command center in a restaurant because it is where the food is prepared, cooked, and plated before making its way to the customer's table. The back of house also serves as a place for employees and managers to do administrative work. Furthermore, the embodiments can be implemented in scenarios where wait-times are pronounced such as the check-in lines at the airport, the ticket lines at the music concert, the lines at government offices and the like.

Some implementations herein describe the merchant as a quick service restaurant. The quick-service (or fast food) restaurant industry's primary value proposition is speed-of-service—i.e., how quickly the restaurant can deliver a complete meal after a customer has placed an order. Quick-service restaurant operations are built upon the concept of preparing a limited menu of food products before customers place their orders. By preparing food ahead of time, or aggregating orders, restaurant employees can efficiently and quickly manage orders of customers waiting in line. This faster speed-of-service enables quick-service restaurants to serve many more customers during busy mealtimes than a traditional sit-down restaurant.

FIG. 1 illustrates an example system 100 for handling order ticket transactions among customers and merchants. More particularly, FIG. 1 provides a framework for providing synchronization of order ticket functionality utilized by POS devices and the data capture devices with kitchen display systems. In some examples, each of the merchant devices of FIG. 1 can include different hardware and/or software based on a type of merchant device (e.g., a POS device 108, kitchen display system, data capture device 113, and/or counter device). In one example, the data capture device 113 may comprise a data reader, such as an optical reader that may scan barcode information on the customer items and provide the barcode information to the POS device and/or counter device. In another example, the data capture device 113 may be a line busting device having an instance of the payment application and/or merchant application that lists items being sold by the merchant such that the merchant via the data capture device 113 can accept orders while the first customer in a line of several customers is being served. The data capture device 113 may also include a radio frequency identification (RFID) reader, a magnetic stripe reader, or any other suitable device for capturing information pertaining to a customer transaction. As such, the device 113 may be configured to obtain data using various different techniques in various different manners. Accordingly, references to scanning, reading, and/or gathering information should be understood to include any data acquisition techniques and/or mechanisms known in the art.

In some embodiments, the wireless data capture device 113 is a Near Field Communication (NFC) device, having a limited communication range. The limited communication range of the NFC device 113 may be desirable to limit communication to the customer 102 who is currently engaged in the POS transaction and/or to prevent unauthorized or unwanted data capture. In alternative embodiments, the wireless data capture device 113 may comprise a BLUETOOTH® compatible device (BLUETOOTH is a registered trademark of BLUETOOTH SIG, Inc.), a low-power BLUETOOTH® device, a device capable of implementing one or more of the IEEE 802.11 standards, or the like.

The wireless data capture device 113 may be configured to wirelessly obtain information pertaining to a POS transaction from a wireless-enabled customer device 104 or user 102, or information pertaining to their order. A merchant who takes orders from customers waiting in line may also operate the wireless data capture device 113. The information may include, but is not limited to: customer order information (e.g., items from the menu), customer loyalty information (e.g., loyalty card, customer identifier, etc.), membership information (e.g., membership card, member identifier, etc.), coupons, payment information (e.g., credit card, debit card, food stamp card, etc.), and so on. The customer information may be obtained from various different customers 102 or wireless-enabled customer devices 104 which may include, but are not limited to: wireless-enabled storage devices or cards; communication devices, such as cellular phones, smart phones, or the like; personal digital assistants (PDAs); personal media players, such as an iPod Touch® player (iPod Touch is a registered trademark of Apple, Corp.), a Zune® player (Zune is a registered trademark of Microsoft, Corp.), computing devices (e.g., laptop computer, notebook computer, tablet computer, etc.), or any other suitable device.

As discussed above, the communication range of the wireless data capture device 113 may be limited for security reasons and/or due to the nature of the communication standards and/or protocols implemented thereby (e.g., to prevent eavesdropping, interference, cross talk, etc.). For example, the communication range of the NFC wireless data capture device 113 may be limited to approximately four (4) inches. The communication range of other types of wireless data capture devices 113 (e.g., low-power BLUETOOTH®) may be similarly limited. During a POS transaction, the customer 102 may be prompted to tender information using the wireless data capture device 113 or manually key-in the information into the data capture device 113. An operator of the POS device 108 may offer the prompt, by signage, a display and/or other human-machine-interface of the POS device 108. The prompt may instruct the customer 102 to place or position a wireless-enabled customer device 104 into the communication range of the wireless data capture device 113.

Figure 2A:
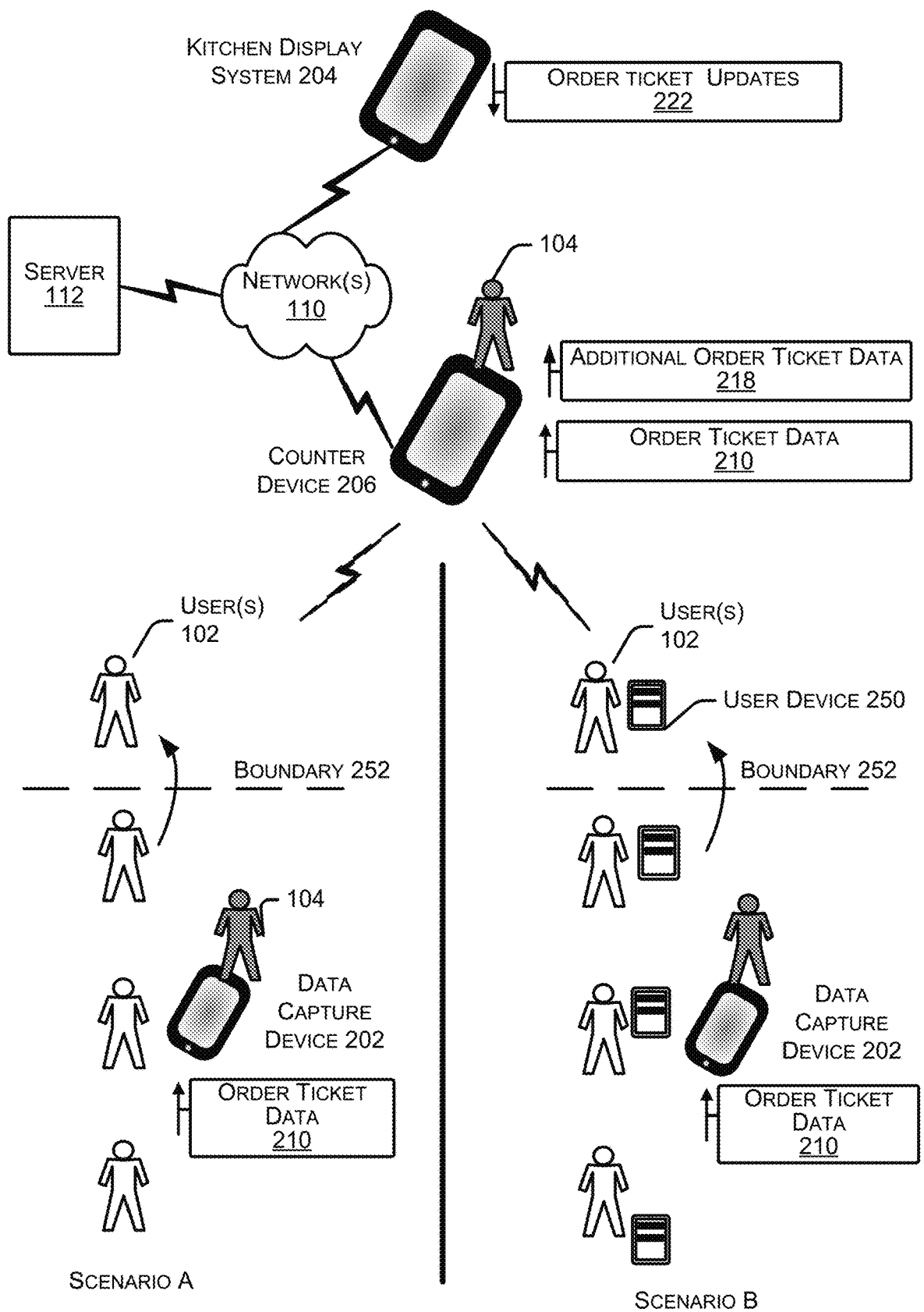
FIG. 2A is an example illustration of two scenarios in which a data capture device operates, according to an embodiment of the present subject matter.

In some embodiments, the wireless data capture device 113 is configured to automatically obtain customer information when a customer device is placed into its communication range, or when the device 102 being held by a user crosses a geographical boundary, geo-fence or location within a store (as shown in FIG. 2A). Alternatively, or in addition, the data capture device 113 may require action and/or approval on the part of the customer 102 (or operator of the apparatus 104) before wirelessly capturing customer information. As mentioned above, the action may be the customer 102 moving the wireless-enabled device 104 into communication range of the wireless data capture device 113. Other actions may include, but are not limited to: responding to a prompt from the operator; responding to a prompt displayed on the user interface of the device 113; responding to a prompt displayed on the wireless-enabled customer device 104; or the like.

The data capture device 113 may be managed by the POS device 108 or by the computing device 112 (and/or by a separate, independent controller, not shown). Data captured by the wireless data capture device 113 may include any type of customer information. The data may be formatted and/or encoded in various ways. The format of the data obtained using the data capture device 113 may be incompatible with the POS device 108 or 112. Accordingly, the data obtained by the data capture device 113 may be converted into a format that is compatible with the device that is creating order tickets or processing the order tickets. The conversion may comprise converting the obtained data from its original format and/or encoding into a POS format, such as a barcode format or the like. The converting may allow the POS computer system 108 or 112 to receive and/or process the information obtained by the wireless data capture device 113 without substantial modifications to the POS computer system 145.

Gathering customer information, including order information and optionally, payment information, wirelessly via the data capture device 113 obviates the need to perform time-consuming manual operations when the customer is ready to pay. Furthermore, the orders can be sent to the kitchen display system prior to payment, in some cases, to speed the overall experience for the customers.

As shown in FIG. 1, the system 100 may include one or more user(s) 102-1 . . . N (e.g. customers), one or more user device(s) 104 associated with the user(s) 102, one or more merchants 106, one or more merchant devices 108 associated with the one or more merchants 106, one or more network(s) 110, and one or more computing device(s) 112. In some implementations, the merchant devices 108 associated with the merchant 106 can be either portable or stationary or both. Furthermore, the merchant devices 108 may be communicatively connected to a data capture device 113, which may also be portable or stationary. In one example, the merchant device 112 may be stationary while the data capture device 113 may be mobile, for example a line-busting device used to take orders from the customers in the queue, which the first customer in line is paying or picking up their orders.

In various implementations, the user(s) 102 may operate the user device(s) 104, which may include one or more processor(s) 114, computer-readable media 116, a display 118 and a network interface 120. The computer-readable media 116 may optionally store a payment service interface 122 and a POS component 124. Similarly, the merchant(s) 106 may operate the merchant device(s) 108, which may include one or more processor(s) 126, computer-readable media 128, a card reader 130, a display 132 and a network interface 134. The computer-readable media 126 may store a payment service interface 136 and a POS component 138.

The data capture device 113 may, in one implementation, include the components similar to the ones in merchant device 108. Alternatively, the data capture device 113 may include components that are fewer or more than components than the merchant device 108. The data capture device 113 may also include instances of the payment application installed on the merchant device 108.

Similarly, the computing device(s) 112 may also include one or more processor(s) 140, computer-readable media 142 and a network interface 144. The computer readable media 142 may store a user interaction component 146, a merchant interaction component 148, a payment component 150, a menu component 151, an order ticket component 152, and a database 154. The user interaction component 146, among other things, is configured to receive user inputs and also to configure recommendations for the user based on current preferences or historical transactions. The merchant interaction component 148, among other things, is configured to generate a static or dynamic menu that changes for each customer. Such menu may be reflected on the merchant device in real-time or near real-time. The order ticket component 152 may generate, prioritize, amend or aggregate order tickets as per server logic. The payment component 150 may be triggered to process payments received at the data capture device or the merchant device 108. Based on data associated with order and/or customer, the payment component 150 may also determine whether to allow a customer to pay after the order is delivered.

In some implementations, one of the users 102 may operate a user device 104 to perform various functions associated with the user device 104. For example, a user of the user(s) 102 may utilize the user device 104, and particularly the payment service interface 122 thereof, to interact with the computing device(s) 112 via the network interface 120 to establish a user account with the payment service of the computing device(s) 112. In addition, a user of the user(s) 102 may utilize POS component 124 of the user device 104 to interface with the POS component 138 of the merchant device(s) 108, e.g. as part of a transaction using the payment service of the computing device(s) 112. For example, the user device 104 may communicate via the network interface 120 with the merchant device(s) 108 and the network interface 134. As an example of such a payment operation, the POS component 138 of the merchant device 108 may communicate with the POS component 124 of the user device 104 to obtain information for processing a payment from the user 102 to the merchant 106 using the payment service of the computing device(s) 112.

In some implementations, the user device 104 may be any type of device that is capable of interacting with the merchant device(s) 108 and/or the computing device(s) 112. For instance, the user device 104 may include a personal computer, a laptop computer, a cellular telephone, a PDA, a tablet device, or any other device. The user device 104 shown in FIG. 1 is only one example of a user device 104 and is not intended to suggest any limitation as to the scope of use or functionality of any user device 104 utilized to perform the processes and/or procedures described herein. For example, the user device 104 may include various other applications or modules, such as a component for a user dashboard to enable the user to control information in a user's profile, set user preferences, and so forth.

The processor(s) 114 of the user device 104 may execute one or more modules and/or processes to cause the user device 104 to perform a variety of functions, as set forth above and explained in further detail in the following disclosure. In some implementations, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

Depending on the exact configuration and type of the user device 104, the computer-readable media 116 may include volatile memory (such as RAM), non-volatile memory (such as ROM, flash memory, miniature hard drive, memory card, or the like), or some combination thereof.

In various implementations, the user device 104 may also have input device(s) such as a keyboard, a mouse, a pen, a voice input device, a touch input device, etc. The user device 104 may also include the display 118 and other output device(s), such as speakers, a printer, etc. The user 102 may utilize the foregoing features to interact with the user device 104, merchant device(s) 108 or the computing device(s) 112 via the network(s) 110. More particularly, the display 118 of the user device 104 may include any type of display 118 known in the art that is configured to present (e.g., display) information to the users 102.

In various implementations, the one or more merchants 106 may be any individual, entity, or machine that offers products, services or the like according to the examples herein. Moreover, each of the merchants 106 may be associated with one or more merchant devices 108, which may be the same as, similar to, or different from the user devices 104. The merchant devices 108 may include any number of components such as the one or more processor(s) 126, the computer-readable media 128, the card reader 130, the display 132 and/or network interface 134. The merchants 106 may utilize the merchant devices 108 to interact with the user device(s) 104 and/or computing device(s) 112 in any manner. For instance, the merchant devices 108 may be used to access an interface associated with the computing device(s) 112 (e.g. the payment service interface 136). Continuing the above example, a merchant device 108 may utilize information obtained from interacting with the POS component 124 of the user device 104 to execute the payment from the user 102 to the merchant 106 through the payment service of the computing device(s) 112. Further, the POS component 138 may control the operation of the card reader 130 to read payment information from credit cards, debit cards, gift cards and the like. Moreover, the POS component 138 may operate to interact with the card payment network computing devices(s) 162 and/or bank(s) computing device(s) 164 to execute payments from the user 102 to the merchant 106.

While the user devices 104 and merchant devices 108 are shown as including different modules, this is merely for ease of illustration and not intended as limiting. In various implementations, the user devices 104 and merchant devices 108 may be identical, similar or distinct. Moreover, the modules shown and described for the user devices 104 and merchant devices 108 may be implemented as more modules or as fewer modules and functions described for the modules may be redistributed depending on the details of the implementation. Further, in some implementations, the user devices 104 and/or merchant devices 108 may vary from device to device. In general, the user devices 104 and the merchant devices 108 can each be any appropriate device operable to send and receive requests, messages, or other types of information over the one or more networks 110 or directly to each other. Additionally, in some implementation, there may be thousands, hundreds of thousands, or more, of the user devices 104 and the merchant devices 108.

In some implementations, the network(s) 110 may be any type of network known in the art, such as a local area network or a wide area network, such as the Internet, and may include a wireless network, such as a cellular network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks 110 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Consequently, the user devices 104, the merchant devices 108, and the computing device(s) 112 may communicatively couple to the network(s) 110 in any manner, such as by a wired or wireless connection. The network(s) 110 may also facilitate communication between the user devices 104, the merchant devices 108, and the computing device(s) 112. In turn, the network interfaces 120, 134 and 144 of the user devices 104, the merchant devices 108, and the computing device(s) 112 may be any network interface hardware components that may allow user devices 104, the merchant devices 108, and the computing device(s) 112 communicate over the network(s) 110. For example, in a particular implementation, the network interfaces 120 and 134 of the user devices 104 and merchant devices 108 may include near field communication capabilities for performing the communications there between involved in POS operations.

In addition, and as mentioned previously, the computing device(s) 112 may include the one or more processor(s) 140, the computer-readable media 142 and network interface 144. The computing device(s) 112 may also include additional components not listed above that may perform any function associated with the computing device(s) 112. In various implementations, the computing device(s) 112 may be any type of computing device, such as a network-accessible server, and may be one of multiple servers included in a server cluster or server farm. In other implementations, the processor(s) 140 and the computer-readable media 142 of the computing device(s) 112 may be the same as, similar to, or different from the processor(s) 114 and the computer-readable media 116, respectively, of the user device(s) 104. As discussed above, the computer-readable media 142 may store the user interaction component 146, the merchant interaction component 148, the payment component 150, the order ticket component 152, and the database 154. The database 154 may store various information including user account information 156, merchant information 158, and open tickets 160.

The user interaction component 146 and merchant interaction component 148 operate to interface with the user devices 104 and merchant devices 108, respectively. For example, the modules 146 and 148 may operate in accordance with instructions from the payment component 150 to request or provide information on behalf of the payment component 150. The payment component 150 may handle the processing of payments. For example, the payment component 150 may utilize the user interaction component 146 and the merchant interaction component 148 to handle communication with the user 102 and merchant 106, respectively. In addition, the payment component 150 may utilize information from the database 154, such as the user account information 156 and merchant information 158 to provide handling of payments between merchants and users. In some implementations, user account information 156 may include information regarding electronic payment accounts of the customers (e.g. users 102).

As mentioned above, the payment component 150 may handle payments between merchants and users. When paying for a transaction, a user 102 can provide the amount of payment that is due to a merchant 106 using cash, check, a payment card, NFC, or by electronic payment through a payment service of the computing device(s) 112. The merchant 106 can interact with the merchant device 108 to process the transaction. In some examples, the service of the computing devise 112 may handle some payments while other payments may at least at times be handled by point of sale (POS) transactions. In such cases, the point of sale may be the place where the user 102 with user device 104 interacts with the merchant 106 with merchant device 108 and executes a transaction (e.g. purchases items from a street vendor merchant or a restaurant merchant). The restaurant, in one example, may be a quick service restaurant. During point-of-sale (POS) transactions, the merchant device 108 can determine and send data describing the transactions, including, for example, services provided, item(s) being purchased, the amount of the services or item(s), buyer information, and so forth.

In some implementations, the payment service enables card-less payments, i.e., electronic payments, for transactions between the users 102 and the merchants 106 based on interaction of the user 102 with the user device 104 and interaction of the merchant 106 with the merchant device 108. Accordingly, in some examples, a card-less payment transaction may include a transaction conducted between a user 102 and a merchant 106 at a POS location during which an electronic payment account of the user 102 is charged without the user 102 having to physically present a payment card to the merchant 106 at the POS location. Consequently, the merchant 106 need not receive any details about the financial account of the user 102 for the transaction to be processed. As one example, the electronic payment may be charged to a credit card issuer or credit card number that the user 102 provided when signing up with the service of the computing device(s) 112 for an electronic payment account.

As another example, the user 102 may have a quantity of money pre-paid in an account maintained for use in making the electronic payments. Other variations will also be apparent to those of skill in the art having the benefit of the disclosure herein.

Before conducting an electronic payment transaction, the user 102 typically creates a user account with the service of the computing device(s) 112. The user 102 can create the user account, for example, by interacting with an application of the user device 104 that is configured to perform electronic payment transactions and that may execute on the user device 104 (e.g. the payment service interface 122). When creating an electronic payment account with the service of the computing device(s) 112, the user 102 may provide an image including the face of the user, data describing a financial account of the user 102 (e.g., a credit card number, expiration date), and a billing address. This user information can be securely stored by the computing device(s) 112, for example, in the user account information 156 in the database 154. Further, the user account information 156 may be created for each user 102, which may include information about the user and transactions conducted by the user.

To accept electronic payments for POS transactions, the merchant 106 may create a merchant account with the service of the computing device(s) 112 by providing information describing the merchant including, for example, a merchant name, contact information, e.g., telephone numbers, the merchant's geographic location address, and one or more financial accounts to which funds collected from users will be deposited. This merchant information 158 can be securely stored by the service, for example, in the database 154 along with the user account information 156. Further, a merchant profile may be created for each merchant, which may include information about the merchant and transactions conducted by the merchant.

The service of the computing device(s) 112 may be configured to enable electronic payments for transactions. The computing device(s) 112 can include one or more servers that are configured to perform secure electronic financial transactions, e.g., electronic payments for transactions between a user and a merchant, for example, through data communicated between the user device 104 and the merchant device 108. Generally, when a user and a merchant enter into an electronic payment transaction, the transaction is processed by electronically transferring funds from a financial account associated with the user account to a financial account associated with the merchant account. Alternatively, the user may have a balance of funds maintained by the payment service as part of the user account which may be used in transactions.

The payment component 150 may be configured to send and receive data to and from the user device 104 and the merchant device 108. For example, the payment component 150 can be configured to send information describing merchants to an application on the user device 104 using, for example, the information stored in the database 154. For example, the payment component 150 can communicate data describing merchants 106 that are within a threshold geographic distance from a geographic location of the user device 104. The data describing the merchants 106 can include, for example, a merchant name, geographic location, contact information, and an electronic catalogue, e.g., a menu that describes items that are available from the merchant.

In some embodiments, the payment component 150 is configured to determine whether a geographic location of the user device 104 is within a threshold geographic distance from a geographic location of the merchant device 108. The payment component 150 can determine a geographic location of the user device 104 using, for example, geolocation data provided by the user device 104. Similarly, the payment component 150 can determine a geographic location of the merchant device 108 using, for example, geolocation data provided by the merchant device 108 or using a geographic address, e.g., street address, provided by the merchant. Depending on the implementation, the threshold geographic distance can be specified by the payment component 150, by the user, or by the merchant.

Determining whether the user device 104 is within a threshold geographic distance of the merchant device 108 can be accomplished in different ways including, for example, determining whether the user device 104 is within a threshold geographic radius of the merchant device 108, determining whether the user device 104 is within a particular geofence, or determining whether the user device 104 can communicate with the merchant device 108 using a specified wireless technology, e.g., Bluetooth® or Bluetooth® low energy (BLE). In some embodiments, the payment component 150 restricts electronic payment transactions between the user 102 and the merchant 106 to situations where the geographic location of the user device 104 is within a threshold geographic distance from a geographic location of the merchant device 108.

The computing device(s) 112 can also be configured to communicate with one or more card payment network computing devices(s) 162 of a card payment network (e.g., MasterCard®, VISA®) over the one or more networks 110 to conduct financial transactions electronically. The computing device(s) 112 can also communicate with one or more bank computing devices 164 of one or more banks over the one or more networks 110. For example, the computing device(s) 112 may communicate with an acquiring bank, and/or an issuing bank, and/or a bank maintaining user accounts for electronic payments.

An acquiring bank may be a registered member of a card association (e.g., Visa®, MasterCard®), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the user may use a debit card or gift card instead of a credit card, in which case, the bank computing device(s) of a bank or other institution corresponding to the debit card or gift card may receive communications regarding a transaction in which the user is participating. Additionally, there may be computing devices of other financial institutions involved in some types of transactions or in alternative system architectures, and thus, the foregoing are merely several examples for discussion purposes. In addition, the merchant device(s) 108 may perform interactions similar to those described above with regard to the card payment network computing devices(s) 162 of a card payment network and the bank computing devices 164 when processing transactions for payment instruments that do not involve the payment service of the computing device(s) 112.

The user 102 operating the user device 104 that is within a threshold geographic distance of the merchant device 108 can interact with an application executed on the user device 104 to conduct an electronic payment transaction with the merchant 106. While interacting with the application, the user 102 can select the merchant 106, from a listing of merchants 106, with whom the user wants to enter into an electronic payment transaction. The user 102 can select the merchant 106, for example, by selecting a "check in" option associated with the merchant 106. The user device 104 can communicate data to the computing device(s) 112 indicating that the user 102 has checked in with the merchant 106. In response, the computing device(s) 112 can communicate data to notify the merchant device 108 that the user has checked in. An application executing on the merchant device 108 can notify the merchant 106 that the user has electronically checked in with the merchant 106 through a display of the merchant device 108.

Once checked in, the user 102 can receive, obtain or request items, services or appointments that are available to be acquired from the merchant 106. When the user 102 is ready to enter into the card-less payment transaction, the user 102 can, for example, approach a point of sale for the merchant 106 and identify him or herself. For example, the user 102 can verbally notify the merchant 106 that the user 102 wants to enter into a card-less payment transaction and can provide the merchant 106 with the user's name. The merchant 106 can then interact with the application executing on the merchant's device to select the user 102, from a listing of users that have checked in with the merchant 106, to initiate an electronic payment transaction for the item(s) being acquired by the user 102. For example, the merchant 106 can determine a total amount to charge the user for the item(s) being acquired. The user can verbally approve the total amount to be paid and, in response, the merchant 106 can submit a request for an electronic payment transaction for the total amount of the transaction to the computing device(s) 112. In response, the computing device(s) 112 can obtain, for example, from the user account information 156, data describing a financial account associated with the electronic purchase account of the user 102 to which the total amount will be charged.

The computing device(s) 112 can then communicate with the card payment network computing devices(s) 162 of a card payment network to complete an electronic payment transaction for the total amount to be charged to user's electronic payment account. Once the electronic payment transaction is complete, the computing device(s) 112 can communicate data describing the electronic payment for the transaction to the user device 104, e.g., as an electronic receipt, which can, for example, notify the user 102 of the total amount charged to the user for the electronic payment for the transaction with the particular merchant. Further, while a mobile user device 104 is described in this example for purposes of explanation, additional or alternative types of devices may be used in other examples.

In some examples, a POS component 138 of a first merchant device 108 may provide the merchant 108 with order ticket functionality. For instance, the first merchant device 108 can utilize the POS component 138 to create an order ticket for a transaction between a merchant 106 and a user 102. In some examples, the order ticket can correspond to a data structure that stores information associated with interactions between the merchant 106 and the user 102 during a course of a transaction. The interactions can include an identity of the merchant 106, a location of the merchant 106, an identity of the user 102, items order by the user 102 during the transaction (e.g., cart information), a cost associated with each of the items, a cost associated with the open ticket, or other information associated with the user 102.

After creating the open ticket, and during the course of the transaction, the first merchant device 108 can further utilize the POS component 138 to update the data structure for the order ticket by adding (e.g., storing) additional information associated with interactions between the merchant 108 and the user 102 in the data structure.

In some examples, each time the first merchant device 108 creates and/or updates the open ticket, the first merchant device 108 can synchronize with at least a second merchant device 108 using data associated with the open ticket. For instance, at a first period of time, the first merchant device 108 can add first information associated with a first customer order for the transaction to the open ticket. The first merchant device 108 can then determine that the first customer order is complete and, in response, send first data (e.g., information about the first customer order, an associated data structure, etc.) associated with the order ticket to the second merchant device 108.

Later, at a second period of time, the first merchant device 108 can add second information associated with a second customer order for the transaction to the open ticket. The first merchant device 108 can then determine that the second customer order is complete and, in response, send second data (e.g., information about the second customer order, an updated associated data structure, etc.) associated with the order ticket to the second merchant device 108. In some examples, the first merchant device 108 continues to synchronize with the second merchant device 108 at given time intervals and/or each time the order ticket is updated.

The second merchant device 108 may include a kitchen display system that provides order tickets for the merchant. For instance, in some examples, the second merchant device 108 may not include at least the POS component 138 for processing transactions using the computing device(s) 112. In such examples, rather than processing transactions for the merchant 106, the second merchant device 108 can receive the data associated with the order ticket from the first merchant device 108, create order tickets for the order ticket using the received data, and provide the created order tickets for the order ticket via a kitchen display user interface.

For instance, the second merchant device 108 can receive the first data associated with the order ticket from the first merchant device 108. The second merchant device 108 can determine that the order ticket is new based on an associated data structure included within the first data, which may include a count of zero. The second merchant device 108 can then create an order ticket for the order ticket using the first data. For instance, the second merchant device 108 can utilize the first data to create an order ticket that includes an identity of the open ticket, an identity of the customer, indications of one or more items from the first customer order that are in an "in-progress" state, or the like. The second merchant device 108 can then display the first order ticket via the kitchen display user interface.

Additionally, the second merchant device 108 can receive the second data associated with the order ticket from the first merchant device 108. The second merchant device 108 can determine that the order ticket has been updated based on the associated data structure included within the second data. For instance, in some examples, the associated data structure may include a count of one, indicating that the order ticket has been updated once since the order ticket was created. The second merchant device 108 can then utilize the first data and/or the second data to create a second order ticket that includes the identity of the order ticket and the identity of the customer. The second merchant device 108 can further utilize the second data to add indications of one or more items from the second customer order that are in the "in-progress" state to the second order ticket. After creating the second order ticket, the second merchant device 108 can display the second order ticket via the kitchen display user interface.

In some examples, the second merchant device 108 can further synchronize with the first merchant device 108 at given time intervals and/or after receiving input. For instance, the second merchant device 108 can receive input indicating that one or more order tickets and/or one or more items on an order ticket are complete. In response, the second merchant device 108 can send data to the first merchant device 108 that indicates that the one or more order tickets and/or the one or more items are complete. In some examples, the first merchant device 108 can receive the data from the second merchant device 108 and update the order ticket based on the input. For instance, the first merchant device 108 can add an indication to the order ticket that items are complete.

It should be noted that, in some examples, the first merchant device 108 and the second merchant device 108 can utilize the computing device(s) 112 to synchronize order ticket functionality of the first merchant device 108 with the kitchen display system of the second merchant device 108. For instance, the first merchant device 108 can send first cart information associated with the first customer order to the computing device(s) 112. In response, the computing device(s) 112 can utilize the order ticket component 152 to both generate an order ticket 160 for the transaction, and add first information associated with the first customer order to the order ticket 160. The computing device(s) 112 can then send the first data associated with the order ticket 160 to the second merchant device 108 so that the second merchant device 108 can create the first order ticket for the open ticket.

Additionally, the first merchant device 108 can send second cart information associated with the second customer order to the computing device(s) 112. In response, the computing device(s) 112 can utilize the order ticket component 152 to add second information associated with the second customer order to the order ticket 160. The computing device(s) 112 can then send the second data associated with the order ticket 160 to the second merchant device 108 so that the second merchant device 108 can create the second order ticket for the open ticket. The first merchant device 108, the second merchant device 108, and the computing device(s) 112 can continue to send and receive data using such a process at given time intervals and/or each time the first merchant device 108 receives an order from the user 102.

FIG. 2A is an example illustration of two scenarios in which a data capture device operates, according to an embodiment of the present subject matter. In the example of FIG. 2A, scenario A, the customers 102 can check out at a counter device 206, which is in fixed and in a central location, and customers 102 may wait, and often line up, at the checkout register 206 bringing with them all the products to be purchased, or knowing what to order when the approach the counter device 206. Typically, the counter devices 206 are the only means for the POS transaction, however, in this implementation, a line busting device such as a data capture device 202 is configured to cater to customers that are waiting, often in a line, to checkout and/or facilitate with the checkout at the counter device 206. All merchant devices, such as the kitchen display system 204, counter device 206, and the data capture device 202 may be operated by one or more employees 104 of the retail establishment. Such devices may all communicate to each other via network 110, which may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks 110 may include both wired and/or wireless communication technologies, including Bluetooth®, Bluetooth® low energy, Wi-Fi and cellular communication technologies, cloud computing technologies, as well as wired or fiber optic technologies. Components used for such communications can depend at least in part upon the type of network, the environment selected, or both. Protocols for communicating over such networks are well known and are not discussed herein in detail. The merchant devices, the customer devices 250 and the payment server 112 may also communicate with each other via the network 110.

The merchant devices at various locations may interact with the kitchen display system 204 through the payment server 112 that makes decisions regarding order fulfillment, order prioritization, order firing, and the like. The customer devices 250 and merchant devices may have executing thereon a payment or delivery application associated with the payment server 112. The applications may be configured based on whether the application is executing on a merchant device or a customer device. For example, the application running on the customer device may allow the customer to make orders, pay for orders and/or provide information related to customer. In the same example, the application running on the merchant device may allow the merchant to receive orders, modify certain orders, for example in case of availability of the item or staff, designate orders to kitchen staff, forward orders to neighboring merchants, accept payments, process orders, and provide order updates. The payment server, in one implementation, may apply heuristic or machine learning models to analyze data, for example in real-time, to determine which orders should be fired off to the kitchen, which orders should be denied, which orders should be withheld for a certain period of time, and which orders should be prioritized over others, to meet a certain efficiency threshold.

The customer devices 250 may be registered with the server 112, for example, the device ID or phone number may be registered with the payment server 112, such that the order updates are then sent to the customer device 250. In another example, the order updates are sent to the merchant device.

The kitchen display system (KDS) 204 is an intelligent system that improves productivity of restaurant operations. Even though the description hereinafter uses KDS as an example, it will be understood that the implementations can be described for other industrial applications such as but not limited to department stores, kitchens, shops, and other Point-of-Sale (POS) applications. In the disclosure herein, the KDS may be configured to electronically receive information related to the orders either directly from merchant devices or through the server 112, where the merchant devices may be configured to accept entry of food orders from users and manage payment for the food orders. As described before, the merchant devices include cash registers operated by staff of the food service establishment, self-service POS kiosks, mobile devices configured with appropriate POS hardware and/or software, and/or other components. The mobile devices may include smartphones, tablets, laptops, and/or other mobile devices. In some implementations, the mobile devices may be the personal mobile devices of the customers of the food service establishment. The customers of the food service establishment may be able to place their food orders and pay for the orders prior to arriving at the food service establishment using their personal mobile devices. In some implementations, the food orders may include party size information. The party size information may be information corresponding to a quantity of user devices 250 associated with a related group of customers.

The kitchen display system (KDS) 204 may be configured to receive the order information from the point of sale system and display order state information related to the food orders in a kitchen of the food service establishment. Order state information may comprise information related to the current preparation of the food order. The order state information may be displayed by the KDS such that kitchen staff may prepare the guest food orders and track the progress (e.g., state to state) through the kitchen. The KDS may also include a staff member interface system (not shown) that may be configured to assist one or more staff members to manage the dining experience for the customers of the food service establishment. The staff member interface system may be configured to provide staff members with information, and/or receive entry and/or selection of information related to tasks that have been performed by the staff members, tasks that will be performed by the staff members, and/or other information. The staff member interface system may be configured to provide staff members with information and/or receive entry and/or selection of information related to customer devices associated with customers of the food service establishment, food orders placed by the guests, stations 202, 204 within the food service establishment, capacity information, and/or other information. In some implementations, the staff member interface system may take inputs from the line busting devices 202 that may be carried by staff members while the staff members are working in the food service establishment.

The customer devices 250 may be used to determine location of a user with respect to the store, counter device 206, a data capture device 202, or a fixed point in the store. For example, sensors (not shown) within the customer devices and merchant devices may be used to determine a relative or absolute location or even presence of a customer device. The server or merchant devices can be configured to set up dynamic or fixed geo-fences or boundaries 252 to identify customers that may be of interest, for example customers whose location falls within or outside the boundary 252. The current geographical location of any customer may be determined, for example through the customer device, in a variety of manners, including receiving information from the electronic device 250 or a location-based service identifying the current geographical location, receiving cell tower information or wireless access point information from the electronic device 250 or a location-based service identifying a cell tower or wireless access point that the electronic device 250 has communicated with recently (e.g., over a previous period of time), and so on. The current geographical location may include a geo-location, a venue, etc. In some instances, the current geographical location of the electronic device 250 may be monitored over time. The customer device, besides the location information, may also include other information such as motion information indicating a current speed or direction of an electronic device, or a recent average speed and directional trend of the electronic device; information identifying a current navigation route of a user within the store; information identifying an interaction time between an employee and the user; purchase history for a user indicating items that have been purchased, employees that have sold the items, amounts of purchases, times of purchases, and so on; time information, social networking information identifying friends associated with the user that the user has permitted access to; user preference information; and device information, such as device ID, device software, etc. In one example, the counter device 206 may calculate a distance threshold associated with a user device 250 based on a wireless signal strength between the two devices (e.g., Bluetooth, Wi-Fi radio, etc.). In some cases, the server through the data capture device may automatically detect presence of a customer device by comparing its device fingerprint with stored or registered device fingerprints. In one implementation, the device fingerprint may be computed using environmental data, such as device profile, electrical signals, mechanical signals obtained off the device, and so on. Such device fingerprinting can be used to determine identity of the customer, validate customer identify, validate customer's payment instrument, use the information to determine whether or not customer qualifies for post-pay and other kind of analysis.

As shown in scenario A, in one instance where the users 102 are lined up to make purchases at a store, the first user may be served directly at the counter device 206 while the others are being served first using the data capture device 202 and then, optionally, the counter device 206. The dotted network lines are meant to indicate a direct interaction between the users and the counter device 206. The bold network lines are meant to indicate an indirect, network interaction between the devices.

The first user provides his order to the merchant manning the counter device 206. The counter device 210 creates a first order ticket and sends the first order ticket data structure 210, with information such as items ordered, time of the order, and other customer information, to the server 112 or directly to the KDS 204. The KDS 204 prepares the order as per first order ticket data 210 and sends the updates 222 to the counter device 206 or user device 250 as the order is being prepared or after the order is ready to be delivered or picked up. In some cases, the first order ticket may be withheld at the server or the counter device until a firing condition is met, or until all orders in the line are received. For example, the firing condition may be based on the availability of staff, availability of the items, etc.

While the first user is being attended to at the counter device 206 or contemporaneous to it, a second user may provide orders through the data capture device 202. In one implementation, the menu at the data capture device 202 may be configured in real-time or near-real time to reflect the order status at the kitchen such that certain orders may be pushed before others. For example, if the depth of the line is long, for example if there are more than a threshold number of customers in line, the server 112 may recommend pre-packaged goods to the customer or even recommend the customer to come back at another time. In another example, the customer may be recommended an item ordered by a previous customer so that certain orders can be aggregated to expedite preparation of orders.

For payment, the data capture device 202 asks the second customer for payment information so that the order can be processed. In such a case, the second customer can leave the line. In another case, the data capture device 202 or the server 112 can determine whether the customer qualifies for post-pay option where the customer can pay at the counter device or after the order is received. To simplify the payment option at the POS terminal, in some implementations, the data capture device 113 may send the name and order information to the POS terminal to expedite order processing. Additionally, the server 112 can compute a confidence or risk score corresponding to the customer based on historical transactions, loyalty and other risk models to determine whether the customer can be trusted to not leave without paying. The confidence or risk score can be computed based on item, merchant, device, customer, or time attributes. For example, customer profile may be used to determine whether the customer is more likely to leave orders after ordering, or pick up orders without paying. Further, the merchant profile may be used to determine if the location is more likely to see fraudulent customer frequent the store. For this, the missed or dropped orders may be tracked for such kind of analysis.

The data capture device 202 then sends the order placed by the second customer, for example the second order ticket reflected in a second order ticket data structure, with customer information, time stamp, order information, etc., to the KDS 204, for example through the server 112. In certain cases, the second customer stays in line and advances to the counter device 206 where the customer pays for the transaction or add/modify the order ticket. For example, at this point, the second customer can add certain items to the second order ticket, which may or may not have been fired off to the kitchen. Accordingly, the counter device 206 can either add the items to the second order ticket or create a supplementary order ticket to the second order ticket and request payment. The customer may be provided a receipt, either paper or electronically on their device 250, which may include an indicator, such as a number, barcode, or a dynamic URL or link that indicates in real-time the status of their order.

The server 112, centrally, or the merchant devices, locally, can determine when to fire off the orders to the kitchen. For example, in one example, the server receives the orders of the entire line or for certain number of customers, such as the first order ticket, the second order ticket, and so on, and analyzes the priority of the order tickets. The server may also aggregate orders to fire off to the kitchen. In another example, the server 112 can fire off the orders as they are received. In another example, the server 112 can fire off the order (or receive payment) once the user 102 crosses a certain boundary or enters (in some cases leaves) a region of interest. The boundary 252, as described before, may be a static or dynamic boundary that changes based on depth of the line, time of the day or location of the restaurant, etc. In this scenario A, the second order ticket corresponding to the second user may be fired off when the second user crosses the boundary 252. In yet another example, the server 112 can fire off a specific order when the order meets a firing condition, for example, a boundary is crossed, a ticket size is reached, a specific customer places an order, and so on.

The server 112 can prioritize orders, aggregate and fire off orders to KDS, based on machine learning models, to achieve a certain level of efficiency. The KDS 204 processes the orders, updating the status of the status or dynamic indicator, such as QR code, on flight as the order moves from one station to another. KDS 204 pushes such updates 222 to the merchant or customer devices.

In the second scenario B, as shown in the figure, the customer device 250 can be used to determine a location of the customer with respect to a location in store or a location of the data capture device 202. Accordingly, various transaction activities, such as payment, order firing, order fulfillment, etc., can be based on when the customer has moved into or out of a region of interest.

Figure 2B:
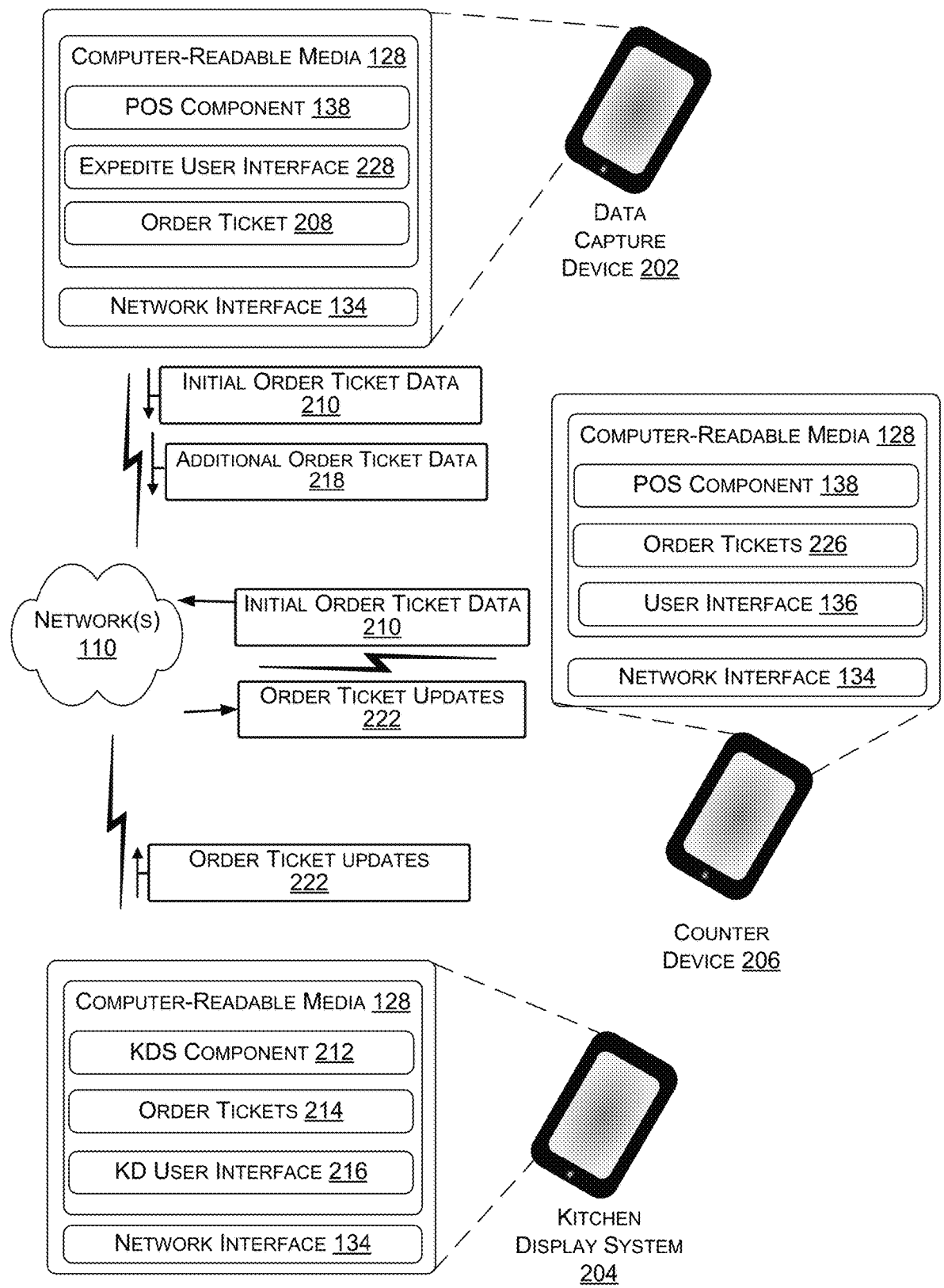
FIG. 2B is an example illustration of merchant devices synchronizing order ticket functionality with kitchen display systems, according to an embodiment of the present subject matter.

FIG. 2B is an example illustration of merchant devices synchronizing order ticket functionality with kitchen display systems. In the example of FIG. 2B, a merchant (such as one of merchants 106) may include one or more of a first merchant device 202, a second merchant device 204, and a third merchant device 206, which may each represent one of merchant device(s) 108. The first merchant device 202 can include a data capture device 202 that comprises a fixed or handheld data reader such as an optical reader that may accept orders to create order tickets, and optionally process transactions by accepting payment cards. The second merchant device 204 can include a kitchen display system that creates and provides order tickets via a kitchen display user interface. Additionally, the third merchant device 206 can include a counter device that a point-of-sale (POS) device that includes functionality for processing transactions via a payment service (e.g., computing device(s) 112) and additionally or alternatively provides updates associated with order tickets to the merchant.

In the example of FIG. 2B, a merchant can utilize the data capture device 202 to input customer orders associated with transactions between the merchant and customers (e.g., users 102-1, . . . N—hereinafter collectively referred to as users 102). For instance, the counter device 206 manned by merchant 104 takes a first customer order from the first customer in line. The counter device 206 may optionally also be configured to receive payments from the customers ordering at the counter device or the data capture device. The data capture device 202 can receive input corresponding to a second customer order associated with a transaction between the merchant and a second customer, for example from a second customer standing in line behind a first customer while the first customer is being served at the counter device 206. In some examples, the first customer order includes first items ordered by the first customer from the merchant, and the second customer order includes a second set of items ordered by the second customer. Based on the first input, the data capture device 202 can utilize the POS component 138 to create an order ticket 208 for the transaction. In one implementation, the data capture device 202 sends the order ticket 208 to another device, such as the counter device 206 or the kitchen display system 204, either after the ticket is created or substantially contemporaneous to when the ticket is created. In another implementation, the data capture device 202 sends the order ticket 208 when a certain "firing" condition is met. For example, the firing condition may be defined by various attributes such as the distance of the user from the counter device, a time of the day, availability of the kitchen staff to prepare the items in the order, the complexity of the order ticket, the average time taken to prepare the order, and so on. Thus, the data capture device 202 may withhold firing off the order to other devices, however, the device 202 may still send the order ticket to a processor, such as 112, for data analysis or decision making.

As discussed above, the order ticket 208 can correspond to a data structure that stores information associated with interactions between the merchant and the second customer during the transaction, such as a line-busting transaction when the first customer is being served at the counter device. As such, after generating the open ticket, the data capture device 202 can add information associated with the second customer order to the order ticket 208. In some examples, the information includes at least an identity of the customer, a list of the items presented by the expedited user interface 228, special requests made by the customer (e.g., how to prepare the items, that the customer is celebrating a special occasion, etc.) or the like.

After adding the second customer order to the order ticket 208, the data capture device 202 can obtain orders from the third customer, fourth customer, and so on, each time creating order tickets. Meanwhile the second customer may move to the position of the first customer, for example if the second customer has not paid for the transaction or if the customer has to add to an existing order or place a new order.

The initial order ticket data 210 can include information associated with the second customer order. For instance, the initial order ticket data 210 can include an identity of the order ticket 208, an identity of the second customer, a list of the items, special requests made by the second customer (e.g., how to prepare the items, that the customer is celebrating a special occasion, etc.), or the like. In some examples, the initial order ticket data 210 can further include an associated versioning data structure associated with the order ticket 208. For instance, since the initial order ticket data 210 is the first data associated with the order ticket 208 sent by the data capture device 202, the associated versioning data structure can include a count of zero (and/or any other indicator) indicating that the initial order ticket data 210 corresponds to a new order ticket 208.

After the data capture device 202 has determined that a first customer order is complete, for example based on determining that a threshold amount of time has passed since receiving the first input, the data capture device 202 may send the second customer order for preparation. In such examples, the threshold amount of time can include five second, thirty seconds, one minute, or the like. Additionally or alternatively, in some examples, the data capture device 202 can determine that the first customer order is complete based on receiving input indicating that the first customer order is complete. In such examples, the input can include a selection of a button (e.g., a "Fire Button") included on a user interface provided by the data capture device 202. Based on determining that the first customer order is complete, the data capture device 202 can synchronize with the kitchen display system 204 and/or the counter device 206. For instance, the data capture device 202 can send initial order ticket data 210 associated with the order ticket 208 to the kitchen display system 204 and/or the counter device 206.

In the example of FIG. 2B, the kitchen display system 204 can receive the initial order ticket data 210 associated with the order ticket 208 from the data capture device 202. The kitchen display system 204 can then utilize the kitchen display component 212 to create a first order ticket 214 for the order ticket 208 using the initial order ticket data 210. In some examples, before creating the first order ticket 214, the kitchen display system 204 uses the associated versioning data structure within the initial order ticket data 210 to determine that the first data is associated with a new order ticket 208. For instance, the kitchen display system 204 can determine that the counter (and/or other indicator) included within the associated versioning data structure is set to zero.

The first order ticket 214 for the order ticket 208 can include one or more of an identity of the order ticket 208, an identity of the customer, indications of the first items, an indication of one or more items from the first items that are in an "in-progress" state, a timer that indicates an amount time since the data capture device 202 received the first customer order, special requests made by the customer, or the like. After creating the first order ticket 214, the kitchen display system 204 can provide the first order ticket 214 via a kitchen display (KD) interface 216. For instance, in some examples, the kitchen display system 204 can add the first order ticket 214 to the kitchen display interface 216.

The kitchen display interface 216 can include one or more order tickets 214 that are currently in an "in-progress" state. In some examples, an order ticket is in an "in-progress" state when the order ticket includes at least one item that is currently being prepared, or needs to be prepared, by the merchant. For instance, the kitchen display interface 216 can include the first order ticket 214 along with an indication that the first order ticket 214 is currently in an "in-progress" state. In some examples, the first order ticket 214 includes the "in-progress" state until the kitchen display system receives input indicating that each of the first items have been complete. Based on receiving the input, the kitchen display system 204 can remove the first order ticket 214 from the kitchen display interface 216.

In the example of FIG. 2B, the data capture device 202 can continue to receive input associated with the transaction, add information to the order ticket 208 based on the input, and synchronize the order ticket 208 with the kitchen display system 204 and/or the counter device 206. In another instance, the data capture device 202 or the counter device 206 can receive second input corresponding to a second customer order associated with the transaction. The second customer order can include second items ordered by the customer from the merchant. The counter device 206 can then add second information associated with the second customer order to the order ticket 208. In some examples, the second information can include a list of the second items. The counter device 206 can then determine that the second customer order is complete and based on determining that the second order is complete, synchronize with the kitchen display system 204 and/or the data capture device 202.

Synchronizing with the kitchen display system 204 and/or the counter device 206 can include sending additional order ticket data 218 associated with the order ticket 208 to the kitchen display system 204 and/or the counter device 206. The additional order ticket data 218 can include an identity of the order ticket 208, a list of the second items, or the like. In some examples, the additional order ticket data 218 further includes an updated associated versioning data structure associated with the order ticket 208. The updated versioning data structure can include a count greater than zero (e.g., one). For instance, in some examples, the count is based on the number of times the order ticket 208 has been updated by the data capture device 202.

The kitchen display system 204 can receive the additional order ticket data 218 from the data capture device 202. Based on receiving the additional order ticket data 218, the kitchen display system 204 can determine that the order ticket 208 has been updated with additional items using the updated associated versioning data structure. Additionally, the kitchen display system 204 can utilize the kitchen display component 212 to create a second order ticket 214 for the order ticket 208 using the additional order ticket data 218. The second order ticket 214 can include one or more of the identity of the order ticket 208, the identity of the customer, indications of the second items, an indication of one or more items from the second items that are in an "in-progress" state, a timer that indicates an amount of time since the data capture device 202 received the second customer order, the special requests made by the customer, or the like. The kitchen display system 204 can then provide the second order ticket 214 via the kitchen display interface 216.

In the example of FIG. 2B, the kitchen display system 204 further synchronizes with the data capture device 202 and/or the counter device 206 by sending order ticket data 220 and order ticket updates 222 to the data capture device 202 and/or the counter device 206. The order ticket data 220 can include data associated with one or more order tickets 214 that the kitchen display system 204 creates for open tickets. For instance, the order ticket data 220 can include data associated with the first order ticket 214 and the second order ticket 214 that the kitchen display system 204 created using the initial order ticket 210 and the additional order ticket data 218, respectively. In some examples, the kitchen display system 204 sends the order ticket data 220 each time the kitchen display system 204 creates a new order ticket 214. Additionally or alternatively, in some examples, the kitchen display system 204 sends the order ticket data 220 at given time intervals, such as every thirty seconds, minute, five minutes, or the like.

The order ticket updates 222 can include data associated with updates that are made by the kitchen display system 204 to order tickets 214. For instance, and as discussed in detail below, a merchant can use the kitchen display system 204 to update order tickets 214 by performing at least one of (1) completing order tickets 214 and/or items included in order tickets 214, (2) restoring order tickets 214 and/or items included in order tickets 214 that were previously completed, or (3) voiding order tickets 214 and/or items included in an order tickets 214. In some examples, the kitchen display system 204 sends order ticket updates 222 associated with updated order tickets 214 each time the kitchen display system 204 receives input indicating an update. Additionally or alternatively, in some examples, the kitchen display system 204 sends order ticket updates 222 associated with updated order tickets 214 at given time intervals. For instance, the kitchen display system 204 can send the order ticket updates 222 every second, ten seconds, minute, or the like.

The data capture device 202 can receive the order ticket data 220 and/or the order ticket updates 222 from the kitchen display system 204 and update open tickets using the data. For instance, in some examples, the data capture device 202 can receive order ticket data 220 that includes data indicating that the first order ticket and/or the second order ticket for the order ticket 208 have been created. The data capture device 202 can then utilize the POS component 138 to update the order ticket 208 with an indication that the first order ticket and/or the second order ticket were created. Additionally or alternatively, in some examples, the data capture device 202 can receive order ticket updates 222 that include data indicating one or more updates (e.g., an item has been completed) to the first order ticket and/or the second order ticket for the order ticket 208. The data capture device 202 can then utilize the POS component 138 to update the order ticket 208 to indicate the updates (e.g., that the item has been completed).

In the example of FIG. 2B, the counter device 206 can synchronize with the data capture device 202 and/or the kitchen display system 204. For instance, the counter device 206 can receive initial order ticket data 210 and additional order ticket data 218 from the data capture device 202. The counter device 206 can then utilize expedite component 224 to create order tickets 226 for the order ticket 208 using a similar process as described above as the kitchen display system 204 utilizing the kitchen display component 212. In some examples, the order tickets 226 can include each of the order tickets 214 that are in an "in-progress" state on the kitchen display system 204. Additionally or alternatively, in some examples, the order tickets 226 can further include previous order tickets that were completed by the kitchen display system 204. In some examples, after creating the order tickets 226, the counter device 206 can provide the order tickets 226 via an expedite interface 228.

The counter device 206 can further receive order ticket data 220 and/or order ticket updates 222 from the kitchen display system 204. In some examples, when receiving order ticket data 220 associated with a respective order ticket, the counter device 206 is not required to create the respective order ticket using the expedite component 224. Rather, the counter device 206 provides the respective order ticket via the expedite interface 228. In some examples, when receiving the order ticket updates 222, the counter device 206 utilizes the expedite component 224 to update the order tickets 226. For instance, the counter device 206 can utilize the expedite component 224 to add an indication to an order ticket 226 that indicates that the order ticket 226 is complete.

In some examples, the counter device 206 can further synchronize with the data capture device 202 and/or the kitchen display system 204 by sending order ticket updates 230 to the data capture device 202 and/or the kitchen display system 204. For instance, and as discussed in detail below, a merchant can use the counter device 206 to update order tickets 226 by performing at least one of (1) completing order tickets 226 and/or items included in order tickets 226, (2) restoring order ticket s 226 and/or items included in order tickets 226 that were previously completed, or (3) voiding order tickets 226 and/or items included in order tickets 226. In some examples, the counter device 206 then sends order ticket updates 230 associated with updated order tickets 226 to the data capture device 202 and/or the kitchen display system 204. For instance, in some example, the counter device 206 sends order ticket updates 230 each time the counter device 206 receives input indicating an update. Additionally or alternatively, in some examples, the counter device 206 sends order ticket updates 230 associated with updated order tickets 226 at given time intervals. For instance, the counter device 206 can send the order ticket updates 230 every second, ten seconds, minute, or the like.

In the example of FIG. 2B, the data capture device 202 can receive the order ticket updates 230 from the counter device 206 and update open tickets based on the order ticket updates 230. For instance, in some examples, the POS device can receive order ticket updates 230 that include data indicating one or more updates (e.g., an item has been completed) to the first order ticket and/or the second order ticket for the order ticket 208. The data capture device 202 can then utilize the POS component 138 to update the order ticket 208 to indicate the updates (e.g., that the item has been completed).

The kitchen display system 204 can further receive the order ticket updates 230 from the counter device 206. In response, the kitchen display system 240 can utilize the kitchen display component 212 to update one or more order tickets 214 based on the order ticket updates 230. For instance, if the order ticket updates 230 indicate that a respective order ticket of the order tickets 214 is complete, then the kitchen display system 204 can utilize the kitchen display component 212 to remove the respective order ticket from the kitchen display interface 216. In some examples, removing the respective order ticket includes causing the kitchen display interface 216 to stop displaying the respective order ticket.

It should be noted that, in some examples, the data capture device 202 can create order tickets for the order ticket 208. For instance, after receiving the first input, the data capture device 202 can create a first order ticket associated with the first customer order using first data from the order ticket 208. The data capture device 202 can then send the first order ticket (e.g., as initial order ticket data 210) to the kitchen display system 204 and/or the counter device 206. Next, after receiving the second input, the data capture device 202 can create a second order ticket associated with the second customer order using second data from the order ticket 208. The data capture device 202 can then send the second order ticket (e.g., as additional order ticket data 218) to the kitchen display system 204 and/or the counter device 206. In some examples, sending order tickets to the kitchen display system 204 and/or the counter device 206 causes the kitchen display system 204 and/or the counter device 206 to provide (e.g., display) the order tickets.

It should further be noted that, in some examples, based on the synchronization capabilities between the merchant devices 202-206, the data capture device 202 causes the kitchen display system 204 to create and provide order tickets 214 and/or the counter device 206 to create and provide order tickets 226 based on sending the kitchen display system 204 and the counter device 206 initial order ticket data 210 and additional order ticket data 218. For instance, the data capture device 202 can cause the kitchen display system 204 to create and display a first order ticket 214 for the order ticket 208 based on sending the kitchen display system 204 initial order ticket data 210. Additionally, the data capture device 202 can cause the kitchen display system 204 to create and display the second order ticket 214 based on sending the kitchen display system 204 additional order ticket data 218.

Moreover, it should be noted that, in some examples, the data capture device 202 can send initial order ticket data 210 and additional order ticket data 218 for any number of open tickets. For instance, the data capture device 202 can send initial order ticket data 210 associated with a new order ticket each time the data capture device 202 generates an order ticket for a transaction between the merchant and a customer. Additionally, the data capture device 202 can send additional order ticket data 218 associated with open tickets each time the data capture device 202 updates an order ticket for a respective transaction.

Furthermore, it should be noted that the merchant devices 202-206 can synchronize based on switching from an offline mode to an online mode. For instance, the data capture device 202 can send the kitchen display system 204 and/or the counter device 206 both initial order ticket data 210 and additional order ticket data 218 based on the data capture device 202 switching from an offline mode to an online mode. Additionally, the kitchen display system 204 can send the data capture device 202 and/or the counter device 206 both order ticket data 220 and order ticket updates 222 based on the kitchen display system 204 switching from an offline mode to an online mode. Moreover, the counter device 206 can send the data capture device 202 and/or the kitchen display system 204 order ticket updates 230 based on the counter device 206 switching from an offline mode to an online mode.

Figure 3:
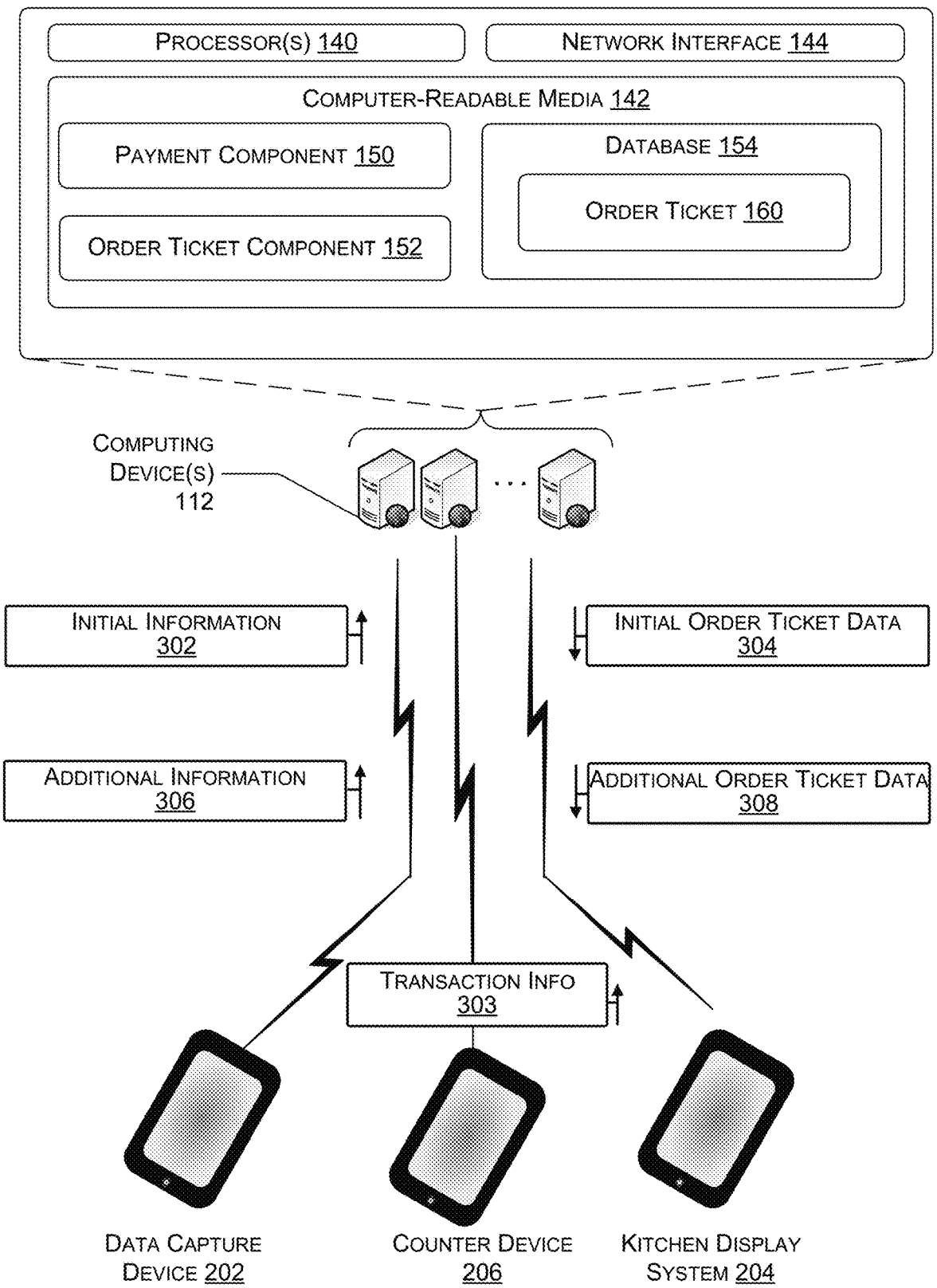
FIG. 3 is an example illustration of a merchant device synchronizing order ticket functionality with a kitchen display system via a third-party service, according to an embodiment of the present subject matter.

FIG. 3 is an example illustration of a merchant device synchronizing order ticket functionality with a kitchen display system via a third-party service. For instance, in some examples, rather than directly sending and receiving communications between the data capture device 202 and the kitchen display system 204 to synchronize order ticket functionality with kitchen display systems, the data capture device 202 and the kitchen display system 204 communicate through a third-party service, e.g., the computing device(s) 112.

For instance, in the example of FIG. 3, the data capture device 202 may receive first input corresponding to a first customer order associated with a transaction between the merchant and a customer standing in line behind a primary customer being served at the counter device 206. Based on receiving the first input, the data capture device 202 can send the computing device(s) 112 initial information 302. The initial information 302 can include data indicating an identity of the merchant, an identity of the customer, cart information (e.g., first items ordered by the customer during the first customer order), a time associated with the first customer order, position of the customer (for example location of the customer when ordering), or the like. The computing device(s) 112 can then receive the initial information 302 from the data capture device 202 and utilize the order ticket component 152 to generate an order ticket 160 using the initial information 302. For instance, in some examples, the computing device(s) 112 can generate the order ticket 160 using a similar process as the data capture device 202 generating the order ticket 208 as discussed above.

After generating the order ticket 160, the computing device(s) 112 can add first information associated with the first customer order to the order ticket 160. Additionally, the computing device(s) 112 can send the kitchen display system 204 initial order ticket data 304. In some examples, the initial order ticket data 304 can include similar data as the initial order ticket data 210. The kitchen display system 204 can use the initial order ticket data 304 to create a first order ticket for the order ticket 160. For instance, the kitchen display system 204 can create a first order ticket that includes one or more of an identity of the order ticket 160, an identity of the customer, indications of the first items, an indication of one or more items from the first items that are in an "in-progress" state, a timer that indicates an amount time since the data capture device 202 received the first customer order, special requests made by the customer, or the like. The kitchen display system 204 can then provide the first order ticket via a kitchen display user interface.

In the example of FIG. 3, the data capture device 202 or a counter device 206 can further receive second input corresponding to a second customer order associated with the transaction between the merchant and the customer. Based on receiving the second input, the counter device 206 can send the computing device(s) 112 additional information 306. The additional information 306 can include data indicating the identity of the merchant, the identity of the customer, additional cart information (e.g., second items ordered by the customer during the second customer order), a time associated with the second customer order, or the like. In one implementation, the counter device 206 and the data capture device 202 can simultaneously send separate orders to the kitchen display system through the computing device 112.

The computing device(s) 112 can receive the additional information 306 from the data capture device 202. The computing device(s) 112 can then utilize the order ticket component 152 to update the order ticket 160 based on the additional information 306. For instance, in some examples, the computing device(s) 112 can utilize the order ticket component 152 to add the additional cart information associated with the second customer order to the order ticket 160. Additionally, in some examples, the computing device(s) 112 can update an associated versioning data structure of the order ticket 160 in order to indicate that the order ticket 160 was updated with a second customer order.

After updating the order ticket 160, the computing device(s) 112 can send the kitchen display system 204 additional order ticket data 308. In some examples, the additional order ticket data 308 can include similar data as the additional order ticket data 218. The kitchen display system 204 can use the additional order ticket data 308 to create a second order ticket for the order ticket 160. For instance, the kitchen display system 204 can create a second order ticket includes one or more of the identity of the order ticket 160, the identity of the customer, indications of the second items, an indication of one or more items from the second items that are in an "in-progress" state, a timer that indicates an amount time since the data capture device 202 received the second customer order, the special requests made by the customer, or the like. The kitchen display system 204 can then provide the second order ticket via the kitchen display user interface.

It should be noted that, in some examples, the kitchen display system 204 can send data back to the computing device(s) 112. For instance, the kitchen display system 204 can send order ticket data 220 and order ticket updates 222 to the computing device(s) 112. The computing device(s) 112 can then use the order ticket data 220 and the order ticket updates 222 to the update order ticket 160 stored on the computing device(s) 112. Additionally, in some examples, the computing device(s) 112 can send the updates to the order ticket 160 to the data capture device 202.

It should further be noted that, in some examples, the computing device(s) 112 may further communicate with the counter device 206 when synchronizing order ticket functionality with kitchen display systems. For instance, the computing device(s) 112 can send the initial order ticket data 304 and/or the additional order ticket data 308 to the counter device 206. The counter device 206 can then create order tickets for the open tickets 160 using the initial order ticket data 304 and/or the additional order ticket data 308. Additionally, the computing device(s) 112 can send and receive data associated with updates to the order ticket 160 to the counter device 206.

Finally, it should be noted that, by using the computing device(s) 112 to synchronize order ticket functionality with kitchen display systems, a merchant POS device is not required to include order ticket functionality in order for the POS device to synchronize with the kitchen display system. For instance, in some examples, a POS device may correspond a legacy device that does not include the hardware and/or software to perform order ticket functionality. In such examples, the computing device(s) 112 can generate and update open tickets for the POS device.

In one implementation, the customer may be provided the option to either pre-pay for the items purchased or pay after the items are delivered to the customer. If the customer provides the transaction information for pre-pay, the transaction information 303 may be sent along with the initial information or additional information 306. Optionally, if the customer provides the transaction information for post-pay, the transaction information 303 is sent to the computing device 112 directly from the counter device 206.

Figure 4A:
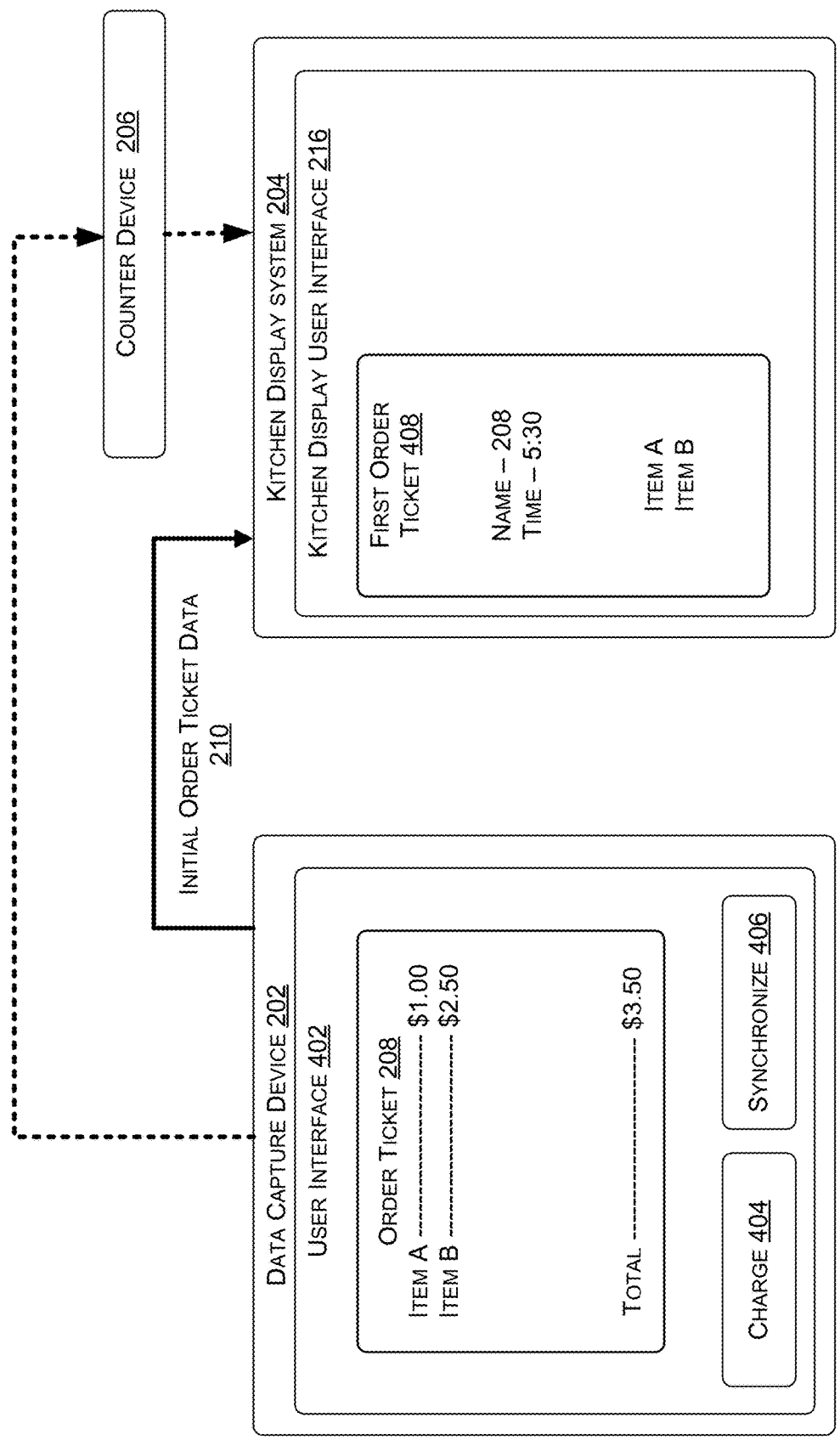
FIGS. 4A-4B are example illustrations of synchronizing an order ticket generated on a POS device with a kitchen display system, according to an embodiment of the present subject matter.
Figure 4B:
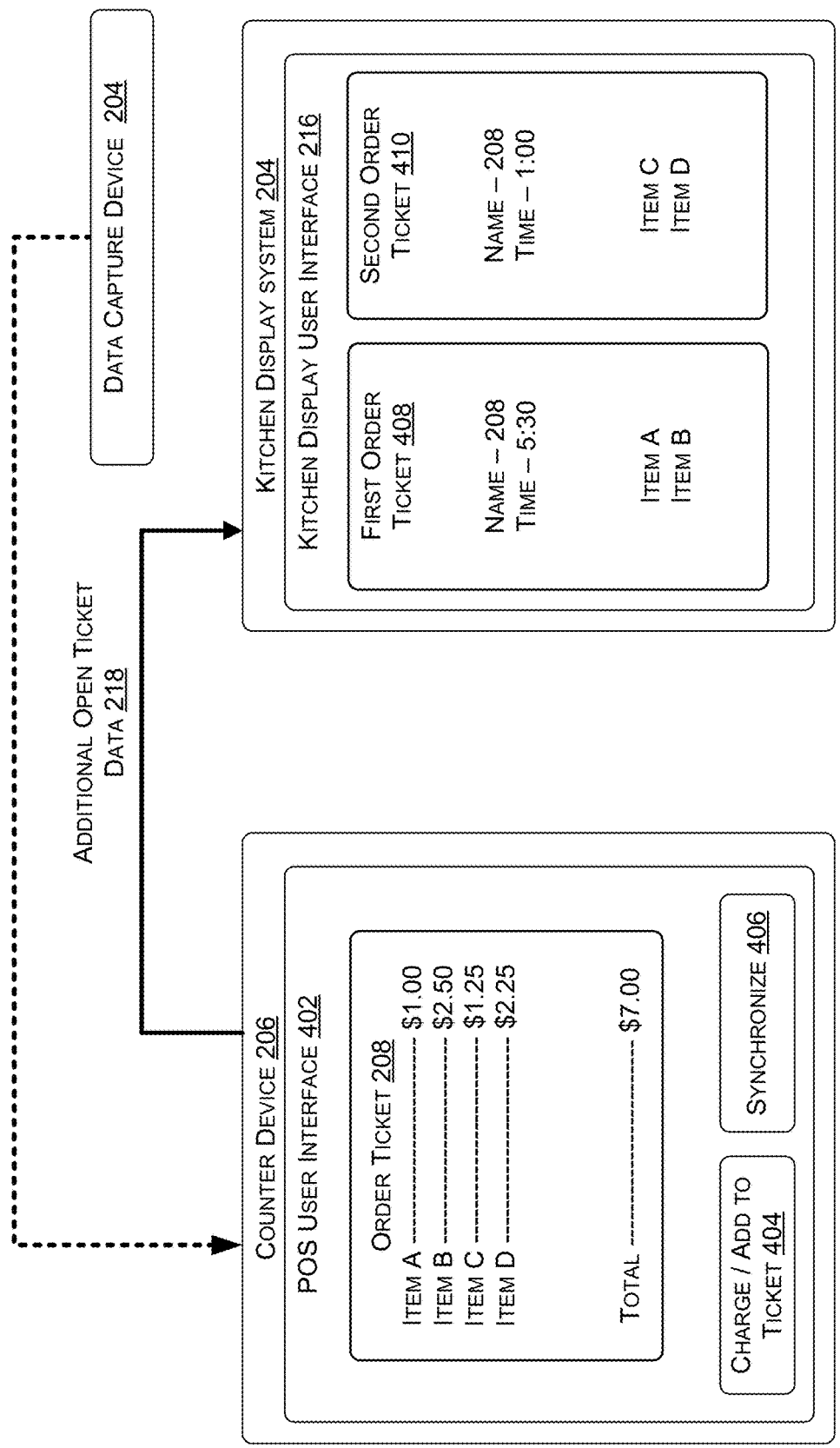

FIGS. 4A-4B are example illustrations of synchronizing an order ticket generated on a POS device with a kitchen display system. For instance, the data capture device 202 can provide a POS user interface 402 for inputting customer orders associated with transactions between a merchant and customers. As illustrated in the example illustration of FIG. 4A, the POS user interface 402 includes the order ticket 208, which indicates that two items A-B have been ordered by a customer on the line busting device. The POS interface 402 further includes a charge 404 button that cause the data capture device 202 to process the order ticket 208 for the cost of the order ticket 208, and a synchronize button 406 (e.g., a "Fire button") to synchronize the data capture device 202 with the kitchen display system 204. As described later, the charge button may be disabled or not show up for customers that only qualify for post-pay, i.e., for payment after their orders are prepared and received. This may be provided to speed up the line and incentivize the customer to use the line-busting device. In some cases, a card on file may be used if the customer leaves without paying for the order. Such a card may be obtained by mapping the customer information with a customer device or payment instrument on file, for example when the customer places the order. For example, in one implementation, while the customer is placing the order, the data capture device 202 may identify customer and/or take payment information, based on buyer check-in into a store or an application, or their customer's device identifier, using proximity or device detection techniques. The system may then add the payment information to a payment sequence for server processing. The customers may have to qualify for post-pay, and such determination may be based on customer behavior and transaction history, again obtained through customer information provided directly by the customer, or indirectly through customer devices.

For instance, the data capture device 202 (similar to data capture device 113) can receive input associated with the synchronize button 406. In response, the data capture device 202 can send the kitchen display system 204 initial order ticket data 210 associated with the order ticket 208. The kitchen display system 204 can then receive the initial order ticket data 210 from the data capture device 202 and use the initial order ticket data 210 to create a first order ticket 408 for the order ticket 208. For instance, and as illustrated in the example illustration of FIG. 4A, the first order ticket 408 for the order ticket 208 includes the name of the order ticket 208, a time since the items A-B were ordered by the customer, and indications of the items A-B. The kitchen display system 204 can then provide the first order ticket 408 via the kitchen display user interface 216. In some implementations, the server sends the order ticket 208 to the kitchen displays system 204 after a delay of wait-time, for example based on how busy the kitchen is at the time.

As illustrated in the example illustration of FIG. 4B, after the kitchen display system 204 generates the first order ticket 408, the counter device 206 can receive input corresponding to a second customer order for the transaction between the merchant and the customer. For example, after a customer has moved up in line from a second position to the first position closest to the main POS terminal, the customer may have the opportunity to review their order, such as add or remove items from the original order in the form of an additional input. The input can indicate that the customer is ordering items C-D from the merchant. In response, the POS device can 202 can update the order ticket 208 to include items C-D. Additionally, the data capture device 202 can receive input associated with the synchronize button 406, and send additional order ticket data 218 to the kitchen display system 204 in response.

The kitchen display system 204 can receive the additional order ticket data 218 from the POS device and use the additional order ticket data 218 to create a second order ticket 410 for the order ticket 208. For instance, and as illustrated in the example illustration of FIG. 4B, the second order ticket 410 for the order ticket 208 includes the name of the order ticket 208, a time since the items C-D were ordered by the customer, and indications of the items C-D. The kitchen display system 204 can then provide the second order ticket 410 via the kitchen display interface 216.

It should be noted that, in some examples, the kitchen display system 204 may receive input indicating that the first order ticket 408 is complete before receiving the additional order ticket data 218. In such examples, the kitchen display system 204 can remove the first order ticket 408 from the kitchen display user interface 216. Additionally, after receiving the additional order ticket data 218 and creating the second order ticket 410, the kitchen display system 204 can provide the second order ticket 410 via the kitchen display user interface 216 without providing the first order ticket 408. As shown in both FIGS. 4A and 4B, the requests and underlying data can move from the data capture device to the kitchen display system via the counter device. The time shown on the tickets can indicate the order time (time when the order was received), preparation time (the time it takes to prepare the order), wait-time (time it takes to give the order), and the like.

Figure 5:
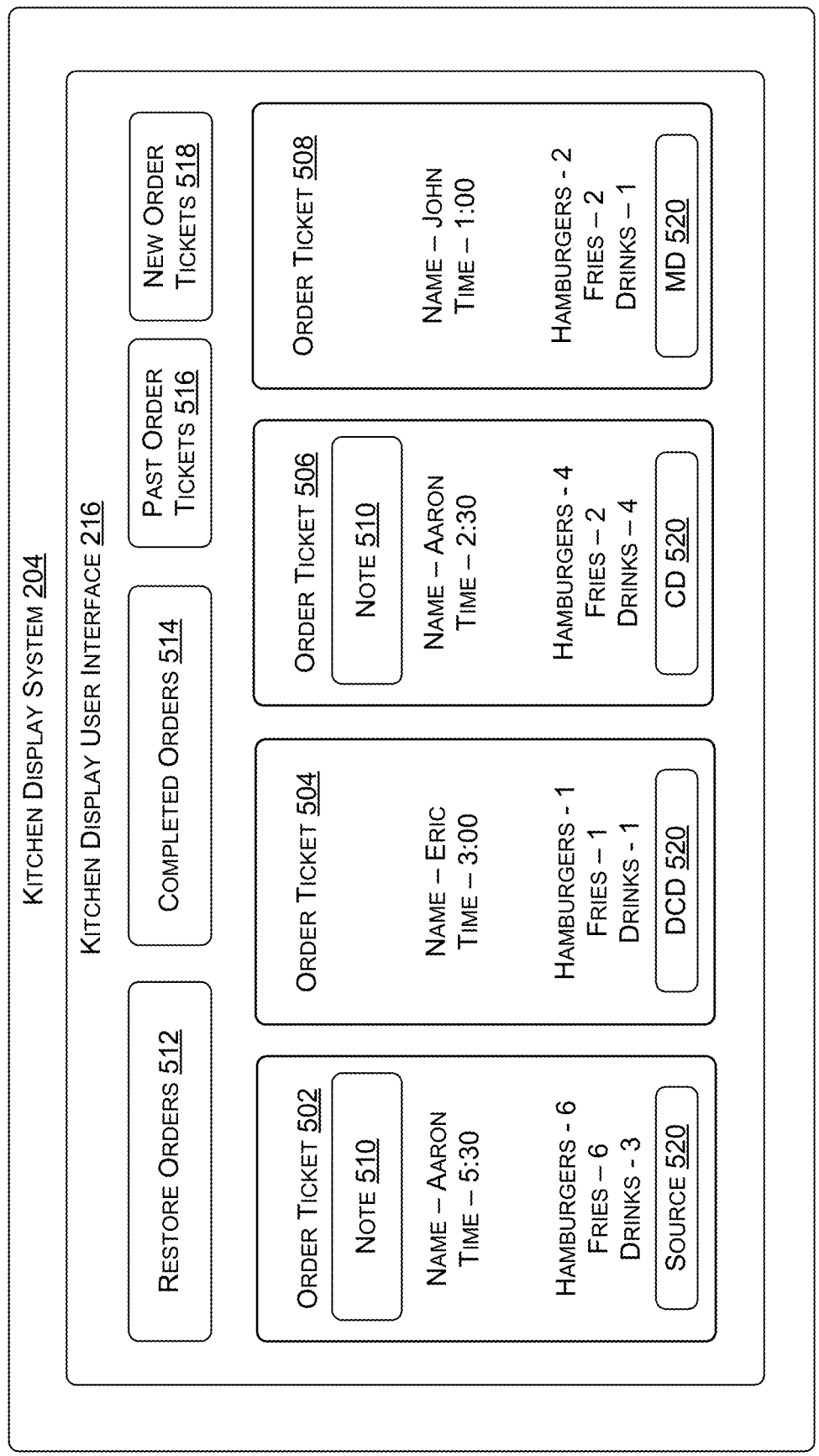
FIG. 5 is an example illustration of a kitchen display system synchronizing order tickets based on order ticket data that the kitchen display system receives from a POS device and the data capture device, according to an embodiment of the present subject matter.

FIG. 5 is an example illustration of a kitchen display system synchronizing order tickets based on order ticket data that the kitchen display system receives from a POS device, such as a counter device or the data capture device. In the example of FIG. 5, the kitchen display system 204 provides four order tickets 502-508 via the kitchen display user interface 216. For instance, the kitchen display user interface 216 includes a first order ticket 502 associated with order ticket "Aaron", an order ticket 504 associated with order ticket "Eric", a second order ticket 506 associated with order ticket "Aaron", and an order ticket 508 associated with order ticket "John". In some examples, the kitchen display system 204 may create each of the open tickets 502-508 using data received from a POS device (e.g., data capture device 202). In this example, Aaron, Eric, and John are waiting to be served at a restaurant. Even though Aaron may have arrived before Eric, the order tickets may be scheduled or reordered in a different sequence as per various contextual factors, such as complexity of their orders, spoilage issues, etc.

In one instance, the kitchen display system 204 may receive, at a first period of time, first data associated with the "Aaron" order ticket. In response, the kitchen display system 204 can then create the first order ticket 502 for the "Aaron" order ticket using the first data. The kitchen display system 204 may then receive, at a second period of time, data associated with the "Eric" open ticket. In response, the kitchen display system 204 can create the order ticket 504 for the "Eric" order ticket using the data associated with the "Eric" open ticket. The kitchen display system 204 may then receive, at a third period of time, second data associated with the "Aaron" open ticket. In response, the kitchen display system 204 can create the second order ticket 506 for the "Aaron" order ticket using the second data, along with a time stamp of when the order was received. Finally, the kitchen display system 204 may then receive, at a fourth period of time, data associated with the "John" open ticket. In response, the kitchen display system 204 can create the order ticket 508 for the "John" order ticket using the data associated with the "John" open ticket.

In the example of FIG. 5, both the order ticket 502 and order ticket 506 are associated with the order ticket "Aaron". As such, in some examples, the kitchen display system 204 can add similar information (e.g., note 510) to each of the order ticket 502 and the order ticket 506. For instance, at the first period of time, the kitchen display system 204 can receive the first data associated with the order ticket "Aaron". The first data can include both information associated with a first customer order (e.g., first items order by the customer) and specific information associated with the customer. In some examples, the specific information can include a note 510 (e.g., special request) made by the customer. The kitchen display system 204 can then create the order ticket 502 using the first data, where the order ticket includes the note 510.

Later, at the second period of time, the kitchen display system 204 can receive the second data associated with the order ticket "Aaron". In some examples, the second data can include information associated with a second customer order (e.g., second items ordered by the customer), however, the second data may not include the specific information associated with the customer. The kitchen display system 204 can then create the order ticket 506 associated with the order ticket "Aaron" using the second data. Additionally, the kitchen display system 204 can identify that the order ticket 502 is also associated with the order ticket "Aaron", and that the order ticket 502 includes the note 510. Based on identifying that the order ticket 502 includes the note 510, the kitchen display system 204 can add the note 510 to the order ticket 506.

In the example of FIG. 5, the kitchen display user interface 516 further includes a restore orders button 512, a completed orders button 514, a past order tickets button 516, and a new order tickets button 520. The merchant can utilize the restore order button 512 to restore an order ticket and/or an item included in an order ticket that the merchant previously completed. For instance, the kitchen display system 204 may receive first input indicating that the order ticket 502 is complete and based on the first input, remove the order ticket 502 from the kitchen display user interface 216. The kitchen display system 204 may then receive second input associated with the restore orders button 512. Based on receiving the second input, the kitchen display system 204 can add the order ticket 502 back to the kitchen display user interface 216. Additionally, in some examples, the kitchen display system 204 adds an indication with the order ticket 502 that the order ticket 502 was restored.

The completed order button 514 can cause the kitchen display system 504 to provide a list of completed order tickets. In some examples, and as described below with regard to FIGS. 8A-8B, the merchant can use the list of completed order tickets to restore one or more completed order tickets.

The merchant can utilize the past order tickets button 516 and the new order tickets button 518 to search through order tickets that are currently in an "in-progress" state on the kitchen display system 204. For instance, the kitchen display system 204 may provide four order tickets 502-508 using the kitchen display user interface 216 at a single time. However, the kitchen display system 204 may include more than four order tickets that are currently in an "in-progress" state. As such, the kitchen display system 204 can receive input associated with the past order ticket button 516 and provide order tickets that have been in the "in-progress" state for a longer period of time based on the input. For instance, the kitchen display system 204 can advance through the order tickets to provide older order tickets that include the "in-progress" state. Additionally, the kitchen display system 204 can receive input associated with the new order tickets button 518 and provide order tickets that have been in the "in-progress" state for a shorter period of time based on the input. For instance, the kitchen display system 204 can advance through the order tickets to provide newer order tickets that include the "in-progress" state.

It should be noted that, in some examples, the kitchen display system 204 may cause the past order tickets button 516 and/or the new order tickets button 518 to provide an alert for the merchant. In some examples, the alert can include changing the color (e.g., from blue, to orange, to red) of the past order tickets button 516 and/or the new order tickets button 518. In some examples, the alert can include the past order tickets button 516 and/or the new order tickets button 518 blinking a given color (e.g., red).

For instance, an order ticket on the kitchen display user interface 216 may include a first color (e.g., green) based on the time of the order ticket being within a first timing threshold (e.g., 0:00 minutes to 5:00 minutes). Additionally, the order ticket may include a second color (e.g., orange) based on the time of the order ticket being within a second timing threshold (e.g., 5:00 minutes to 10:00 minutes). Furthermore, the order ticket may include a third color (e.g., red) based on the time of the order ticket being over a third threshold (e.g., 10:00 minutes). As such, when an order ticket is within the second threshold and/or over the third threshold, and not currently being displayed via the kitchen display user interface 216, the kitchen display system 204 can cause the past order tickets button 516 and/or the new order tickets button 518 to alert the merchant about the order ticket.

As shown, the order tickets may also indicate the source 520 of the ticket, i.e., the device using which the order was created. For example, order ticket 504 may have been created at a data capture device, order ticket 506 may have been created or re-created at a counter device, while the order ticket 508 may be created both at the data capture device and the counter device, such that the hamburgers may have been ordered at the data capture device while the fries and drinks at the counter device when the customer was getting ready to pay for the order.

Figure 6:
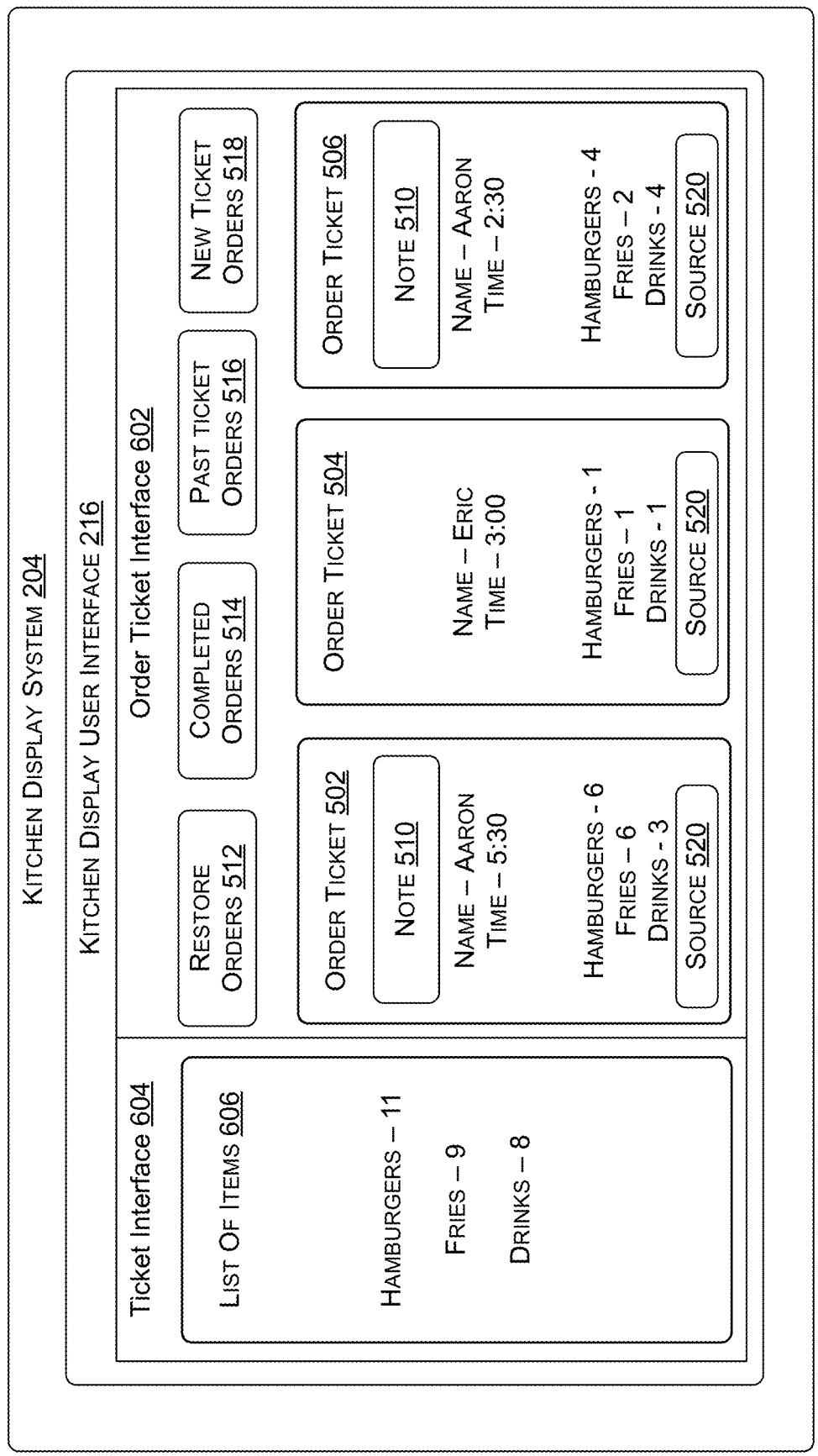
FIG. 6 is an example illustration of a data capture device that provides an interface to create order tickets from customers standing in line, according to an embodiment of the present subject matter.

FIG. 6 is an example illustration of a kitchen display system that provides an in flight interface associated with order tickets. In the example of FIG. 6, the kitchen display system 204 is providing a kitchen display user interface 216 that includes both an order ticket interface 602 and an in flight interface 604. The order ticket interface 602 can include one or more order tickets 502-506 that are currently in an "in-progress" state. For instance, each of the order tickets 502-506 includes items (e.g., hamburgers, fries, and drinks) that are in-progress of being prepared by the merchant. For example, the order ticket 502 includes six hamburgers, six fries, and three drinks that are in-progress of being prepared, the order ticket 504 includes one hamburger, one fry, and one drink that are in-progress of being prepared, and the order ticket 506 includes four hamburgers, two fries, and four drinks that are in-progress of being prepared.

The in flight interface 604 can include a list of items 606 from the order tickets 502-506 that are currently in-progress of being prepared. For instance, the list of items 606 for the order tickets 502-506 includes eleven hamburgers, nine fries, and eight drinks that are in-progress of being prepared. In one implementation, the status of the items in the in flight interface 604 may be used to determine the firing condition for pending orders. For example, if the hamburgers and fries are being prepared, it is easier to take another order of fries since the oil will be hot. In one implementation, the server applies machine learning models on the order queue to determine whether to receive certain orders, receive orders but after a delay, receive orders but delay the preparation, and so on.

In some examples, the kitchen display system 204 generates the list of items 606 by identifying items from the open tickets 502-506 that in-progress of being prepared, determining an item category for each of the identified items, and then combining the identified item based on the items categories. For instance, in the example of FIG. 6, the kitchen display system 204 can identify that the order ticket 502 includes fifteen items that are in-progress of being prepared, and determine that the fifteen items include six items in the item category "hamburgers", six items in the item category "fries", and three items in the item category "drinks". The kitchen display system 204 can further identify that the order ticket 504 includes three items that are in-progress of being prepared, and determine that the three items include one item in the item category "hamburgers", one item in the item category "fries", and one item in the item category "drinks". Finally, the kitchen display system 204 can identify that the order ticket 506 includes ten items that are in-progress of being prepared, and determine that the ten items include four items in the item category "hamburgers", two items in the item category "fries", and four items in the item category "drinks".

The kitchen display system 204 can then combine the items from order tickets 502-506 based on the item categories (e.g., the item category "hamburgers", the item category "fries", and the item category "drinks") in order to generate the list of items 606. For instance, the kitchen display system 204 can generate the list of items 606 to include twenty-eight items that are in-progress of being prepared, where eleven items are in the item category "hamburgers", nine items are in the item category "fries", and eight items are in the item category "dinks". After generating the list of items 606, the kitchen display system 204 can provide the list of items via the in flight interface 604 of the kitchen display user interface 216.

In some examples, the kitchen display system 204 can rank items included in the list of items 606. For instance, in some examples, the kitchen display system 606 can rank the items included in the list of items 606 based on the item categories (e.g., the item category "hamburgers", the item category "fries", and the item category "drinks"). In some examples, the kitchen display system 606 can rank the items included in the list of items 606 based on a number of items included in each item categories from the item categories. For instance, the kitchen display system 606 can place the item category with the greatest number of items first, the item category with the second greatest number of items second, and so forth in descending order. In some examples, the kitchen display system 204 can rank the items included in the list of items 606 based on preparation times associated the items. For instance, the list of items 606 can include items that include the longest preparation time first, items that include the second longest preparation time second, and so forth in descending order.

In some examples, the kitchen display system 204 can update the list of items 604 based on receiving updates to the order tickets 502-506. For example, the kitchen display system 204 can receive input indicating that the order ticket 502 is complete. Based on the input, the kitchen display system 204 can remove the order ticket 502 from the order ticket interface 602. The kitchen display system 204 can further update the list of item 606 based on the items from the order ticket 502 being complete. For instance, the kitchen display system 204 can update to the list of items 606 to include five items in the item category "hamburgers", three items in the item category "fries", and five items in the item category "drinks".

For another example, the kitchen display system 204 can receive input indicating that one or more items from an order ticket 502-506 are complete. The kitchen display system 204 can then update the list of items 606 based on the input. For instance, the kitchen display system 204 can receive input indicating that three of the hamburgers from the order ticket 502 are complete. Based on the input, the kitchen display system 204 can update the order ticket 502 such that the order ticket 502 includes three items in the item category "hamburgers". Additionally, the kitchen display system 204 can update the list of item 606 such that the list of items 606 includes eight items in the item category "hamburgers", three nine in the item category "fries", and eight items in the item category "drinks".

In some examples, the kitchen display system 204 can update the list of items 606 based on receiving data from other merchant devices. For instance, the kitchen display system 204 can receive data indicating that the order ticket 502 is complete from a counter device (e.g., counter device 206). Based on the receiving the data, the kitchen display system 204 can remove the order ticket 502 from the order ticket interface 602. The kitchen display system 204 can further update the list of item 606 based on the items from the order ticket 502 being complete. For instance, the kitchen display system 204 can update to the list of items 606 to include five items in the item category "hamburgers", three items in the item category "fries", and five items in the item category "drinks".

Additionally, in some examples, the kitchen display system 204 can receive data indicating that one or more items from an order ticket 502-506 are complete from a counter device. The kitchen display system 204 can then update the list of items 606 based on receiving the data. For instance, the kitchen display system 204 can receive data indicating that three of the hamburgers from the order ticket 502 are complete. Based on receiving the data, the kitchen display system 204 can update the order ticket 502 such that the order ticket 502 includes three items in the item category "hamburgers". Additionally, the kitchen display system 204 can update the list of item 606 such that the list of items 606 includes eight items in the item category "hamburgers", three nine in the item category "fries", and eight items in the item category "drinks."

Moreover, the kitchen display system 204 can receive data associated with an order ticket from a POS device (e.g., data capture device 202). The kitchen display system 204 can then create a new order ticket for the order ticket using the data, and add the created order ticket to the order ticket interface 602. The kitchen display system 204 can then update the list of items 606 based on one or more items within the created order ticket that are in-progress of being prepared. For instance, since the kitchen display system 204 adds a new order ticket to the order ticket interface 602, the kitchen display system 204 updates the list of items 606 by adding each of the items from the new order ticket that are in-progress of being prepared to the list of items 606.

Figure 7A:
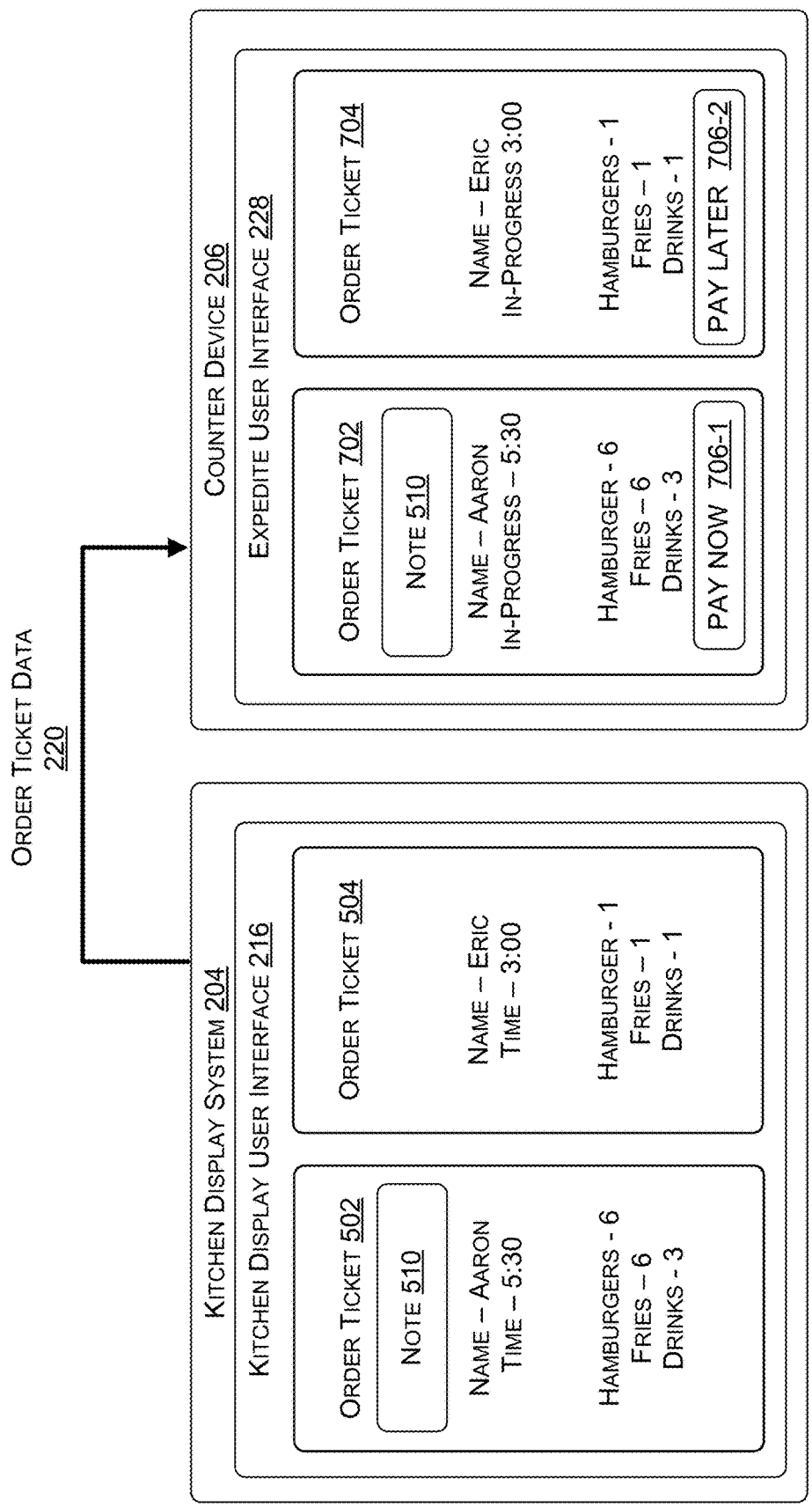
FIGS. 7A-7B are example illustrations of a kitchen display system synchronizing with a counter device, according to an embodiment of the present subject matter.
Figure 7B:
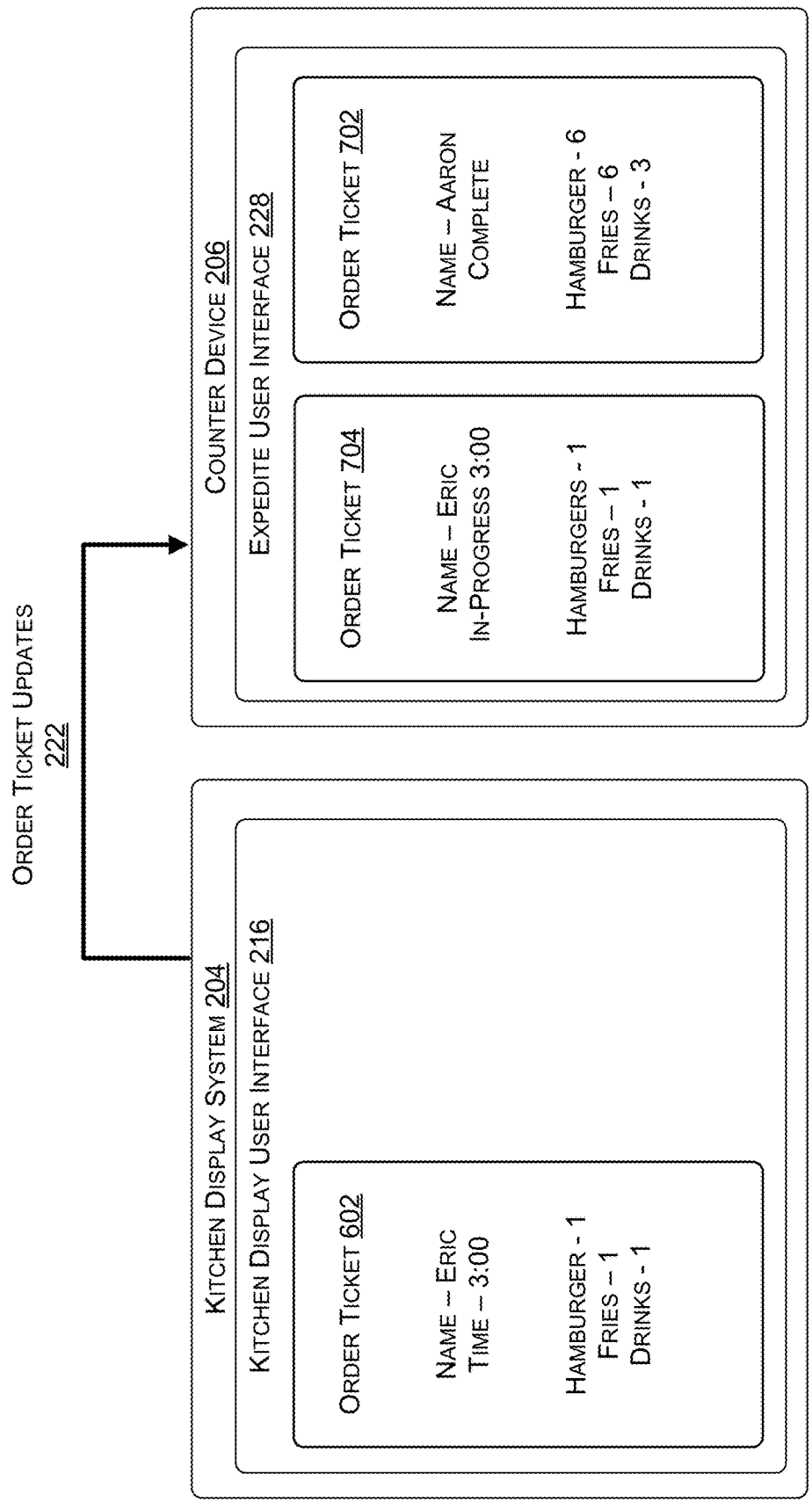

FIGS. 7A-7B are example illustrations of a kitchen display system synchronizing with a counter device. In the example illustration of FIG. 7A, the kitchen display system 204 sends the counter device 206 order ticket data 220 associated with order tickets 502-504. Based on receiving the order ticket data 220 from the kitchen display system 204, the counter device 206 can create order tickets 702-704 using the order ticket data 220. The counter device 206 can then provide the order tickets 702-704 via the expedite user interface 228.

For instance, the counter device 206 can create the order ticket 702 (which is associated with the order ticket 502) using data associated with the order ticket 502 from the order ticket data 220. As such, the order ticket 702 can include one or more of a name of the order ticket that the order ticket 502 was created for, an indication that the order ticket 502 has been in-progress of being prepared for a given time interval (e.g., 5:30), a list of the items from the order ticket 502 that are in-progress of being prepared, or the like. Moreover, the counter device 206 can create the order ticket 704 (which is associated with the order ticket 504) using data associated with the order ticket 504 from the order ticket data 220. As such, the order ticket 704 can include one or more of a name of the order ticket that the order ticket 504 was created for, an indication that the order ticket 504 has been in-progress of being prepared for a given time interval (e.g., 3:00), a list of the items from the order ticket 504 that are in-progress of being prepared, or the like.

In the example illustration of FIG. 7B, the kitchen display system 204 sends the counter device 206 order ticket updates 222 associated with the order ticket 502. For instance, the kitchen display system 204 can receive input indicating that the order ticket 502 is complete. Based on the input, the kitchen display system 204 can remove the order ticket 502 from the kitchen display user interface 216. The kitchen display system 204 can further send the counter device 206 order ticket updates 222 associated with the update to the order ticket 502 (e.g., data indicating that the order ticket 502 is complete). The counter device 206 can receive the order ticket updates 222 from the kitchen display system 204 and update the order tickets 702-704 in response. For instance, as illustrated in FIG. 7B, the counter device 206 updates the order ticket 702 to indicate that the order ticket 502 is complete.

Additionally or alternatively, in some examples, the counter device 206 can send data to the kitchen display system 204. For instance, the counter device 206 can receive input indicating that one or more of the open tickets 702-704 and/or one or more items on one of the open tickets 702-704 is complete. Based on the input, the counter device 206 can synchronize with the kitchen display system 204 by sending the kitchen display system 204 data indicating the updates to open tickets 702-704 (e.g., order ticket updates 230). The kitchen display system 204 can receive the data indicating the updates from the counter device 206 and update the open tickets 502-504 based on the data.

For instance, the counter device 206 can receive input indicating that the order ticket 702 is complete. Based on receiving the input, the counter device can send the kitchen display system 204 data indicating that the order ticket 502 on the kitchen display system 204 is complete. The kitchen display system 204 can receive the data from the counter device 206 and in response, update the kitchen display user interface 216 by removing the order ticket 502 from the kitchen display user interface 216. The notification 510 may also include options that indicate the position of the customer in the line so that the customer knows how fast or slow the line has moved. Further, the payment option on the order ticket may include pay now 706-1 to provide the option of paying when the order is being finalized and sent to the kitchen display system or a pay later 706-2 to provide the option of paying after the order is processed and sent to the customer.

Figure 8A:
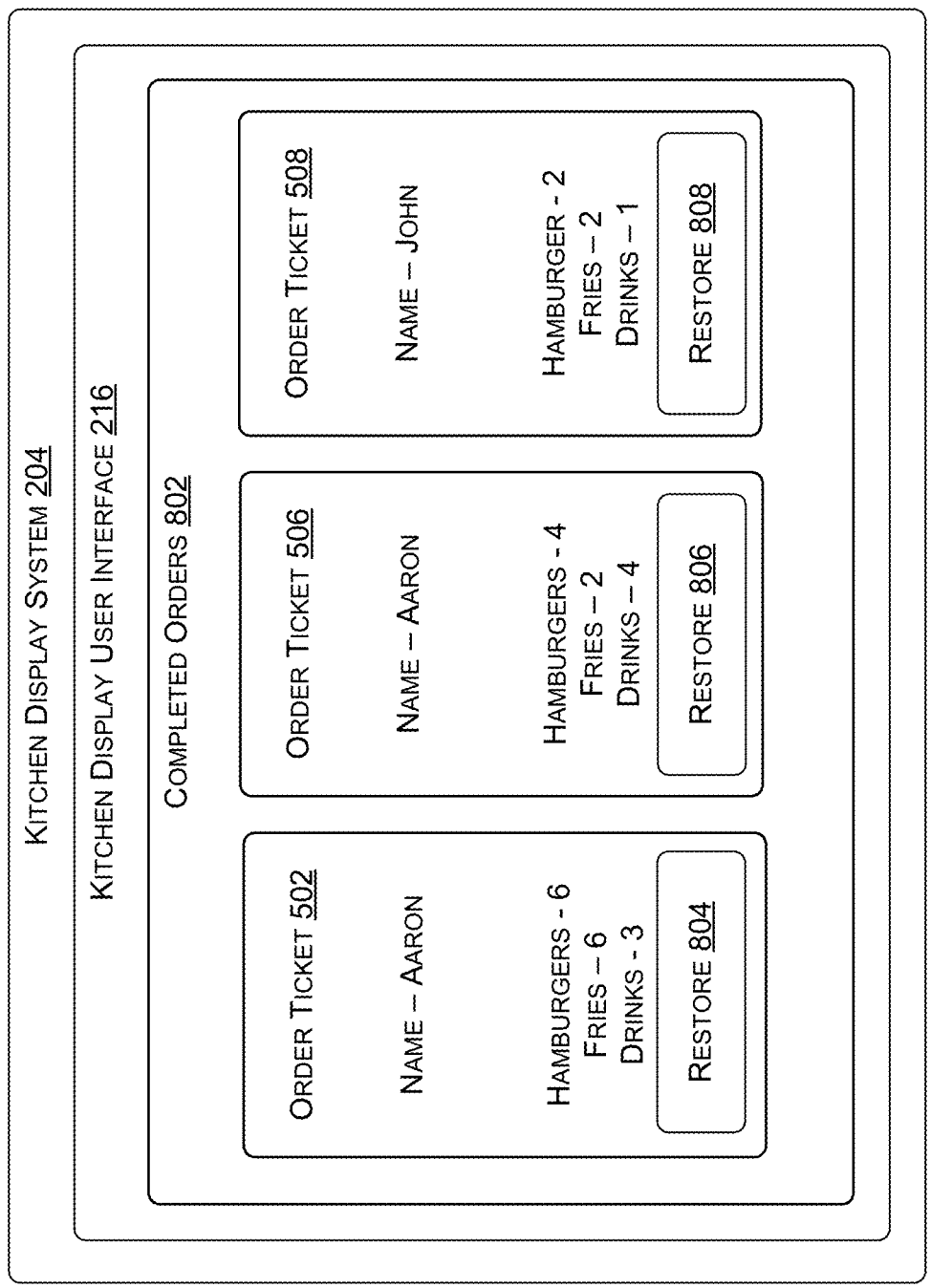
FIGS. 8A-8B are example illustrations of synchronizing restored customer orders between a kitchen display system and a counter device, according to an embodiment of the present subject matter.
Figure 8B:
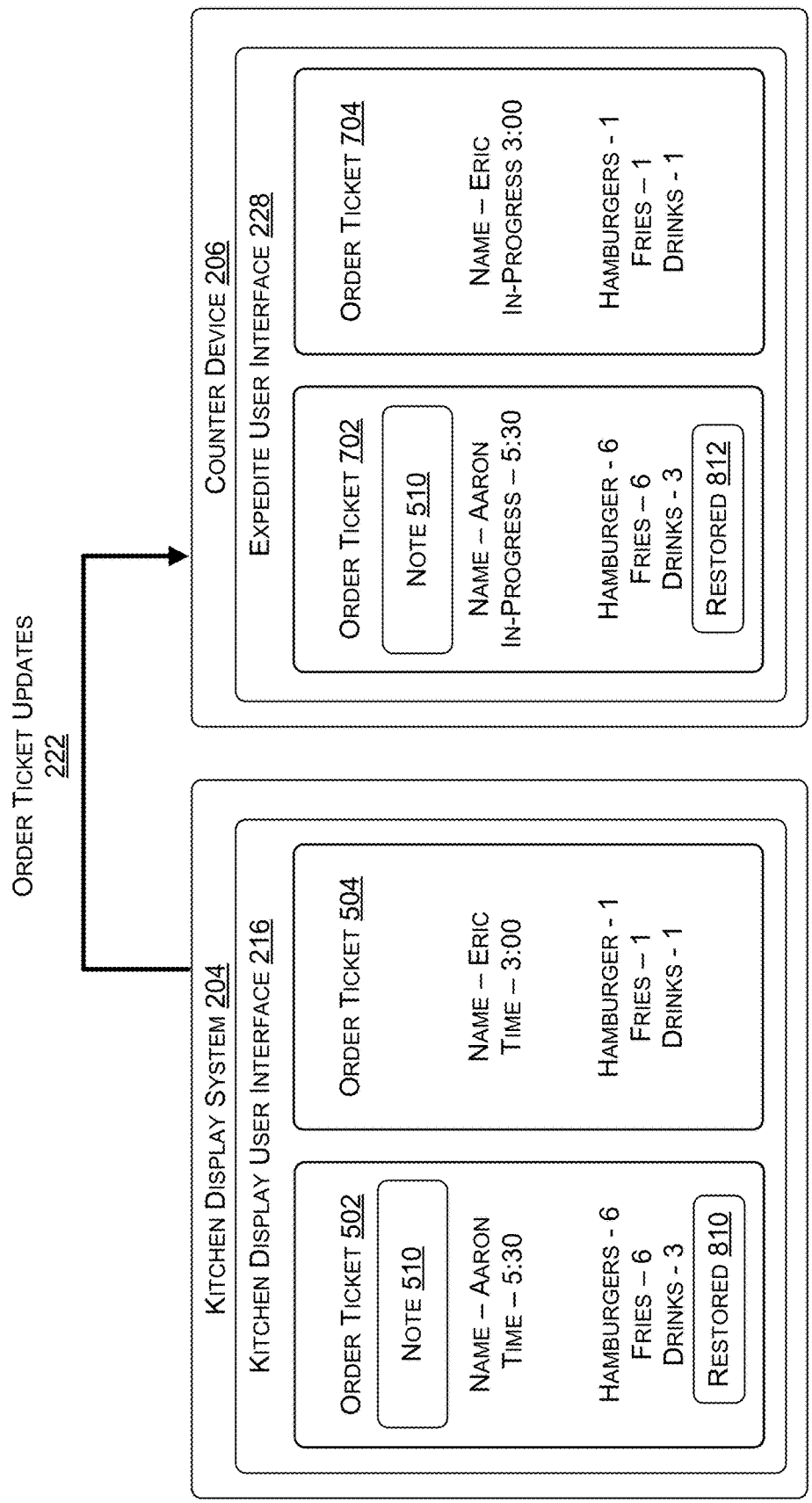

FIGS. 8A-8B are example illustrations of synchronizing restored customer orders between a kitchen display system and a counter device. For instance, in the example illustration of FIG. 8A, the kitchen display system 204 can receive input associated with the completed orders button 514 from FIG. 5. Based on the input, the kitchen display system 204 can provide completed orders 802 via the kitchen display user interface 216. In some examples, the completed orders 802 can include one or more order tickets 502, 506, and 508 that are now in "a complete" state. For instance, each of the order tickets 502, 506, and 508 may have previously been completed by the merchant.

A merchant can utilize the completed orders 802 to restore one or more of the order tickets 502, 506, and 508. For instance, in some examples, the merchant can select the restore button 804 to restore the order ticket 502, select the restore 806 button to restore the order ticket 506, and select the restore button 808 to restore the order ticket 508. In some examples, the restore buttons 804-808 will allow the merchant to restore only one or more items from the order tickets 502, 506, and 508, respectively. For instance, the merchant can utilize the restore button 804 to restore one or more hamburgers, fries, or drinks from the order ticket 502.

In the example illustrated in FIG. 8B, the kitchen display system 204 received input associated with the restore button 804 for the order ticket 502. Based on the input, the kitchen display system 204 can provide the order ticket 502 via the kitchen display user interface 216. In some examples, the kitchen display system 204 can further provide an indication that the order ticket 502 is restored 810. The kitchen display system 204 can then send the counter device 206 order ticket updates 222 associated with restoring the order ticket 502.

The counter device 206 can receive the order ticket updates 222 from the kitchen display system 204. Using the order ticket updates 222, the counter device 206 can update the order ticket 702 to include an indication that the order ticket 702 was restored 812. Additionally, the counter device 206 can further update the order ticket 702 with an indication that the order ticket has been in-progress for a given time period (e.g., 5:30).

It should be noted that, in some examples, the counter device 206 may provide completed order to the merchant for restoring. For instance, the counter device 206 can receive input indicating that an order ticket 702-704 that was previously completed should be restored, update the expedite user interface 228 based on the input, and send data associated with the update (e.g., order ticket updates 230) the kitchen display system 204. The kitchen display system 204 can then receive the data from the counter device 206 and based on the data, update the kitchen display user interface 216 with the restored order ticket.

Figure 9:
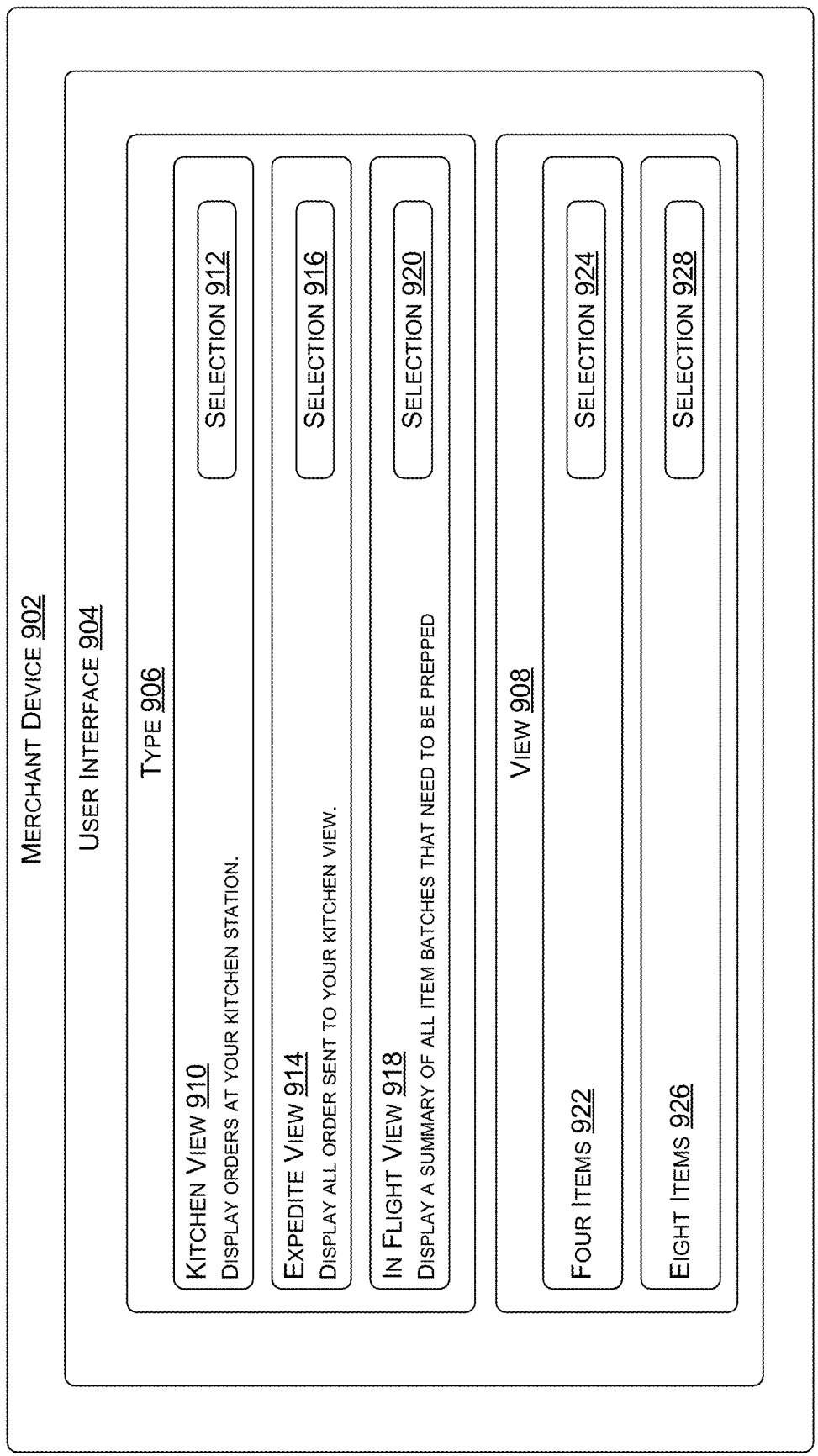
FIG. 9 is an example illustration of a merchant device providing a user interface for selecting a functionality type for the merchant device, according to an embodiment of the present subject matter.

FIG. 9 is an example illustration of a merchant device providing a user interface for selecting a functionality type for the merchant device. In the example of FIG. 9, the merchant device can represent one of the merchant device(s) 108. In some examples, the merchant device 902 provides a user interface 904 for selecting both a type 906 of merchant device and a view 908 that is based on the type 906 of merchant device.

For instance, a merchant can select the kitchen view 910 using the selection button 912. The kitchen view 910 can cause the merchant device 902 to function similar to the kitchen display system 204 by displaying order tickets (e.g., order ticket 502-508) to the merchant via a kitchen display user interface (e.g., kitchen display user interface 216). The merchant can further select the expedite view 914 using the selection button 916. The expedite view 914 can cause the merchant device 902 to function similar to the counter device 206 by displaying order tickets (e.g., order tickets 702-704) to the merchant via an expedite user interface (e.g., expedite user interface 228). Additionally, the merchant can select the in flight view 918 using the selection button 920. The in flight view 918 can cause the merchant device 902 to function similar to the kitchen display system 204 by displaying both order tickets (e.g., order tickets 502-508) in an order ticket interface (e.g., order ticket interface 602) and a list of items (e.g., list of items 606) in an in flight interface (e.g., in flight interface 604) of a kitchen view user interface (e.g., kitchen view user interface 216).

The merchant can further select a view 908 that includes four items 922 using the selection button 924. The four items 922 view can cause the merchant device 902 to display four order tickets (e.g., order tickets 502-508 or order tickets 702-704) at a single time. Additionally, the merchant can select a view 908 that includes eight items 926 using the selection button 928. The eight items 926 view can cause the merchant device 902 to display eight order tickets (e.g., order tickets 502-508 or order tickets 702-704) at a single time.

It should be noted that, in some examples, the user interface 904 can include more than two different views 908 for selection. For instance, in some examples, the user interface 904 can include fewer and/or additional views 908 for selection by the merchant, where each of the views 908 includes a different number of items. For instance, the user interface 904 can include views 908 for one item, two items, nine items, or the like. Additionally, in some examples, the user interface 904 may include an input box where the merchant can input a number of items to include with respect to the view 908.

FIG. 10 is an example illustration of merchant devices providing various layouts for order tickets. In the example of FIG. 10, the merchant device 1002 and the merchant device 1004, which may each correspond to one of merchant device(s) 108, provide different layouts for order tickets. For instance, the merchant device 1002 provides a user interface 1006 that includes a layout of four order tickets 1008(1)-(4). Additionally, merchant device 1004 provides a user interface 1010 that includes a layout of eight order tickets 1008(1)-(8). In some examples, as illustrate in the example of FIG. 10, the order tickets 1008(1)-(8) can include a grid pattern. However, in some examples, the order tickets 1008(1)-(8) can include various patterns as selected by the merchant (e.g., a circular pattern). Furthermore, each of the order tickets may be associated with a dynamic code, such as a QR code or barcode, that may be used to track the status of the order at any point in time. Therefore, as the order moves from one kitchen station to another, the merchant may scan the barcode at each station so as to let the kitchen display system know the order status and location in real-time. The barcode, along with order ticket, may also be printed on a customer receipt so the customers can also track the order status. The customer can also provide a phone number to receive notifications of the order status on their mobile device or any other device associated with them. In some cases, where the order tickets are printed on pre-barcoded notepads, for example for handwritten orders, the order tickets can be ingested into the kitchen display system 204 by scanning or taking pictures of the order tickets.

Figure 11A:
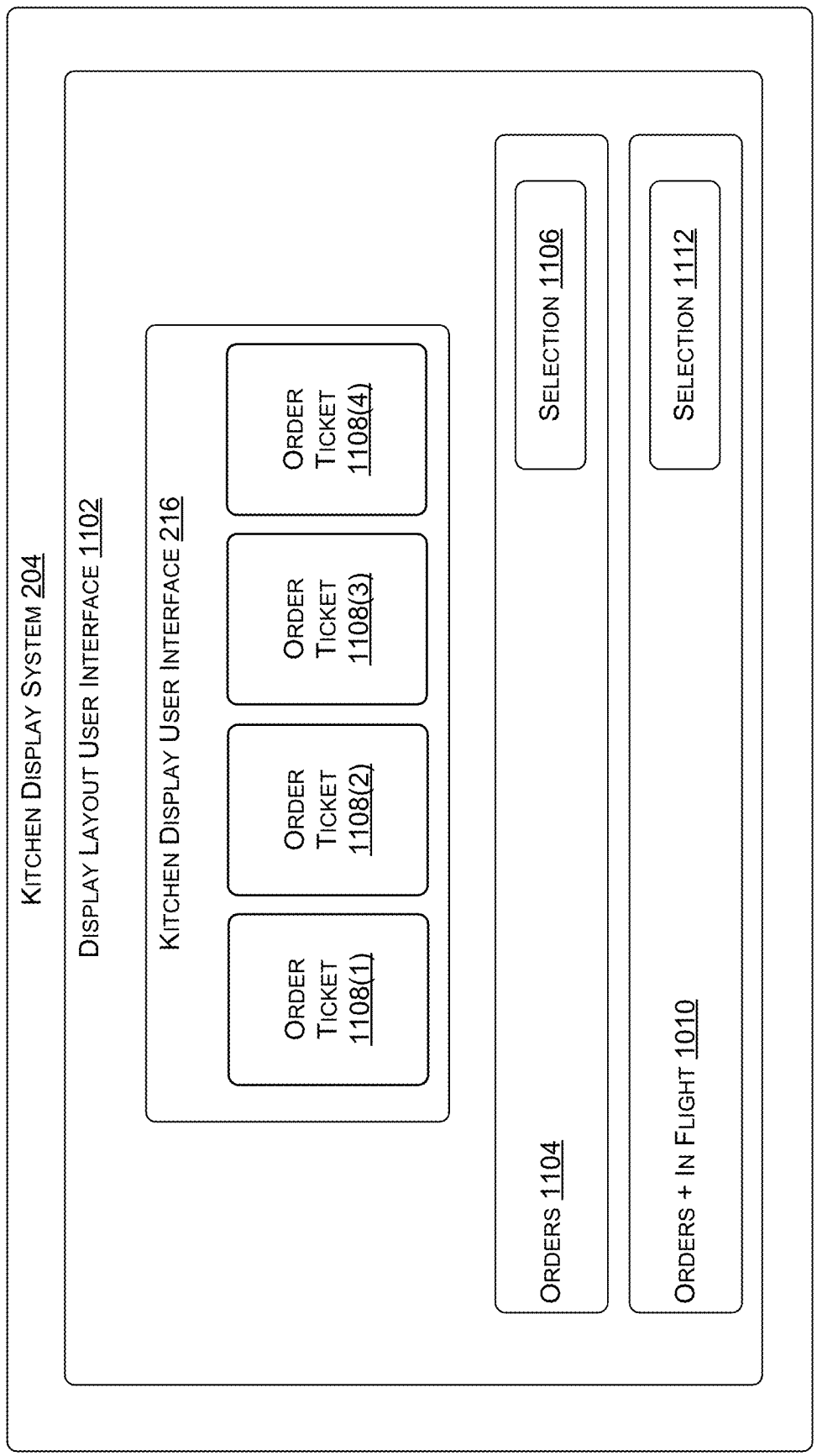
FIGS. 11A-11B are example illustrations of a kitchen display system providing a user interface for selecting a kitchen display configuration, according to an embodiment of the present subject matter.
Figure 11B:
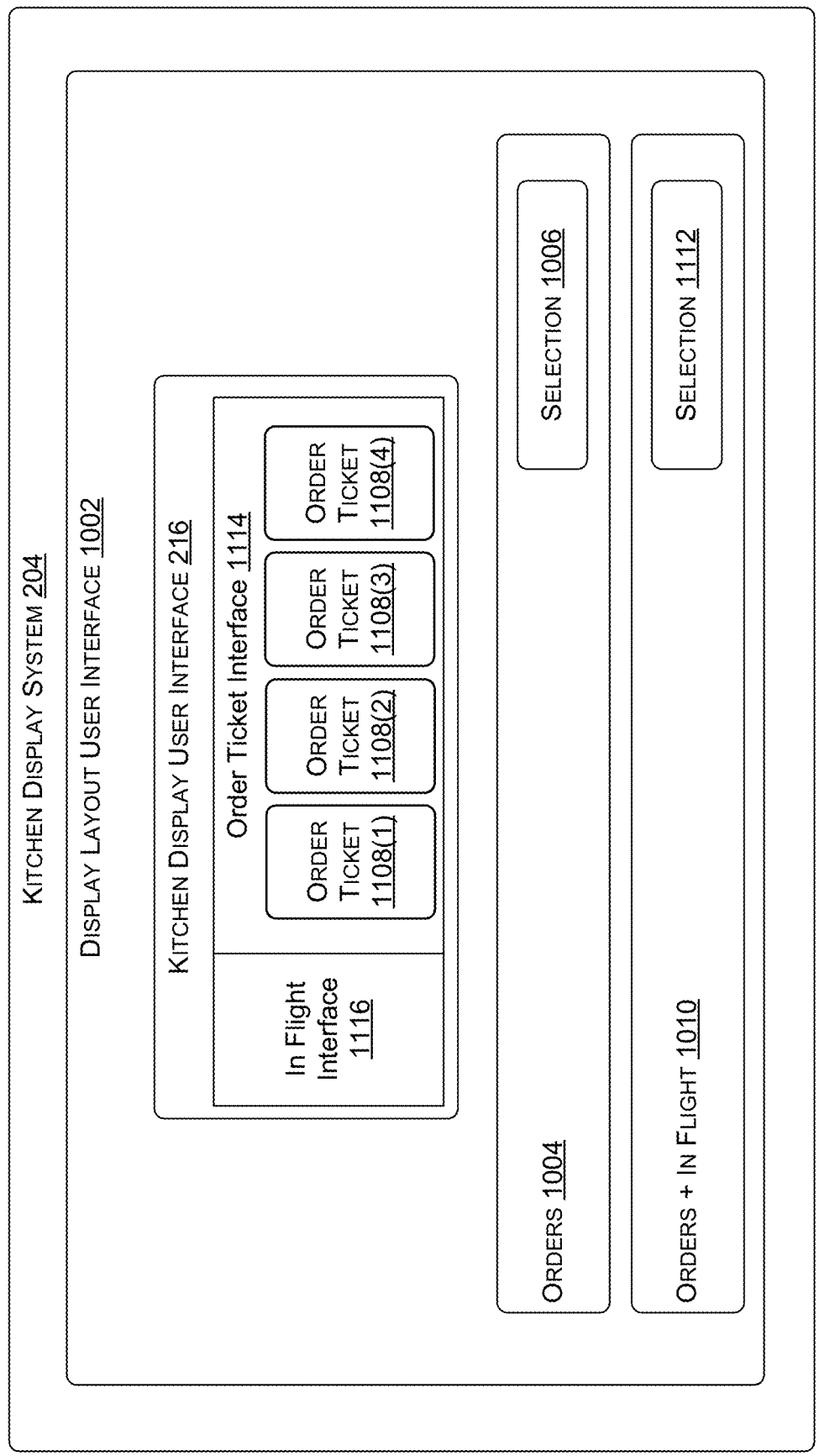

FIGS. 11A-11B are example illustrations of a kitchen display system providing a user interface for selecting a kitchen display configuration. For instance, in the example illustration of FIG. 11A, the kitchen display system 204 includes a display layout user interface 1102 for selecting the layout of the kitchen display user interface 216. For instance, the merchant can select orders 1104 using the selection button 1106. By selection orders 1104, the kitchen display user interface 216 only provides the order tickets 1108(1)-(4) to the merchant.

In the example illustration of FIG. 11B, the merchant can use the display layout user interface 1002 to select orders+in flight 1010 using the selection button 1012. By selecting orders+in flight 1010, the kitchen display user interface 216 provides both the order ticket interface 1114 and the in flight interface 1116, which can respectively represent the order ticket interface 602 and the in flight interface 604.

Figure 12:
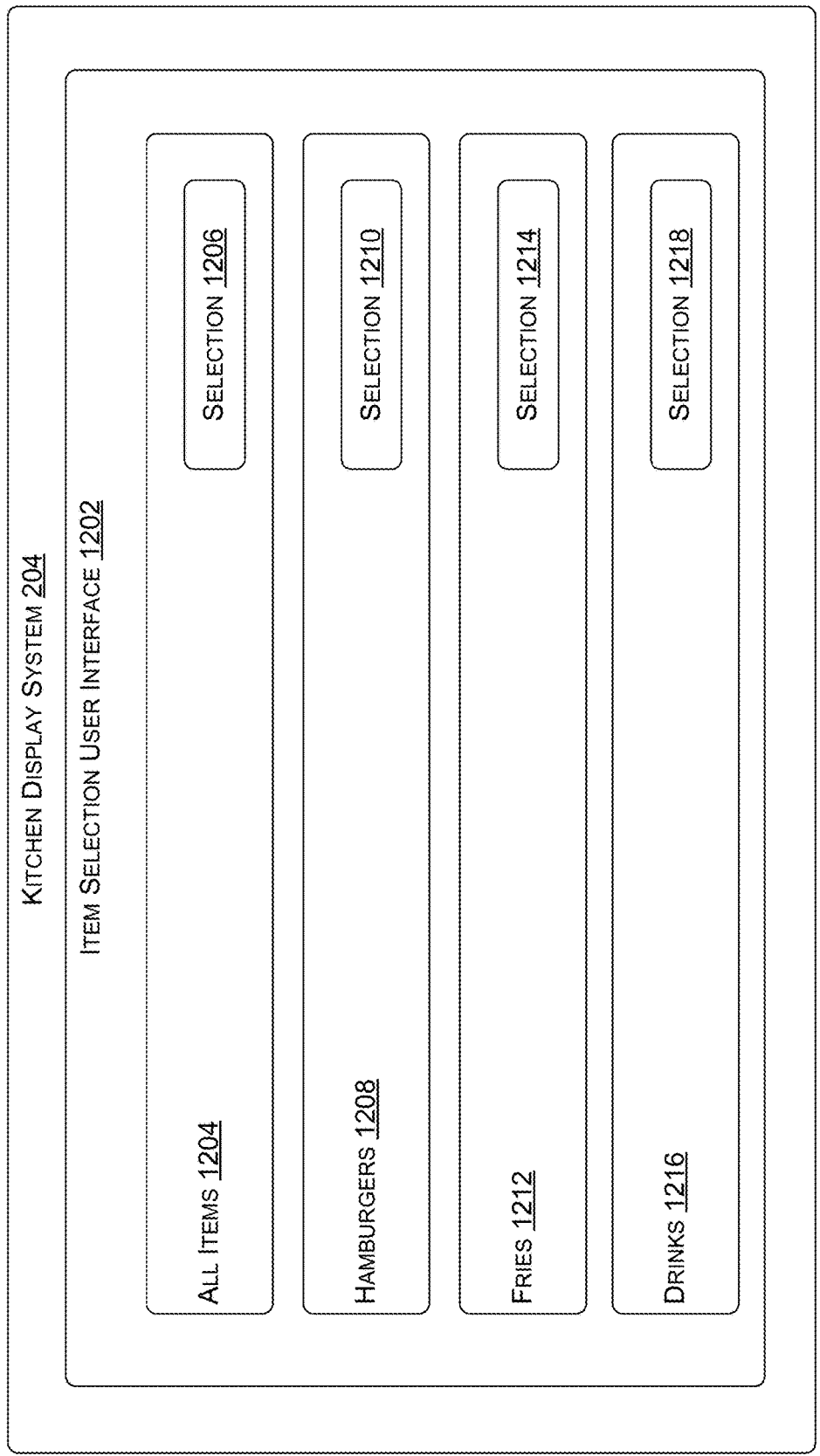
FIG. 12 is an example illustration of a kitchen display system providing a user interface for selecting a type of station associated with the kitchen display system, according to an embodiment of the present subject matter.
Figure 13A:
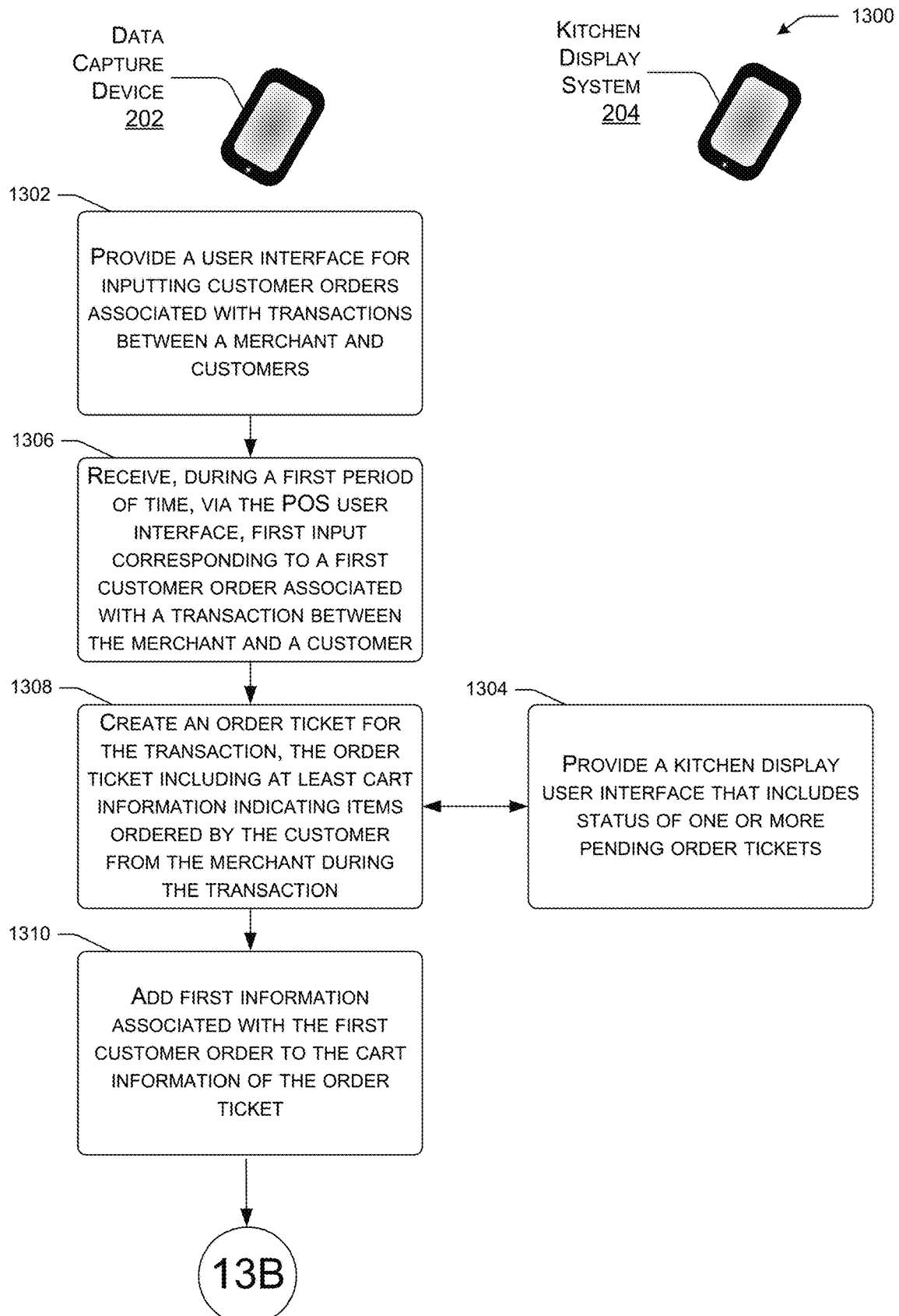
FIGS. 13A-13E are flow diagrams illustrating an example process for synchronizing order ticket functionality with a kitchen display system, according to an embodiment of the present subject matter.
Figure 13B:
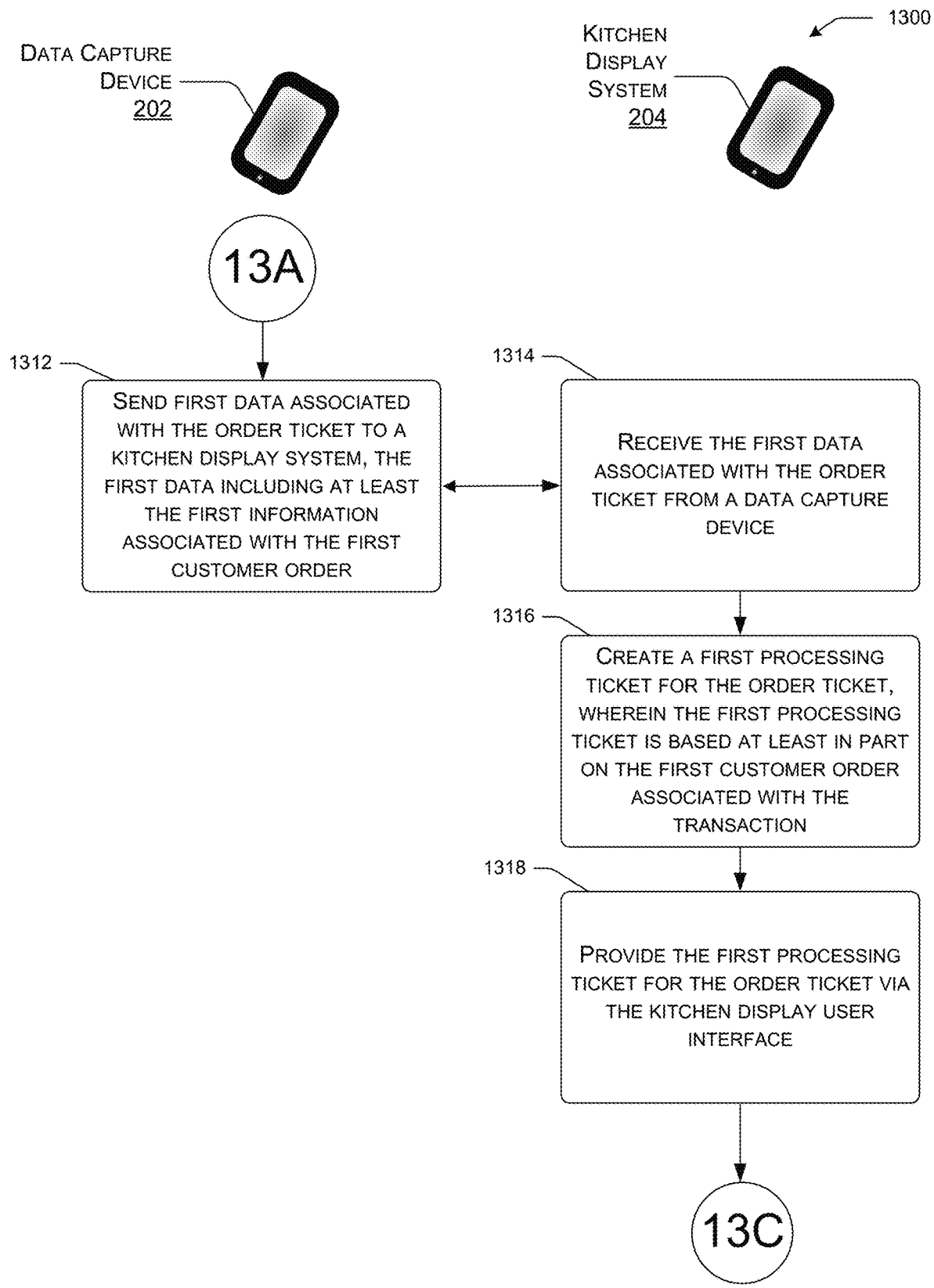
Figure 13C:
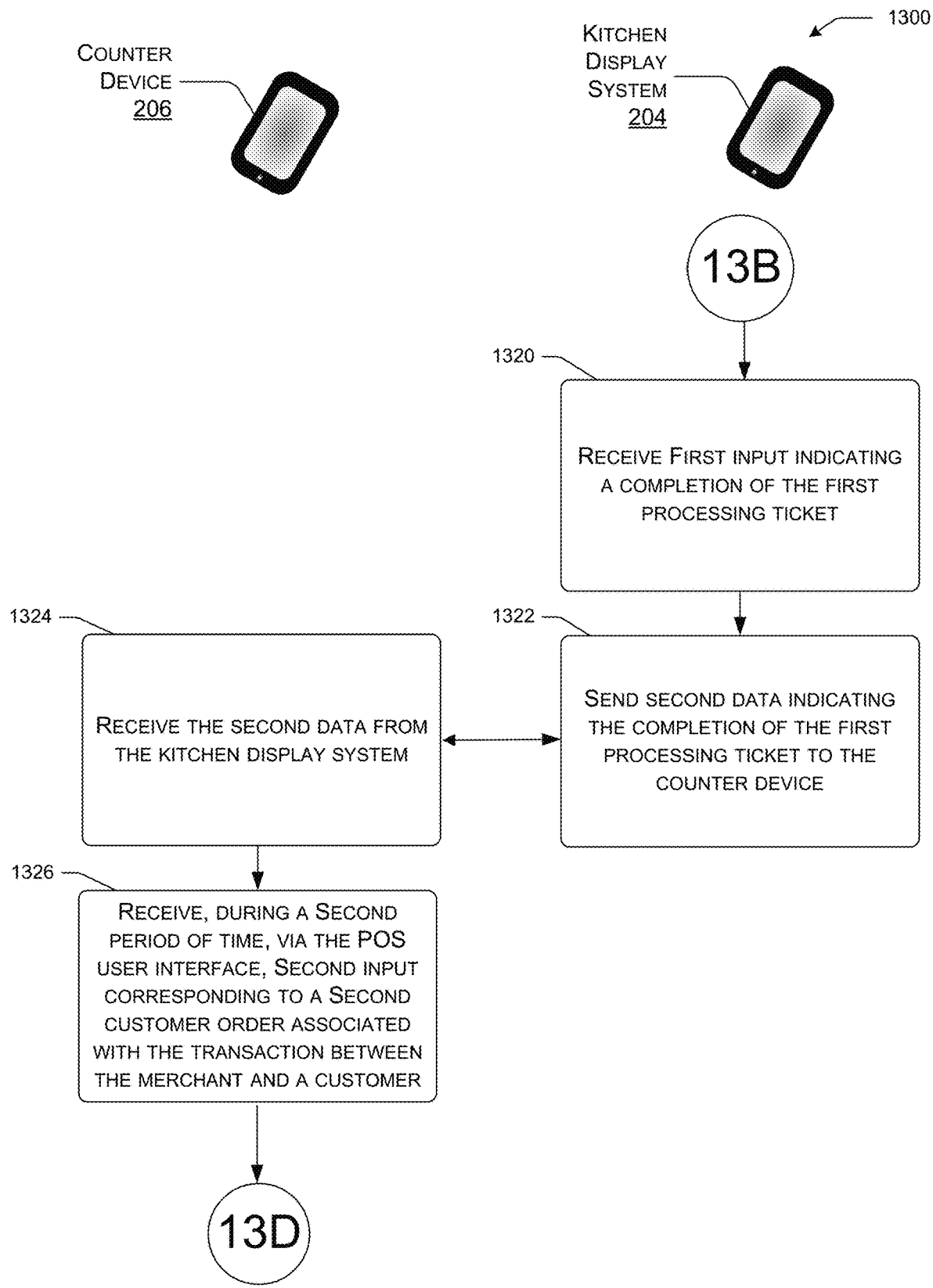
Figure 13D:
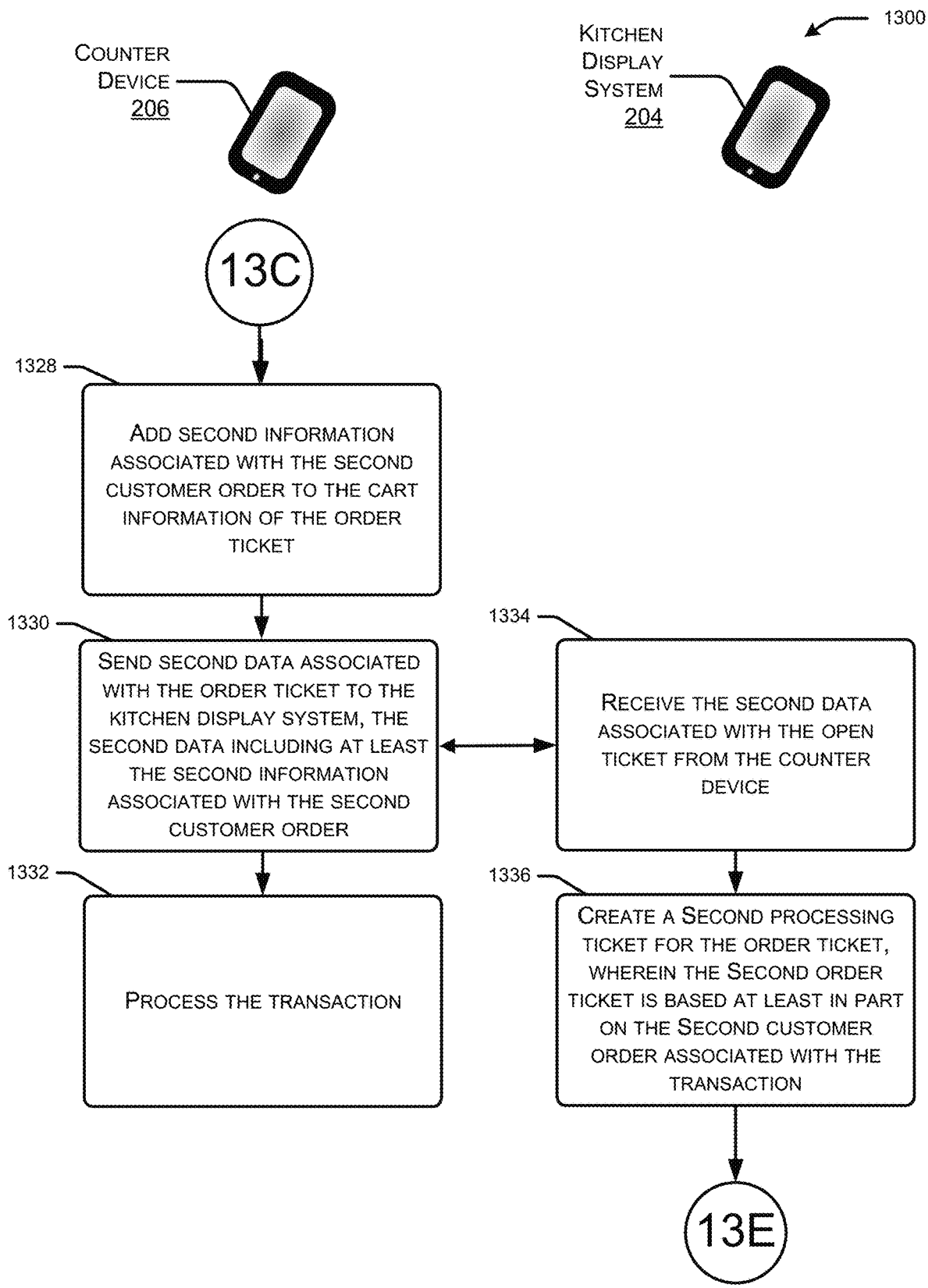
Figure 13E:
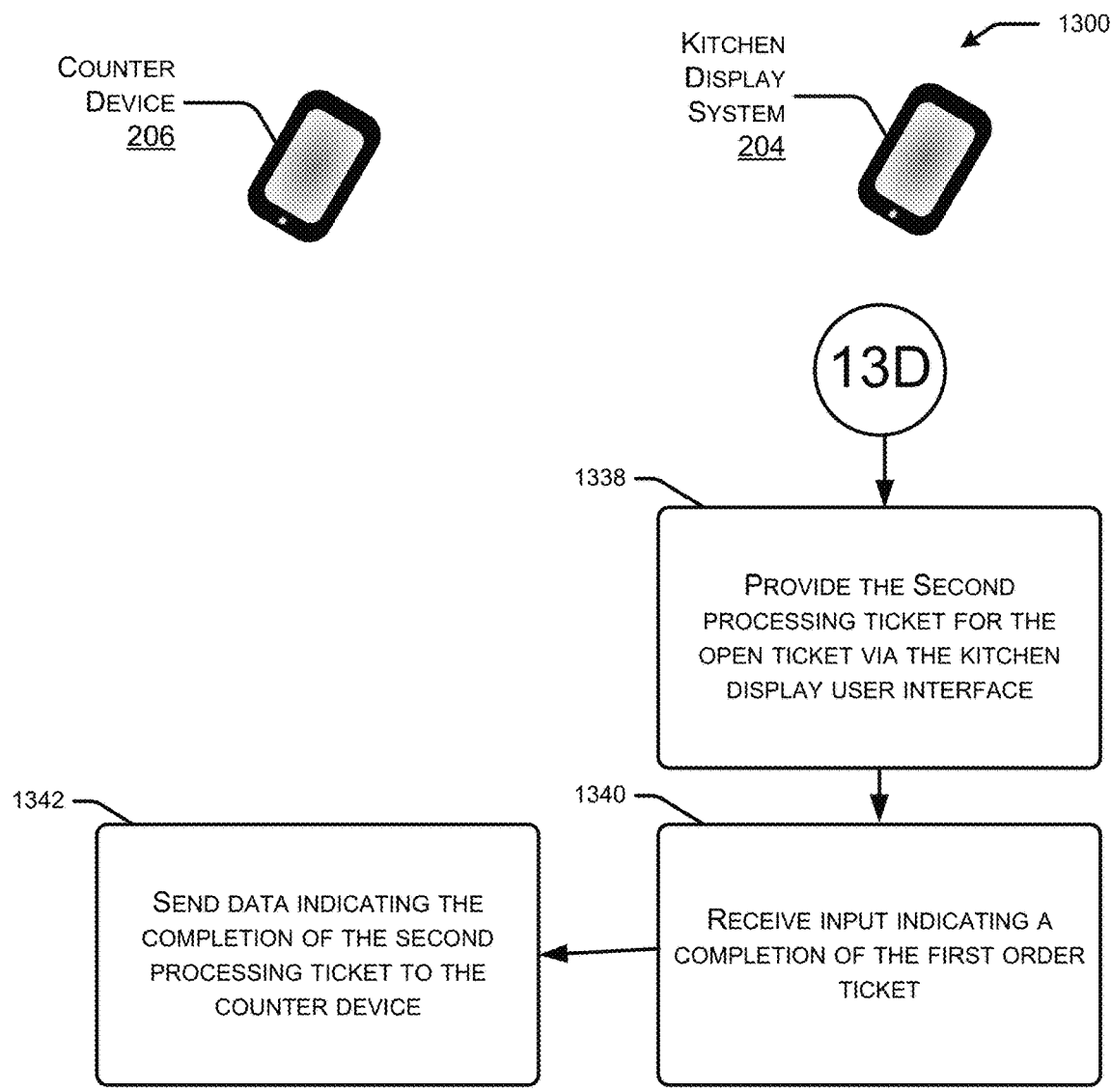

FIG. 12 is an example illustration of a kitchen display system providing a user interface for selecting a type of station associated with the kitchen display system. For instance, in the example of FIG. 12, the kitchen display system 204 provides an item selection user interface 1202 that a merchant can use to select which items order tickets (e.g., order tickets 502-508) include. For instance, the merchant can select the all items 1204 using the selection button 1206, select hamburgers 1208 using the selection button 1210, select fries 1212 using the selection button 1214, and/or select drinks 1216 using the selection button 1218. In some examples, based on selections made by the merchant, kitchen display system 204 will only provide order tickets that include the selected items.

It should be noted that the examples of FIGS. 4A-12 are for illustrative purposes only. In some examples, merchant devices can create order tickets (e.g., order tickets 502-508 and/or 702-704) that include fewer or additional items. Additionally, in some examples, the merchant devices can create order tickets (e.g., order tickets 502-508 and/or 702-704) that include items not illustrated in FIGS. 4A-12. In one implementation, based on the selection of the items at the kitchen display system 204, the server may compute the wait-time for future customers, or present different items to future customers based on inputs received at the kitchen display system 204.

FIGS. 13A-13E are flow diagrams illustrating an example process for synchronizing order ticket functionality with a kitchen display system when orders are being received at a mobile data capture device and/or counter device 206. For the purpose of the illustration, only the interaction between the data capture device 202 and the kitchen display system 204 is shown. The process 1300 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 1300, and other processes described herein, may be performed by a POS device (e.g., data capture device 202 or a capture device 206), a kitchen display system (e.g., kitchen display system 204), by another entity, or by a combination thereof.

At 1302, a data capture device 202 provides a user interface for inputting customer orders associated with transactions between a merchant and customer. For instance, the data capture device 202 can display the user interface via a display device of the device. In some examples, the merchant can use the interface to both input orders associated with transactions between the merchant and customers, and to process the transactions. In one implementation, the data capture device 202 is a mobile device configured to accept orders from customers waiting in line, such that the device 202 accepts orders while counter device 206 processes the transaction by accepting payments from the customers.

At 1304, a kitchen display system 204 provides a kitchen display user interface that includes one or more order tickets. For instance, the kitchen display system 204 can display the kitchen display user interface via a display device of the kitchen display system 204. The kitchen display user interface can include one or more pending order tickets, where each of the one or more order tickets correspond to orders previously placed with the data capture device 202 or counter device 206. In some examples, each of the one or more order tickets are in an "in-progress" state and their progress may be used by the processor to determine the wait time for the orders currently being placed with the data capture device 202, for example in step 1302.

At 1306, the data capture device 202 receives, during a first period of time, via the user interface, first input corresponding to a first customer order associated with a transaction between the merchant and a customer. In some examples, the first customer order includes at least a first item ordered by the customer from the merchant. In some examples, a kitchen of the merchant may prepare the first item for the customer.

At 1308, the data capture device 202 creates an order ticket for the transaction, the order ticket including at least cart information indicating items ordered by the customer from the merchant during the transaction. For instance, the data capture device 202 can create an order ticket data structure that stores information associated with interactions between the merchant and the customer during the transaction. In some examples, the information can include cart information that indicates items ordered by the customer from the merchant during the transaction. Additionally or alternatively, the data capture device 202, through the processor 112, may determine when to fire off the order ticket to the kitchen display system. For this, the processor 112 may apply statistical, classification, machine learning, or analytical models, such as those based on linear regression, bayesian networks, support vector machine, decision tree, random forest classification and the like, on the orders pending at the kitchen display system 204. The data capture device 202 may additionally use other contextual data such as how fast the line is moving, the items in the order, preparation time for the items, availability of staff, etc.

At 1310, the data capture device 202 adds first information associated with the first customer order to the cart information of the order ticket and at 1312, the data capture device 202 sends first data associated with the order ticket to the kitchen display system 204, the first data including at least the first information associated with the first customer order. For instance, the data capture device 202 can add first information associated with the customer order to the cart information of the order ticket data structure. The data capture device 202 can then determine timing data, such as when the first customer order may be sent to the kitchen display system 204 (immediately, after ten minutes, or queue up behind a specific order), and estimate when the order will complete and in response, send first data associated with the order ticket to the kitchen display system 204. In some examples, the first data includes at least the first information (e.g., indication of the first item) associated with the first customer order. In some examples, the first data further includes an associated versioning data structure associated with the order ticket, so as to track the changes that are made to the order. In one implementation, the additions to the original order ticket may be made at the counter device 206, for example, after the customer has moved up in their line, or when the customer is ready to pay for the original order ticket.

At 1314, the kitchen display system 204 receives the first data associated with the order ticket from the data capture device 202 and at 1316, the kitchen display system 204 creates a processing ticket in response to the order ticket, wherein the first processing ticket is based at least in part on the first customer order associated with the transaction. For instance, in some examples, the kitchen display system 204 can receive the first data associated with the order ticket from the data capture device 202 and in response, determine that the order ticket includes a new order ticket based on the associated versioning data structure. The kitchen display system 204 can then create the first processing ticket for the order ticket using the first data, wherein the first order ticket is based on the first customer order. For instance, the first processing ticket can include an indication of the first item.

At 1318, the kitchen display system 204 provides the first processing ticket for the order ticket via the kitchen display user interface. For instance, in some examples, the kitchen display system 204 can add the first processing ticket to the one or more order tickets provided by the kitchen display user interface. In some examples, the kitchen display system 204 can further add an indication that the first processing ticket is in an "in-progress" state, along with previously pending order tickets.

At 1320, the kitchen display system 204 receives second input indicating a completion of the first order ticket and at 1322, the kitchen display system 204 sends second data indicating the completion of the first processing ticket to the counter device 206. For instance, the kitchen display system 204 can receive first input from the merchant that the first processing ticket (e.g., the first item) is complete. Based on the first input, the kitchen display system 204 can remove the first processing ticket from the kitchen display user interface. Additionally, based on the first input, the kitchen display system 204 can send data indicating the completion of the first processing ticket to the counter device 206.

At 1324, the counter device 206 receives the second data from the kitchen display system 204. In some examples, the counter device 206 uses the second data to update the original order ticket for the transaction. For instance, the counter device 206 can add information to the original order ticket data structure before the first customer order is complete. Such information can also be relayed to the data capture device 202 so that upcoming orders can be managed and timed.

At 1326, the counter device receives, during a second period of time, via the user interface, second input corresponding to a second customer order associated with the transaction between the merchant and the customer either via the data capture device or the counter device. In some examples, the second customer order includes at least a second item ordered by a second customer from the merchant. In some examples, a kitchen of the merchant must prepare the second item for the customer.

At 1328, the data capture device 202 adds second information associated with the second customer order to the cart information of the order ticket and at 1330, the data capture device 202 sends second data associated with the order ticket to the kitchen display system 204, the second data including at least the second information associated with the second customer order. For instance, the data capture device 202 can add second information associated with the customer order to the cart information of the order ticket data structure. The data capture device 202 can then determine that the second customer order is complete and in response, send second data associated with the order ticket to the kitchen display system 204. In some examples, the second data includes at least the second information (e.g., indication of the second item) associated with the second customer order. In some examples, the second data further includes an updated associated versioning data structure associated with the open ticket.

At 1332, the data capture device 202 processes the transaction. For instance, the data capture device 202 can determine a final cost of the order ticket based on the first item and the second item. The data capture device 202 can then communicate with a payment service (e.g., computing device(s) 112) in order to process the transaction for the customer. In some examples, to process the transaction, the data capture device 202 sends the payment service payment information associated with a payment instrument of the customer for authorization for the cost of the transaction.

At 1334, the kitchen display system 204 may receive the second data associated with the order ticket from the data capture device 202 and at 1336, the kitchen display system 204 creates a second order for the open ticket, wherein the second order ticket is based at least in part on the second customer order associated with the transaction. For instance, in some examples, the kitchen display system 204 can receive the second data associated with the order ticket from the data capture device 202 and in response, determine that the order ticket is updated based on the updated associated versioning data structure. The kitchen display system 204 can then create the second order ticket for the order ticket using the second data, wherein the second order ticket is based on the second customer order. For instance, the second order ticket can include an indication of the second item.

At 1338, the kitchen display system 204 provides the second order ticket for the order ticket via the kitchen display user interface. For instance, in some examples, the kitchen display system 204 can add the second order ticket to the one or more order tickets provided by the kitchen display user interface. In some examples, the kitchen display system 204 can further add an indication that the second order ticket is in an "in-progress" state.

At 1340, the kitchen display system 204 receives second input indicating a completion of the second order ticket. For instance, the kitchen display system 204 can receive second input from the merchant that the second order ticket (e.g., the second item) is complete. Based on the second input, the kitchen display system 204 can remove the second order ticket from the kitchen display user interface.

At 1342, the kitchen display system 204 sends data indicating completion of the second order as well. In some cases, the second processing order ticket may be prioritized over the first processing order ticket for example based on analytics and other contextual factors.

Figure 14:
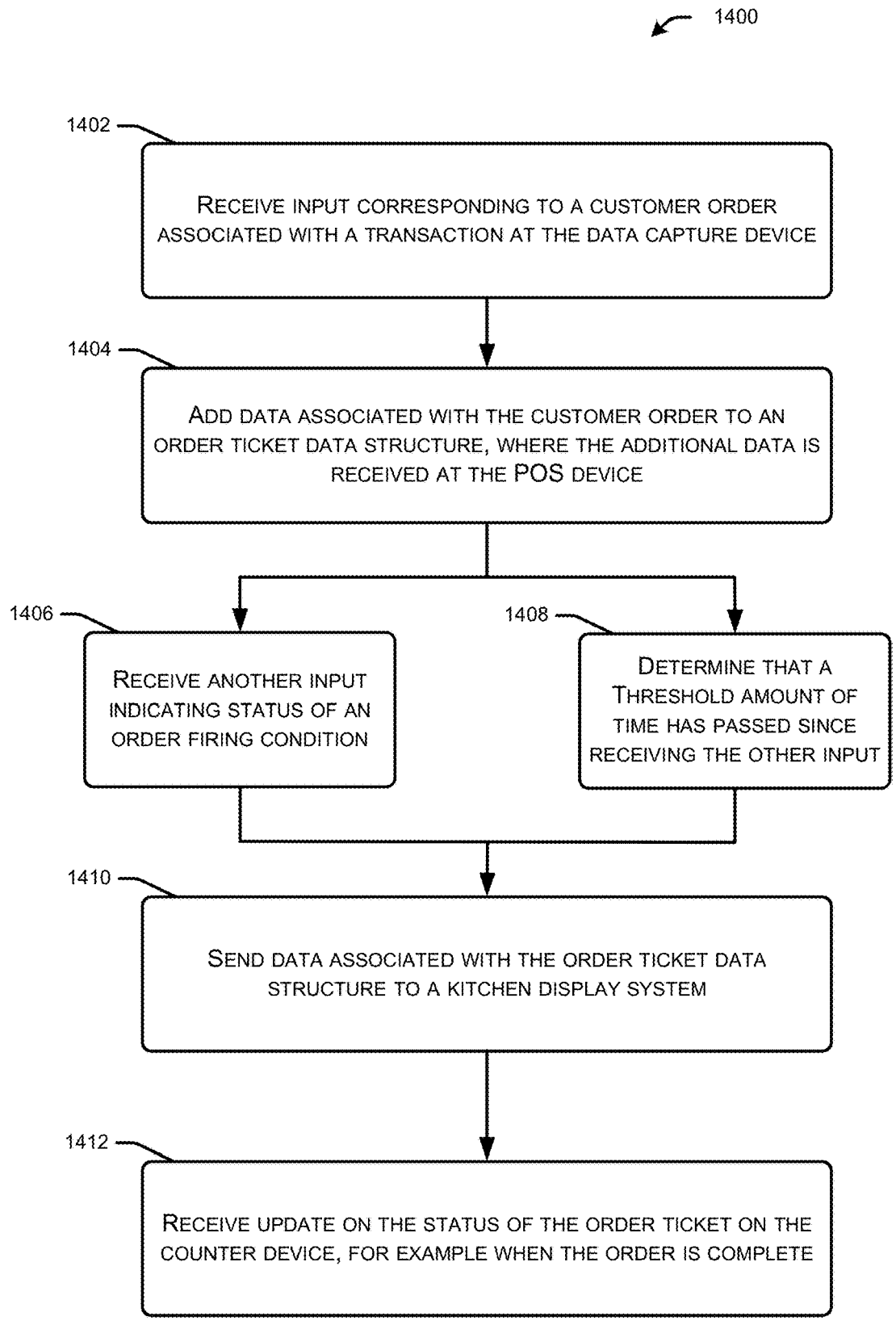
FIG. 14 is a flow diagram illustrating an example process for sending data associated with an order ticket to a kitchen display system based on a determination that a customer order for the order ticket is complete, according to an embodiment of the present subject matter.

FIG. 14 is a flow diagram illustrating an example process 1400 for sending data associated with an order ticket to a kitchen display system at a time based on fulfillment of a firing condition, where the firing condition may be defined as a precursor before the order is fired or sent to the kitchen display system. At 1402, the process 1400 receives input corresponding to a customer order associated with a transaction. For instance, a POS device can receive input from a merchant, where the input corresponds to one or more items ordered by a customer from the merchant during a transaction. In some examples, the POS device receives the input via a POS user interface.

At 1404, the process 1400 adds data associated with the customer order to an order ticket data structure. For instance, the counter device can add cart information associated with the customer order to cart data stored in the order ticket data structure. The cart information can indicate the one or more additional items ordered or even removed by the customer from the merchant during the transaction after the first order is placed at the data capture device. For example, the customer can decide to revise their order once they have moved from the original position in the line to the new position, i.e., to the counter device.

At 1406, the process 1400 receives another input indicating status of whether or not an order firing condition is met. The order firing condition indicates when to send the order to the kitchen display system for preparation and may also indicate the time when the order should ideally start getting prepared by the kitchen for a user standing in line. For instance, the POS device can receive a direct or indirect input from the merchant via the POS user interface that indicates when the order is desired to be delivered. The other contextual values such as customer profile, customer position in line, time of the day, location of the merchant, and complexity of the order can be used to determine the time when the order can be fired. For example, if the customer is third in line, the data capture device may fire the order only when the customer has reached the first position.

Additionally or alternatively to 1406, at 1408, the process 1400 determines that a threshold amount of time has passed since receiving the other input, explicit or otherwise from the counter device or the data capture device. For instance, the data capture device, or the processor 112, can determine that a threshold amount of time has passed since receiving the other input from the merchant or a wait time estimation from the kitchen display system. In some examples, the threshold amount of time can include a set interval. For instance, the threshold amount of time can include five second, thirty second, a minute, or the like. In some examples, the threshold amount of time may be based on items that are included in the customer order. For instance, the threshold amount of time may be longer at an ice cream shop since a customer may be more likely change his or her order for ice cream. However, the threshold amount of time may be shorter at a steakhouse since a customer may be less likely to change his or her order or because it takes shorter time to prepare their order, for example the order may be pre-packaged. Such times may be substantially fixed based on the items that the customer is ordering and/or their position in line.

At 1410, the process 1400 sends data associated with the order ticket data structure to a kitchen display system, for example after waiting a wait-time input by the customer, merchant, or calculated by the server based on the orders. For instance, the data capture device can send data associated with the order ticket data structure to a kitchen display system based on determining the time it should take to prepare and complete the order, for a user standing at a certain place in line. In some examples, the data can include information associated with the customer order. For instance, the data can indicate the one or more items ordered by the customer from the merchant and an expected wait time desired by the customer. For example, the customer may not be willing to wait more than a certain time period, or be willing to accept delivery instead of pick-up at the lapse of the time period.

Based on 1406 and/or 1408, at 1410, the process 1400 determines status of the order and updates the order ticket with such status, for example to indicate that the customer order is complete at 1412. In another implementation, the status may be to indicate that the order cannot be prepared in the time previously determined for the order. In yet another implementation, the status indicates that the order ticket has either been bumped up or below other order tickets.

Figure 15A:
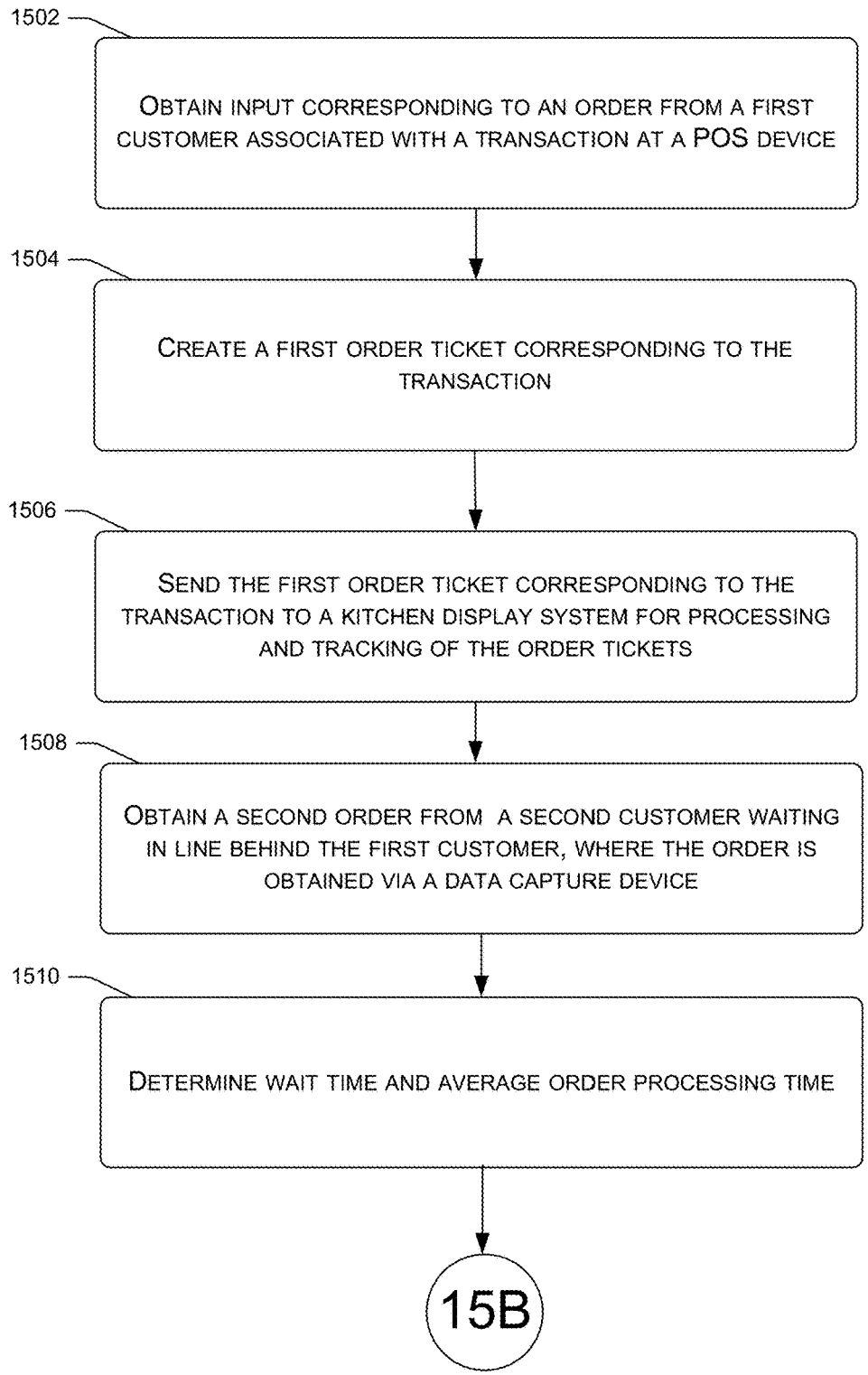
FIGS. 15A and 15B are flow diagrams illustrating an example process for facilitating expedited ordering and order processing for example for customers waiting in line, according to an embodiment of the present subject matter.
Figure 15B:
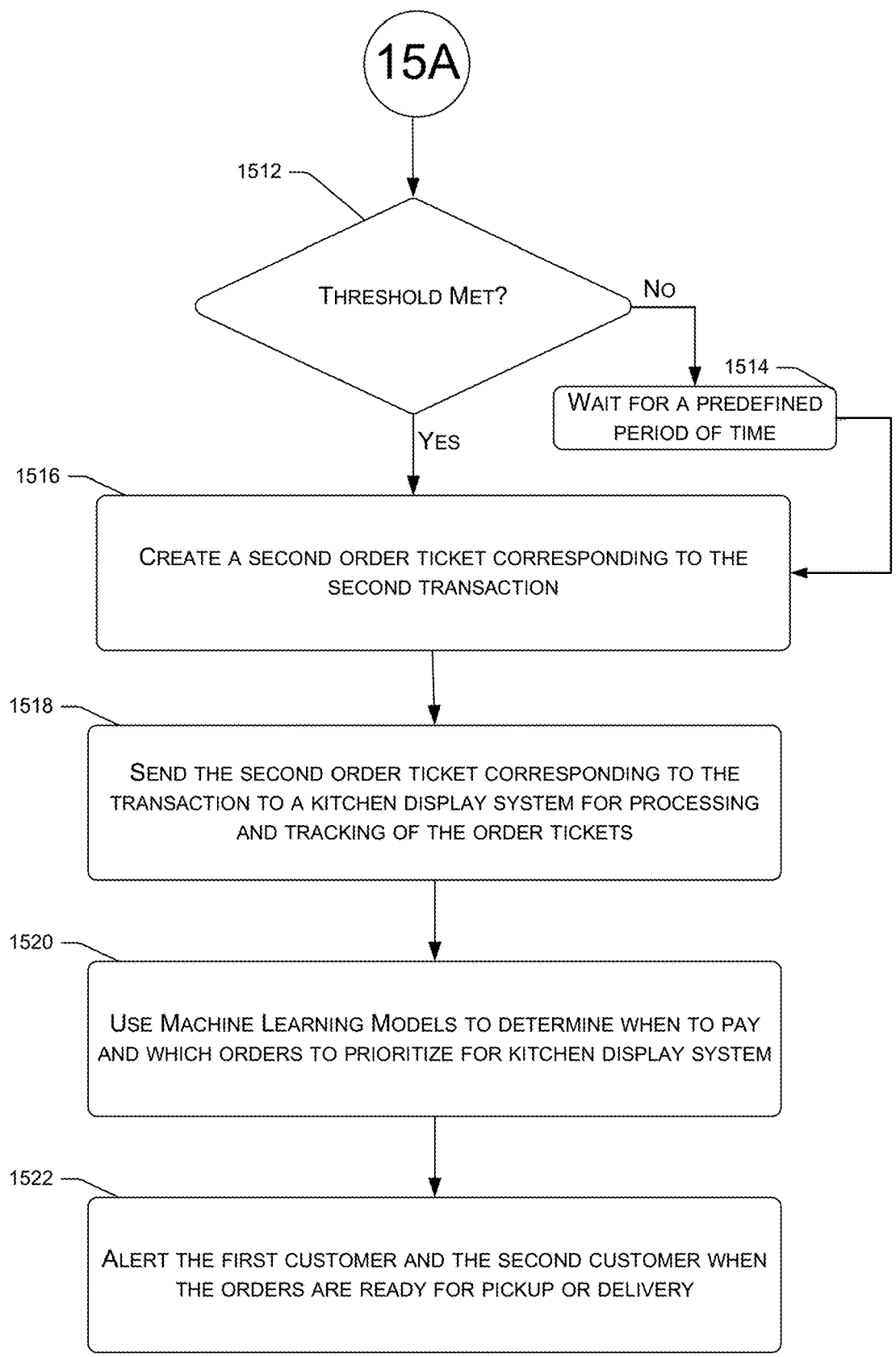

FIGS. 15A and 15B are flow diagrams illustrating an example process 1500 for sending data associated with an order ticket or multiple order tickets to a kitchen display system where the order ticket is generated by a line-busting device, such as a data capture device 113 and another order ticket is generated by a POS device. The implementations described here facilitate coordination of the order collection, order-firing, order prioritization, and order fulfillment of orders from customers at a restaurant, where multiple sources are taking orders. While such sources are identified as POS device and line-busting device, sources can also be payment or delivery applications executing on customer or merchant devices irrespective of whether the customer and merchant devices are in a restaurant or miles away from the restaurant. In one implementation, at 1502, the process 1500 receives input corresponding to an order from a first customer associated with a transaction at a POS device. For instance, a POS device like a counter device can receive input from a merchant, where the input corresponds to one or more items ordered by a first customer in a line of several customers from the merchant during a transaction. In some examples, the POS device receives the input via a POS user interface.

At 1504, the process 1500 creates a first order ticket corresponding to the transaction with the first customer and sent to kitchen display system (KDS) for processing in step 1506. The first order ticket includes information related to the item ordered by the first customer, a time-stamp of when the first order was obtained at the POS terminal, and a position of the customer in the line, for example computed based on relative positioning of the customers or the actual position of the customer with respect to a POS device or restaurant boundary.

As described before, KDS is configured to manage orders originating at the POS terminal, counter device, and the data capture device, where managing includes: displaying information related to one or more order tickets including the first order ticket; prompting the kitchen to start preparing the orders; tracking status of the one or more order tickets as the items associated with the respective order ticket are prepared by the merchant for delivery to the customer; and enabling delivery of the prepared orders at the POS terminal.

At 1508, a second order is obtained from a second customer, via a second device, such as a data capture device, for example to reduce the time it takes to process orders and reduce wait time. In one implementation, the second customer is waiting in line behind the first customer at a merchant location. In another implementation, the second customer is waiting to be served and may or may not be behind the first customer. In yet another implementation, the second customer may be obtained at a location different from the merchant's location or the second customer may be ordering via a delivery application different from the application being used by the first customer. The second customer may place the order from a menu of items same or different from the menu presented to the first customer. For example, a different set of menu items may be presented depending on the depth of the queue, the customer profile, the merchant profile, the state of the kitchen, and even item spoilage. For example, the server may recommend prepackaged items, such as coffee or sandwiches, on the top of the menu to speed up a long queue. The server may also recommend items ordered my previous customers so that orders can be aggregated, again to expedite the queue.

At 1510, a payment processor determines a wait time for the second customer, where the wait time indicates the average time taken for the second customer to move to the position of the first customer in the queue. In another example, wait-time, additionally or alternatively, indicates the time taken to fire off the order placed by the customer. The server, after collecting the orders, may wait for a defined time before sending the order tickets to the KDS. The wait time may be based on customer profile, merchant profile. Customer's position in line, time of the day, location of the merchant, and complexity of the order can be used to determine the time when the order can be fired. The wait time may also be based on the average order processing time computed, for example, based on historical processing times of specific orders. The contextual factors, as mentioned above, may be fixed or variable for certain orders and merchants, such that a selected set of factors applies to one merchant and another selected set of factors may apply to another. Furthermore, the factors may be weighted based on the merchant, customer, etc.

At 1512, it is further determined whether the wait time or average processing time meet the threshold values for that specific merchant.

If the answer to such a query is yes, the process advances to step 1516, else the process waits until a lapse of a predefined time before moving to step 1516. In one example, the threshold values indicate when the order tickets are ready to be fired off to the KDS.

At 1516, the process adds data associated with the customer order to an order ticket data structure. For instance, the data capture device can add cart information associated with the customer order to cart data stored in the order ticket data structure. The cart information can indicate the one or more items ordered by the second customer from the merchant during the transaction and thus, the second order ticket corresponding to the second transaction can indicate the items ordered by the customer.

At 1518, the process 1500 sends the second order ticket to the KDS for processing and tracking of the second order ticket along with other pending order tickets, such as the first order ticket.

In one implementation, the server prioritizes preparation of order under order tickets, such as the first order ticket and the second order ticket, in an order different from the order in which they were received at 1520 and sends such instructions to the KDS. Furthermore, the server may determine whether to accept payment upfront from the customer or whether to accept payment after the order is submitted. Such determination may be based by the server's machine learning models, such as those based on linear regression, bayesian networks, support vector machine, decision tree, random forest classification and the like. The server may do the prioritization of order processing and order payment either before the tickets are sent to the KDS or after. In one implementation, the server holds off firing of certain orders until a firing condition is met.

At 1522, the KDS prepares the order as per information on the order tickets, following instructions on when to start processing and delivering such orders. The POS device or the data capture device then receives input indicating that the first order or the second order is complete as per prioritization. For instance, the POS device can receive input from the merchant via the KDS user interface that indicates that the customer order is complete. In another example, the customer devices may be alerted to indicate the orders are ready for pickup or delivery.

Figure 16:
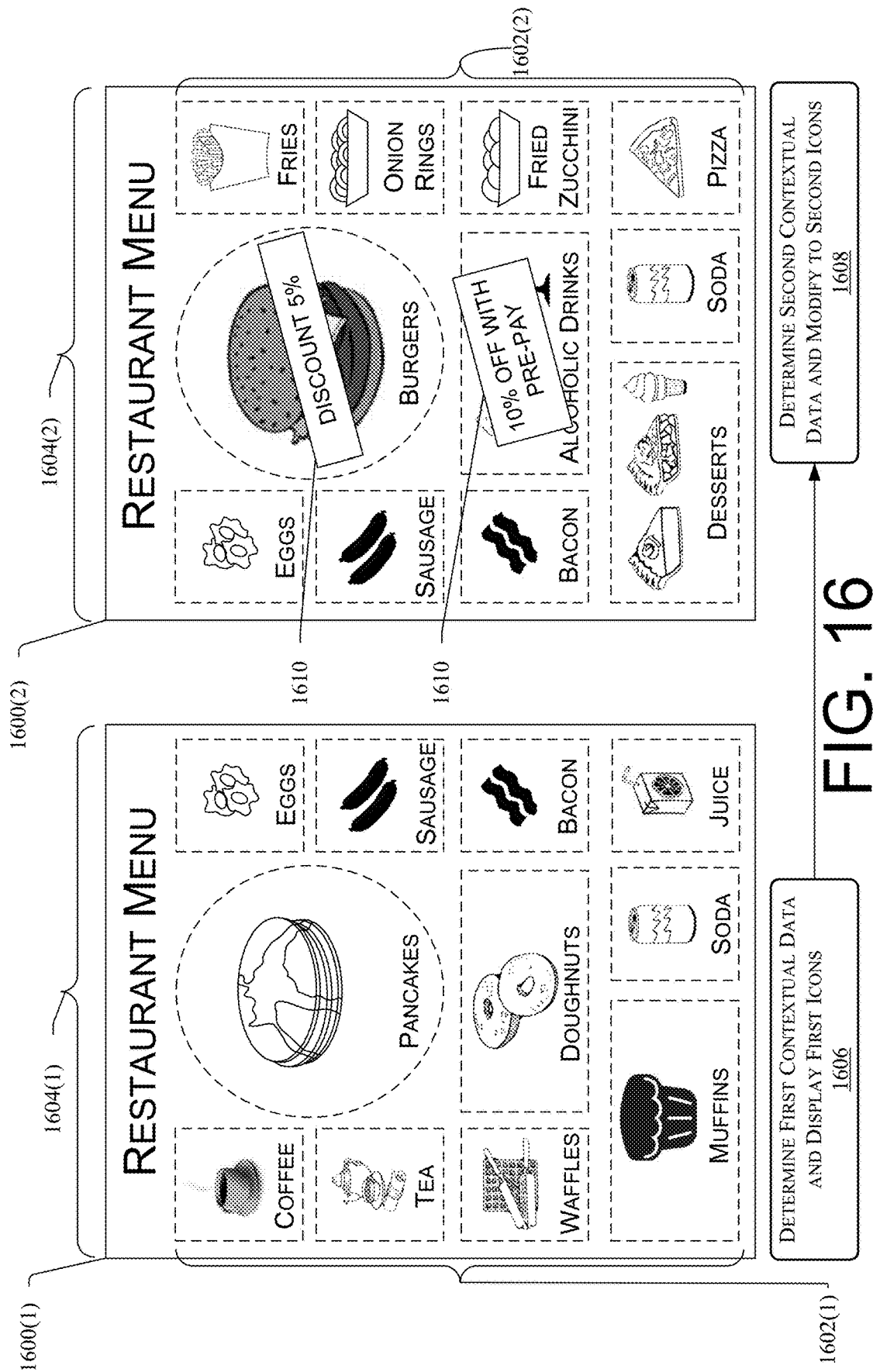
FIG. 16 is a diagram illustrating change in the menu as presented on the data capture device to the counter device, according to an embodiment of the present subject matter.

FIG. 16 illustrates an example process of a server (not shown) dynamically presenting content, such as icons 1602, of a user interface 1604, such as user interface 1606 of a merchant device, such as data capture device 113, based on contextual data. Furthermore, the server can dynamically modify icons 1602 of a user interface 1604, such as user interface 1606 of another merchant device, such as a counter device 108. Contextual data can include a location of the merchant device 1600, location of a customer device with respect to a merchant device, such as a line busting device, a time of day, a day of the week, time of year (e.g., season), weather, merchant inventory, merchant preferences, customer preferences, items that are deemed upsell items, items that are deemed cross-sell items, a sale and/or special offered by the merchant, how busy the merchant is, number of customers at the merchant location, and various other contextual factors corresponding to the use of the merchant device. Content can include icons, theme, layout, text, or interactive elements, such as pre-pay/post-pay, etc.

At 1606, the server 112 determines first contextual data and displays first icons 1602(1) based on the contextual data. The first contextual data can be determined based on an analysis of one or more factors corresponding to the use of the counter device 108. In the illustrative example, the analysis can include a determination that a time of day corresponds to a breakfast menu. Based on this determination, the server 112 can cause display of a first set of icons 1602(1) corresponding to the breakfast menu. In some examples, the analysis can include an analysis of customer preferences, availability of staff, inventory, and a determination that the customer prefers particular menu items, such as the breakfast menu.

In various examples, the analysis can include a determination to emphasize one or more items. The emphasis can be presented by increasing a size, shape, color and/or hue of the icon 1602(1), changing a placement of the icon 1602(1), or any other adjustments to make the icon 1602(1) stand out on the display. The emphasis can be based on merchant inventory, current weather, an attempt to upsell an item, an attempt to cross-sell an item, sales and/or specials offered by the merchant, transaction history of the merchant (e.g., known popular items sold at a time of day, a day of the week, time of year (e.g., season), known popular combinations of items sold, ease to prepare, etc.

In some examples, the analysis can include a determination to de-emphasize one or more items. A de-emphasis of an item can be based on merchant inventory, current weather, an attempt to cross-sell, and/or other factors in which the merchant may discourage the sale of a particular item. The de-emphasis can be presented by removing the icon 1602(1) corresponding to the one or more items from the display page. In various examples, the user interface 1604(1) can include multiple display pages. In some examples, the de-emphasis can be presented by including the icon corresponding to the one or more items on a display page other than a main display page. For example, the de-emphasis can include presenting the icon on a last page of the multiple display pages.

In various examples, the server 112 can dynamically determine to emphasize and/or de-emphasize one or more items based on contextual factors. For example, if a customer orders the last muffin, the server 112 can dynamically modify the user interface 1604(1) by removing the muffin icon from the user interface, and replace it with a pastry icon.

At 1608, the server 112 determines second contextual data and displays second icons 1602(2) based on the contextual data. In various examples, the second contextual data can include a change in the position of the customers or the length/depth of line of customers, a change in time of day from a time corresponding to the breakfast menu to a time corresponding to a lunch menu, or change in availability of items, staff or materials. In some examples, the second contextual data can include a determination of an event nearby the merchant location, or displayed on a screen at the merchant location, which could affect menu items most likely to be ordered by customers. In such examples, the server 112 could dynamically modify the icons 1602(1) to a second set of icons 1602(2) to cater to the customer preferences or external environment (e.g., cold/hot day recommend hot/cold beverage items). For example, a merchant may typically adjust from a breakfast to a lunch menu at 11 am. However, the server 112 may determine that a football game starts at 10 am, and during football games, the customers prefer to consume items on the lunch menu. Accordingly, the server 112 may adjust one or more of the icons 1602(2) to those corresponding to lunch menu items. In another example, the server 112 may adjust the icons to better represent items that are likely to be prepared faster so that the line moves faster. In yet another example, the server 112 may adjust the icons to highlight items that are already prepared or pre-packaged. In one example, the server may show the icons based on historical data, such as data of the previous customer so that similar orders can be fired off and prepared at the same time in the kitchen.

In some examples, the server 112 may determine that an event is taking place nearby the merchant or will be presented on a display screen at the merchant location, and may generate one or more sales and/or specials (e.g., discounts, etc.) based on the event. In such examples, the server 112 can emphasize the icons 1602(2) corresponding to the one or more specials. For example, the merchant may offer hamburgers and alcoholic beverages on special during the event. Accordingly, the server 112 can modify the icons corresponding to the hamburgers and alcoholic beverages to make them stand out. Additionally or alternatively, the server may cause display of a notification 1610 that the particular items are offered at a discounted price to further incentivize the purchase or reduce the wait-time for subsequent customers. The notification 1610 may also include an incentive for customers willing to pre-pay instead of paying after the order is delivered. It will be understood that, in a manner described above, the user interface may change again for the subsequent customer in line. Also, even though the server controls the process herein, instances of the server executing on the merchant devices may locally control the user interface based on contextual factors or relevant distance between the merchant device and customer device.

Figure 17:
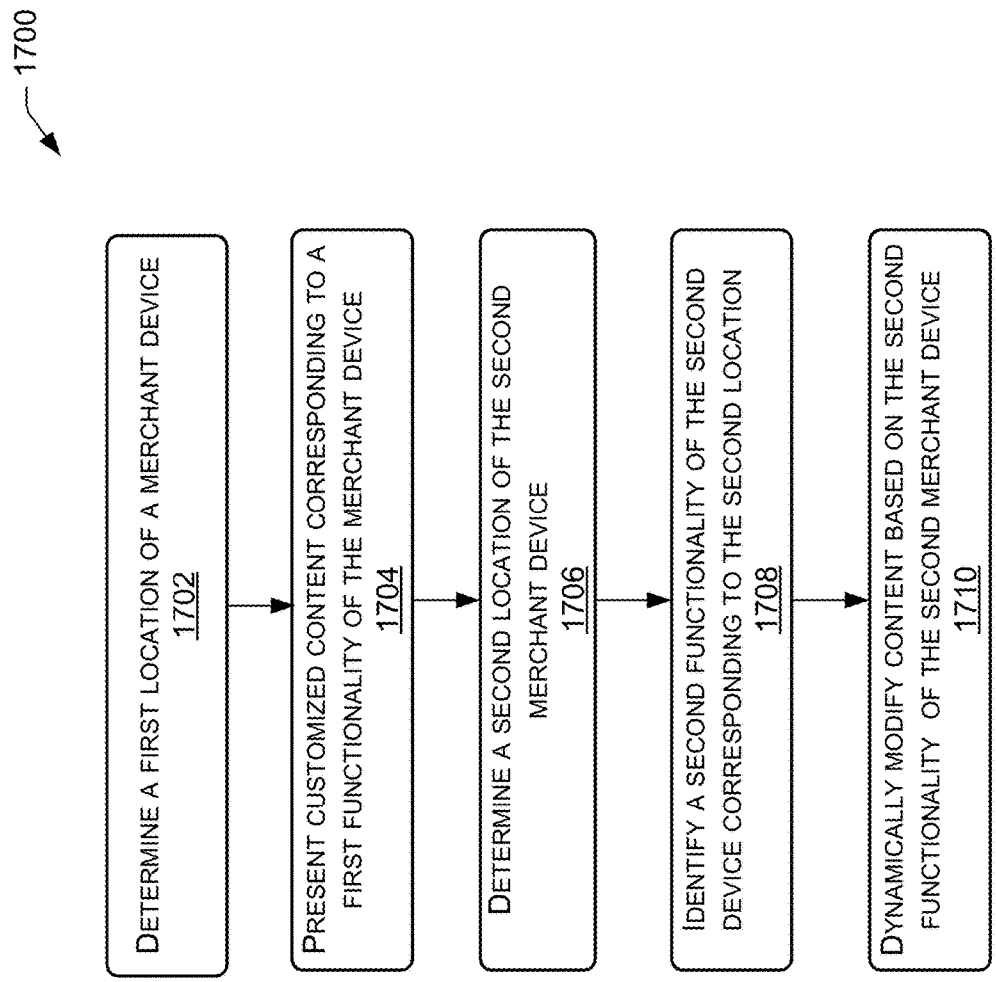
FIG. 17 is a flow diagram illustrating an example process of modifying the menu or other content on a user interface based on context, according to an embodiment of the present subject matter.

FIG. 17 illustrates a flow diagram of an example process 1700 for dynamically modifying a functionality of a user interface of a specific merchant device based on contextual data.

At 1702, the server determines a first location of a fixed merchant device. In various examples, the first location can be determined based on a location component of the merchant device. In some examples, the first location can include a location relative to a base station computing device. In such examples, the first location can be a distance from a base station computing device of a point-of-sale (POS) system, such as a two-dimensional distance (e.g., X/Y distance) from the base station computing device. In some examples, the first location can include an area and/or a sub-section of an area corresponding to a merchant location.

In various examples, the server also determine one or more contextual factors associated with a use of the merchant device. The one or more contextual factors can include a time of day, a day of the week, time of year (e.g., season), weather, merchant inventory, merchant preferences, customer preferences, items that are deemed upsell items, items that are deemed cross-sell items, a sale and/or special offered by the merchant, depth of the line as seen from the merchant device, and/or various other contextual factors corresponding to the use of the fixed merchant device.

In various examples, the server can receive the one or more contextual factors from a remote computing device, such as a base station computing device and/or a POS system service provider.

At 1704, the server can present customized content corresponding to a functionality on a user interface of the fixed merchant device. The functionality can include one or more functions or capabilities of the server at the first location and/or at a given time and/or for a given customer. For example, for a POS system in a restaurant, the functions can include surfacing menus, displaying notifications, receiving orders, processing payment, managing customer flow at tables, managing a kitchen ordering system, automatically uploading data, automatically downloading data, and the like.

At 1706, the server can determine a second location corresponding to a second merchant device, for example a moving line busting device configured to accept and/or process orders from customers waiting in line or otherwise not being served by the first merchant device. In various examples, the second location can be determined based on a location component of the moving merchant device. In some examples, the second location can include a location relative to a base station computing device. In such examples, the second location can be a distance from a base station computing device of a point-of-sale (POS) system, such as a two-dimensional distance (e.g., X/Y distance) from the base station computing device. In some examples, the second location can include an area and/or a sub-section of an area corresponding to a merchant location. In yet another example, the second location can be with respect to the first device or a customer device associated with the customer. In another example, the first and the second location may be related to the location of a customer in a store or restaurant.

In various examples, the server can also determine one or more contextual factors associated with a use of the second moving merchant device. The one or more contextual factors can include a time of day, a day of the week, time of year (e.g., season), weather, merchant inventory, merchant preferences, customer preferences, items that are deemed upsell items, items that are deemed cross-sell items, a sale and/or special offered by the merchant, and/or various other contextual factors corresponding to the use of the server.

In various examples, the server can receive the one or more contextual factors from a remote computing device, such as a base station computing device and/or a POS system service provider.

At 1708, the server can identify a second functionality based on the second location. The second functionality can include one or more functions or capabilities of the server relevant to the context of use. In various examples, the second functionality can also be based, at least in part, on the one or more contextual factors.

At 1710, the server can dynamically modify content, for example icons of the user interface based on the second functionality. Examples of content can also include other visual, logical or functional content. A modification to the one or more icons can include replacing an icon with another icon and/or changing the size, shape, order, image, color, hue, placement, etc. of an icon. For example, a server at a restaurant can be relocated from a host station with a first functionality of managing a seating chart, to a dining area with a second functionality of receiving orders from customers. Based on the recognition of the change in contextual data and consequently functionality, the server may modify the icons to display icons corresponding to a restaurant menu that may change based on the position of the customer, depth of the line, wait time, availability of staff, availability of items and the like as described in FIG. 16.

Figure 18:
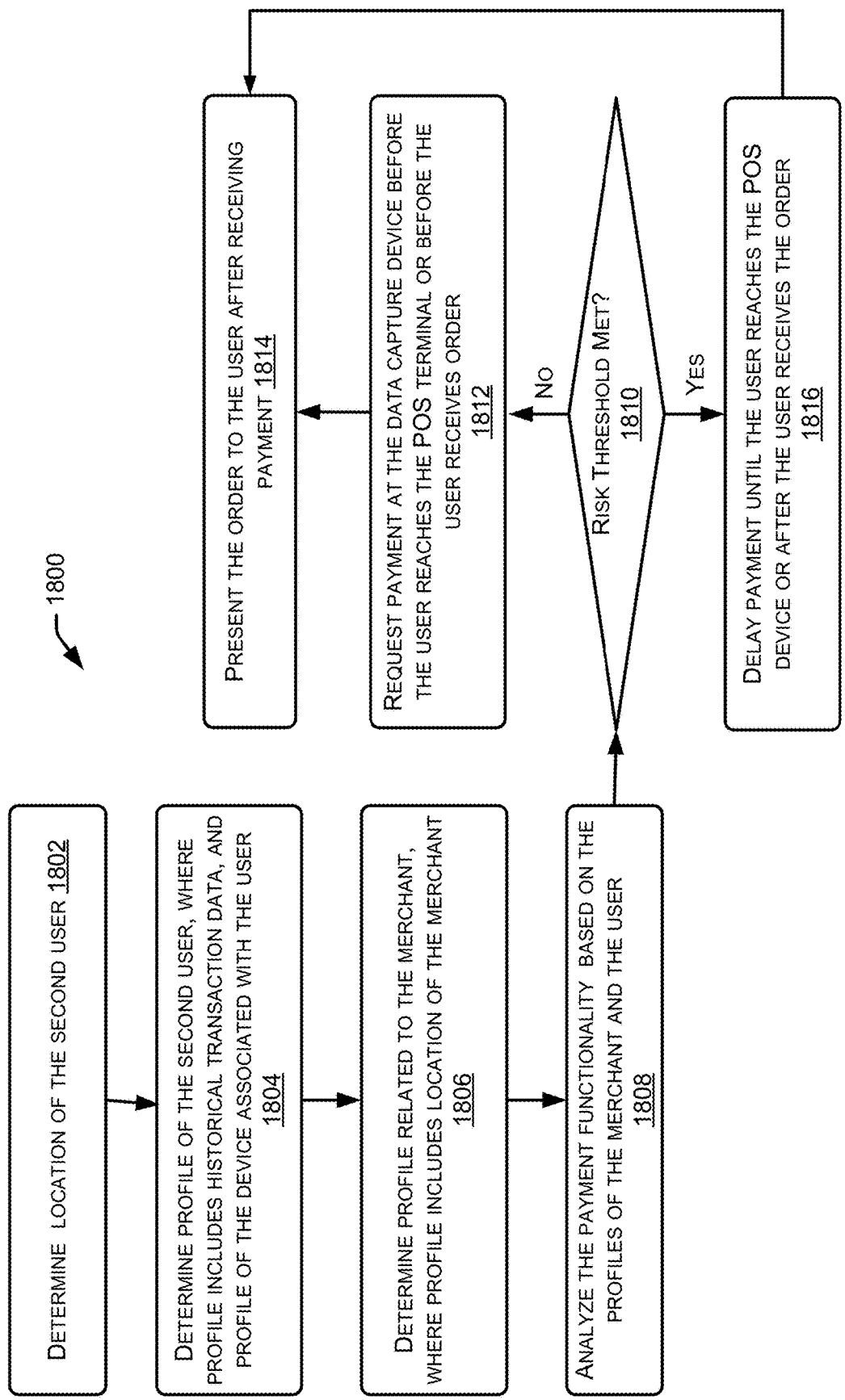
FIG. 18 is a flow diagram illustrating an example process of providing one of a pre-pay or post-pay option for a customer who orders in advance, for example while waiting in a line through a data capture device, according to an embodiment of the present subject matter.

FIG. 18 a flow diagram of an example process 1800 for determining whether or not a customer may pre-pay for an order placed through the data capture device. In one implementation, the data capture device may have functionalities to accept an order request and a payment instrument from the customer.

At 1802, the server determines the location of the second user or customer, for example with respect to a point of reference. The point of reference may be the point of sale system, the customer device, or any other fixed point in the merchant store. The location may also be a relative location instead of an absolute value. The term second in second user is meant to indicate the position of the user in a line of users waiting to be served by the merchant while the first user is being served. The second user can very well be the third, fourth, fifth user, and so on, in other examples. Once the merchant takes order from the second user through the line busting device, the merchant will logically move to the third, fourth and fifth user. However, in some implementations, the merchant may take orders at random, for example based on customer profiles and receive orders from loyal or frequently visiting customers first.

At 1804, the server determines a profile of the second user, for example based on historical transaction data, profile of the device associated with the second user, payment instruments associated with the second user and so on.

At 1806, the server determines the profile of the merchant, for example based on the location of the merchant, merchant history, zip code, and the like.

At 1808, the server analyzes the payment functionality based on the profiles of the merchant and the user, where the payment functionality may either be pre-pay or post-pay.

At 1810, the payment functionality may be compared to a risk threshold. If the risk threshold is met (Yes branch), the server may delay the payment of the second user until the user has reached the POS device, i.e., the position where the first user is located or after the second user has received the order, as shown in step 1816. If the risk threshold is not met (No branch), the server may request payment at the data capture device or through an application executing on the customer device, before the second user reaches the POS terminal, or before the user receives the order as shown in step 1812. At step 1814, the order is presented to the user after the payment is received, either through pre-pay or post-pay option presented to the second user.

Figure 19:
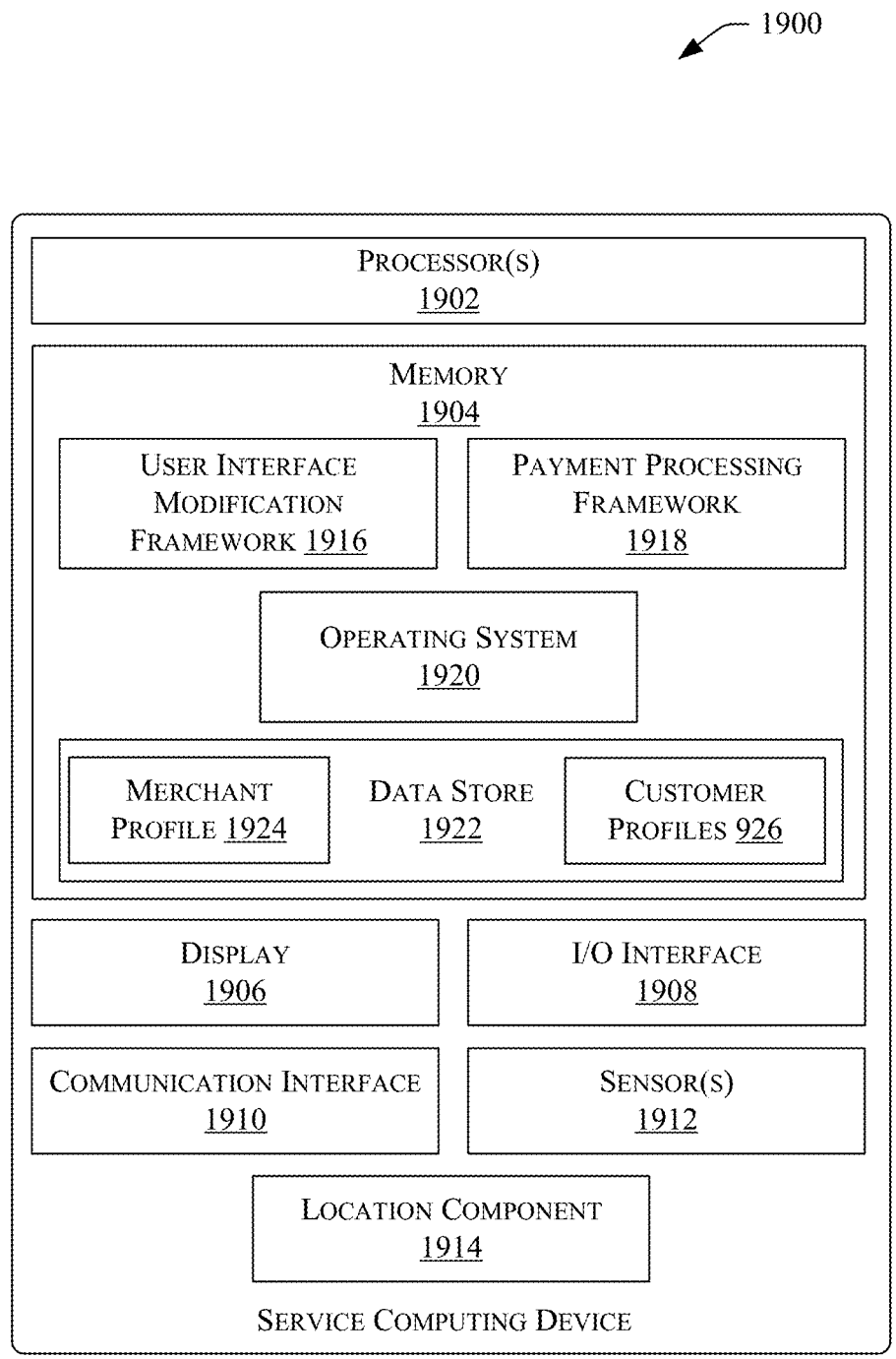
FIG. 19 illustrates select components of an example server configured with the dynamically modifiable user interface system.

FIG. 19 illustrates select components of an example service computing device 1900 configured with the dynamically modifiable user interface system. The service computing device 1900 may be any suitable type of computing device, e.g., mobile, semi-mobile, semi-stationary, or stationary.

Some examples of the service computing device 1900 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the service computing device 1900 includes at least one processor 1902, at least one memory 1904, a display 1906, one or more input/output (I/O) interfaces 1908, one or more communication interfaces 1910, one or more sensor(s) 1912, and at least one location component 1914.

Each processor 1902 may itself comprise one or more processors or processing cores. For example, the processor 1902 can be implemented as one or more microprocessors, microcomputers, microcontrollers, digital signal processors, central processing units, state machines, logic circuitries, and/or any devices that manipulate signals based on operational instructions. In some cases, the processor 1902 may be one or more hardware processors and/or logic circuits of any suitable type specifically programmed or configured to execute the algorithms and processes described herein. The processor 1902 can be configured to fetch and execute computer-readable processor-executable instructions stored in the memory 1904.

Depending on the configuration of the service computing device 1900, the memory 1904 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 1904 may include, but is not limited to, RAM, ROM, EEPROM, flash memory, solid-state storage, magnetic disk storage, optical storage, and/or other computer-readable media technology. Further, in some cases, the service computing device 1900 may access external storage, such as RAID storage systems, storage arrays, network attached storage, storage area networks, cloud storage, or any other medium that can be used to store information and that can be accessed by the processor 1902 directly or through another computing device or network. Accordingly, the memory 1904 may be computer storage media able to store instructions, modules or components that may be executed by the processor 1902. Further, when mentioned, non-transitory computer-readable media excludes media such as energy, carrier signals, electromagnetic waves, and signals per se.

The memory 1904 may be used to store and maintain any number of functional components that are executable by the processor 1902. In some implementations, these functional components comprise instructions or programs that are executable by the processor 1902 and that, when executed, implement operational logic for performing the actions and services attributed above to the service computing device 1900. Functional components of the service computing device 1900 stored in the memory 1904 may include a user interface modification framework 1916 and a payment processing framework 1918. The user interface modification framework 1916 may be configured to analyze contextual data and modify one or more icons of the user interface based on the contextual data, as discussed above with regard to FIGS. 16 and 17, for example.

In various examples, the payment processing framework 1918 can be configured to communicate one or more orders to a base station computing device (e.g., a centralized computing device) for processing. In such examples, the base station computing device can process the payment via a POS system service provider, a bank corresponding to the payment instrument, and/or another source. In some examples, the payment processing framework 1918 can be configured to receive payment instrument information from the one or more sensor(s) 1912, such as a payment instrument reader. In still yet other examples, the payment processing framework 1918 can be configured to access payment instrument information for a particular customer stored in the customer profiles 1926. In such an example, the service computing device 1900 can automatically process payment based on an indication of order completion.

Additional functional components may include an operating system 1920 for controlling and managing various functions of the service computing device 1900 and for enabling basic user interactions with the service computing device 1900 and/or a customer device. The memory 1904 may also store a data store 1922. The data store 1922 may be configured to store merchant profile 1924, customer profiles 1926 and/or other information pertaining to merchants and associated customers.

In addition, the memory 1904 may also store data, data structures and the like, that are used by the functional components. Depending on the type of the service computing device 1900, the memory 1904 may also optionally include other functional components and data, which may include programs, drivers, etc., and the data used or generated by the functional components. Further, the service computing device 1900 may include many other logical, programmatic and physical components, of which those described are merely examples that are related to the discussion herein.

The one or more communication interface(s) 1910 may include one or more interfaces and hardware components for facilitating communication with various other devices over a network or directly. For example, communication interface(s) 1910 may facilitate communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

In various examples, the one or more communication interface(s) 1910 may work in conjunction with the user interface modification framework. For example, the service computing device may receive a phone call via a network connection. Responsive to answering the phone call, the service computing device 1900 may automatically modify a user interface to display icons corresponding to a menu. In various examples, the service computing device 1900 may recognize a phone number corresponding to the incoming call, and may identify a particular customer profile associated with the customer stored in the customer profiles 1926 of the data store 1922. In such examples, the service computing device 1900 may modify the icons based on one or more customer preferences and/or a transaction history of the customer stored in the particular customer profile.

FIG. 19 further illustrates that the service computing device 1000 may include one or more displays 1906 mentioned above. Depending on the type of computing device used as the service computing device 1900, the one or more displays 1906 may employ any suitable display technology. For example, the one or more displays 1906 may be liquid crystal displays, plasma displays, light emitting diode displays, OLED (organic light-emitting diode) displays, electronic paper displays, or any other suitable type of displays able to present digital content thereon. However, implementations described herein are not limited to any particular display technology.

The I/O interfaces 1908, meanwhile, may include speakers, a microphone, a camera, and various user controls (e.g., buttons, a joystick, a keyboard, a keypad, etc.), a haptic output device, and so forth.

In various examples, the service computing device 1900 can include one or more sensor(s) 1912. The one or more sensor(s) 1912 can include a camera, a laser scanner, a RADAR, a LIDAR, other proximity sensor, an accelerometer, a gyroscope, a compass, a light sensor, a volume sensor, a payment instrument reader, or other sensor capable of capturing and/or analyzing environmental factors.

The location component 1914 may include a GPS device able to indicate location information, or the location component 1914 may comprise another other location-based sensor. Additionally, the service computing device 1900 may include various other components that are not shown, examples of which include removable storage, a power control unit, and so forth.

Figure 20:
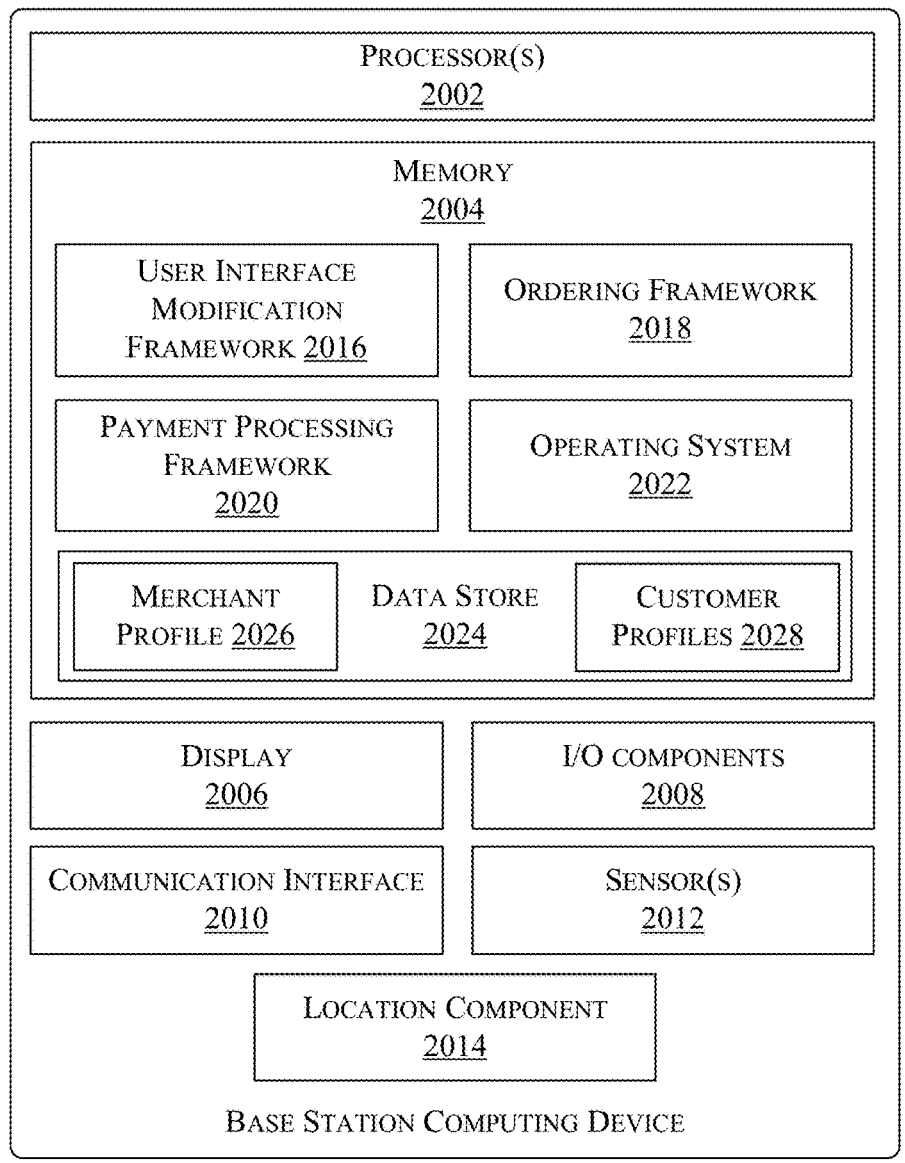
FIG. 20 illustrates select components of an example base station computing device that a POS system may use as a centralized computing device for the dynamically modifiable user interface system and/or an order prioritization system.

FIG. 20 illustrates select components of an example base station computing device 2000 that a POS system may use as a centralized computing device for the dynamically modifiable user interface system and/or an order prioritization system. The base station computing device 2000 may be any suitable type of computing device, e.g., mobile, semi-mobile, semi-stationary, or stationary.

Some examples of the base station computing device 2000 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the base station computing device 2000 includes at least one processor 2002, at least one memory 2004, a display 2006, one or more input/output (I/O) interfaces 2008, one or more communication interfaces 2010, one or more sensor(s) 2012 at least one location component 2014.

Each processor 2002 may itself comprise one or more processors or processing cores. For example, the processor 2002 can be implemented as one or more microprocessors, microcomputers, microcontrollers, digital signal processors, central processing units, state machines, logic circuitries, and/or any devices that manipulate signals based on operational instructions. In some cases, the processor 2002 may be one or more hardware processors and/or logic circuits of any suitable type specifically programmed or configured to execute the algorithms and processes described herein. The processor 2002 can be configured to fetch and execute computer-readable processor-executable instructions stored in the memory 2004.

Depending on the configuration of the base station computing device 2000, the memory 2004 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 2004 may include, but is not limited to, RAM, ROM, EEPROM, flash memory, solid-state storage, magnetic disk storage, optical storage, and/or other computer-readable media technology. Further, in some cases, the base station computing device 2000 may access external storage, such as RAID storage systems, storage arrays, network attached storage, storage area networks, cloud storage, or any other medium that can be used to store information and that can be accessed by the processor 2002 directly or through another computing device or network. Accordingly, the memory 2004 may be computer storage media able to store instructions, modules or components that may be executed by the processor 2002. Further, when mentioned, non-transitory computer-readable media excludes media such as energy, carrier signals, electromagnetic waves, and signals per se.

The memory 2004 may be used to store and maintain any number of functional components that are executable by the processor 2002. In some implementations, these functional components comprise instructions or programs that are executable by the processor 2002 and that, when executed, implement operational logic for performing the actions and services attributed above to the base station computing device 2000. Functional components of the base station computing device 2000 stored in the memory 2004 may include user interface modification framework 2016, such as user interface modification framework 1916, discussed above, and an ordering framework 2018.

In various examples, the ordering framework 2018 can include an ordering hub for processing multiple orders. The multiple orders can be from the single computing device, such as a server computing device 1900, or from multiple computing devices. In some examples, at least some of the multiple orders can be received from one or more delivery applications (e.g., applications configured to process delivery orders from one or more customers).

In various examples, the ordering framework 2018 can receive an order, and determine a preparation time associated with the order. The preparation time can be based on a longest cooking time for the order, a quantity (e.g., number) of employees working in the kitchen, the particular employees working in the kitchen, an upcoming employee shift change, how busy the dining room is, a quantity of orders currently in a sequence queue, and other factors affecting a time it would take to prepare an order.

In some examples, the ordering framework 2018 can receive a plurality of orders, and can determine a sequence of the plurality of orders. The sequence can be based on an arrival time of the order, the preparation time associated with the order, location of the customer (e.g., at the merchant location or at a remote location), a pick-up time associated with the order (e.g., pre-determined pick-up time, delays due to traffic, weather, courier availability, etc.), and/or other factors.

In various examples, the ordering framework 2018 receive a plurality of orders, and can determine a sequence of sub-orders within the orders. In such examples, the items in the orders can be separated, and a preparation time of each item can be determined. Based on the preparation time of each item, the items of the various orders can be sequenced for efficiency. For example, two orders may be received substantially simultaneously, each of the orders including a salad and a hot entrée. The ordering framework 2018 can determine a preparation time for the salads is 3 minutes and a preparation time for the hot entrées is 20 minutes. Based on the preparation times, the ordering framework 2018 can sequence the items of the orders so that the salads and corresponding hot entrées are ready at substantially the same time.

In some examples, the ordering framework 2018 can determine a long preparation time and/or a delay for a particular item. In various examples, the ordering framework 2018 can communicate the information to the various delivery applications and/or remote computing devices. In such examples, the delivery applications and/or remote computing devices can de-emphasize the item, such as by modifying an icon corresponding to the item on a menu, and/or provide a notification of delay regarding the item and consequently a delay of an order including the item. In some examples, the ordering framework 2018 can communicate the information to the user interface modification framework 2016. Based on the information about the delay, the user interface modification framework 2016 can de-emphasize the item, such as by removing the icon associated therewith from a main page, making the icon smaller, and the like.

In various examples, the ordering framework 2018 and/or user interface modification framework 2016 can monitor merchant inventory. In such examples, the ordering framework 2018 and/or user interface modification framework 2016 can update the merchant inventory (e.g., update a data structure, database, etc. associated with the inventory) based on processed orders. The updates can be performed continuously (e.g., with each order) and/or periodically (e.g., at a given time each day, every hour, etc.).

In various examples, the ordering framework 2018 and/or user interface modification framework 2016 can monitor the merchant inventory, and communicate the merchant inventory to the service computing device. In some examples, the ordering framework 2018 and/or user interface modification framework 2016 can push an update to the service computing device based on a determination that a particular item in the inventory has exceeded an overstock threshold level. The overstock threshold level may be set by the merchant, such as in merchant profile 2026, and/or by a POS system service provider. For example, the ordering framework 2018 and/or user interface modification framework 2016 may determine that a particular item is overstocked. Based on the overstock determination, the base station computing device 2000 may instruct the service computing device to modify the user interface to emphasize the overstocked item in an attempt to sell more of that item.

In some examples, the ordering framework 2018 and/or user interface modification framework 2016 can send a notification to the delivery applications and/or remote computing devices based on the overstock determination. The notification can include an instruction to emphasize the item, a discount offered on the item, or other information to encourage the sale of the item.

In some examples, the ordering framework 2018 and/or user interface modification framework 2016 can push an inventory update (e.g., update a quantity of a particular item or group of items in the inventory, current quantities of inventory items in the data structure, database, etc.) to the service computing device based on a determination that a particular item in the inventory has decreased below an understock threshold level. The understock threshold level could be zero (0) remaining items, or a limited quantity of remaining items, as determined by the merchant, such as in merchant profile 2026, and/or by a POS system service provider. For example, the ordering framework 2018 and/or the user interface modification framework 2016 may determine that a particular item is understocked (e.g., a limited amount or none remaining). Based on the understock determination, the ordering framework 2018 and/or the user interface modification framework 2016 send an instruction to the service computing device to de-emphasize the understocked item in an attempt to discourage the sale of the item and/or attempt to cross-sell another item, such as by emphasizing a comparable item.

In some examples, the ordering framework 2018 and/or user interface modification framework 2016 can send a notification to the delivery applications and/or remote computing devices based on the understock determination. The notification can include an instruction to de-emphasize the item, remove the item from the menu, attempt to cross-sell another item, such as by emphasizing a comparable item, or other instruction and/or information to discourage the sale of the item.

In various examples, the memory 2004 can include a payment processing framework 2020. In such examples, the payment processing framework 2020 can be configured to receive payment information from a service computing device, delivery application, and/or other remote computing devices. The payment processing framework 2020 can process the payment via a POS system service provider, a bank corresponding to the payment instrument, and/or another source. In some examples, the payment processing framework 2020 can be configured to receive payment instrument information from the one or more sensor(s) 2012, such as a payment instrument reader. In still yet other examples, the payment processing framework 2020 can be configured to access payment instrument information for a particular customer stored in the customer profiles 2026. In such an example, the base station computing device 2000 can automatically process payment based on an indication of order completion.

Additional functional components may include an operating system 2022 for controlling and managing various functions of the base station computing device 2000 and for enabling basic user interactions with the base station computing device 2000 and/or a customer device. The memory 2004 may also store a data store 2024. The data store 2024 may be configured to store a merchant profile 2026, customer profiles 2028 and/or other information pertaining to the merchant and associated customers.

In addition, the memory 2004 may also store data, data structures and the like, that are used by the functional components. Depending on the type of the base station computing device 2000, the memory 2004 may also optionally include other functional components and data, which may include programs, drivers, etc., and the data used or generated by the functional components. Further, the base station computing device 2000 may include many other logical, programmatic and physical components, of which those described are merely examples that are related to the discussion herein.

The one or more communication interface(s) 2010 may include one or more interfaces and hardware components for facilitating communication with various other devices over a network or directly. For example, communication interface(s) 2010 may facilitate communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 20 further illustrates that the base station computing device 2000 may include one or more displays 2006 mentioned above. Depending on the type of computing device used as the base station computing device 2000, the one or more displays 2006 may employ any suitable display technology. For example, the one or more displays 2006 may be liquid crystal displays, plasma displays, light emitting diode displays, OLED (organic light-emitting diode) displays, electronic paper displays, or any other suitable type of displays able to present digital content thereon. However, implementations described herein are not limited to any particular display technology.

The I/O interfaces 2008, meanwhile, may include speakers, a microphone, a camera, and various user controls (e.g., buttons, a joystick, a keyboard, a keypad, etc.), a haptic output device, and so forth.

In various examples, the base station computing device 2000 can include one or more sensor(s) 2012. The one or more sensor(s) 2012 can include a camera, a laser scanner, a RADAR, a LIDAR, other proximity sensor, an accelerometer, a gyroscope, a compass, a light sensor, a volume sensor, or other sensor capable of capturing and/or analyzing environmental factors.

The location component 2014 may include a GPS device able to indicate location information, or the location component 2014 may comprise another other location-based sensor. Additionally, the base station computing device 2000 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A payment processor comprising:
    one or more processors; and
    one or more computer-readable media storing instructions that, when executed by the one or more processors, cause the one or more processors to perform operations comprising:
        receiving, by the payment processor and via an instance of an application executing on a point-of-sale (POS) terminal of a merchant, first input corresponding to a first customer order associated with a first transaction between the merchant and a first customer, the first customer order including at least a first set of items;
        receiving, by the payment processor and contemporaneous to the first input and from a mobile data capture device associated with the merchant, second input corresponding to a second customer order associated with a second transaction between the merchant and a second customer, the second customer order including at least a second set of items;
        determining, by the payment processor, a preparational sequence of the first customer order and the second customer order based at least in part on real-time information and customer information associated with at least the first customer or the second customer, the customer information indicating customer behavior; and
        causing, by the payment processor and based at least in part on determining the preparational sequence, a user interface of a kitchen display system (KDS) associated with the merchant, to present the first customer order and the second customer order as per the preparational sequence.

2. The payment processor of claim 1, the operations further comprising:
    generating, based at least in part on the second input, an open ticket;
    receiving, from the POS terminal, an updated second order indicating modification of the second customer order, wherein the modification includes addition of one or more third items or deletion of one or more of the second set of items from the second customer order; and
    modifying, by the payment processor, the open ticket based on the updated second order, wherein the open ticket includes:
        a data structure that stores cart information indicating items that are ordered by the second customer from the merchant during the second transaction through the POS terminal and the mobile data capture device; and
        versioning data indicating a version of the open ticket, and time stamp of when the items were added into the cart information; and
    scheduling, by the payment processor, the modified open ticket for preparation at the KDS or delivery at the POS terminal.

3. The payment processor of claim 1, the operations further comprising:
    generating, based at least in part on first information associated with a first order, a first order ticket for the first customer order, wherein the first input associated with the first order ticket includes the first order ticket; and
    generating, based at least in part on second information associated with a second order, a second order ticket for the second customer order, wherein the second input associated with the second order ticket includes the second order ticket, wherein the first order ticket and the second order ticket include at least:
        an identity associated with an order ticket;
        an indication of item ordered by a customer from the merchant; and
        a timer indicating a length of time since receiving an order.

4. The payment processor of claim 3, the operations further comprising determining, by machine learning models, that the second order ticket should be scheduled before the first order ticket.

5. The payment processor of claim 1, wherein the operations further comprise:
    determining, by the payment processor and based on a history of order tickets processed at the KDS, an average processing time taken to process an order similar to the second customer order, wherein the average processing time is based on a historical average of time taken by the KDS to prepare an item included in the second customer order; and
    determining, by the payment processor, depth of a queue based on a relative position of the second customer standing in the queue behind the first customer;

scheduling, based at least on a comparison between the average processing time and the depth of the queue, a time period to send the second customer order corresponding to the second customer to the KDS; and sending, by the payment processor, the second customer order to the KDS for preparation or delivery.

6. The payment processor of claim 1, the operations further comprising:
if items in the first customer order and the second customer order are substantially similar, aggregating the first customer order and the second customer order into a single order ticket; and
scheduling the single order ticket for preparation or delivery to the first and the second customer in a contemporaneous fashion.

7. The payment processor of claim 1 further configured to generate, by the payment processor and on a customer device, a receipt having thereon a status indicator which when read reflects status of the second customer order as the second customer order transitions from one station to another station in a kitchen, wherein the status indicator is one of a barcode, a quick response code, or a uniform resource locator; and
sending, to the POS terminal, status update of the second customer order.

8. The payment processor of claim 1, wherein the operations further comprise:
determining, by the payment processor, a wait time for the second customer, wherein the wait time indicates an average time taken for the second customer to move to a position of the first customer, where the second customer is behind the first customer in a queue;
scheduling, by the payment processor, the second customer order at a lapse of the wait time corresponding to the second customer; and
sending, by the payment processor, the second order to the KDS for preparation or delivery.

9. A method comprising:
receiving, by a payment processor and via an instance of an application executing on a point-of-sale (POS) terminal, of a merchant, first input corresponding to a first customer order associated with a first transaction between the merchant and a first customer, the first customer order including at least a first set of items;
receiving, by the payment processor and contemporaneous to the first input and from a mobile data capture device associated with the merchant, second input corresponding to a second customer order associated with a second transaction between the merchant and a second customer, the second customer order including at least a second set of items;
determining, by the payment processor, a preparational sequence of the first customer order and the second customer order based at least in part on real-time information and customer information associated with at least the first customer or the second customer, the customer information indicating customer behavior; and
causing, by the payment processor and based at least in part on determining the preparational sequence, a user interface of a kitchen display system (KDS) associated with the merchant, to present the first customer order and the second customer order as per the preparational sequence.

10. The method of claim 9, further comprising:
generating, based at least in part on the second input, an open ticket;

receiving, from the POS terminal, an updated second order indicating modification of the second customer order, wherein the modification includes addition of one or more third items or deletion of one or more of the second set of items from the second customer order; and modifying, by the payment processor, the open ticket based on the updated second order, wherein the open ticket includes:
a data structure that stores cart information indicating items that are ordered by the second customer from the merchant during the second transaction through the POS terminal and the mobile data capture device; and
versioning data indicating a version of the open ticket, and time stamp of when the items were added into the cart information; and
scheduling, by the payment processor, the modified open ticket for preparation at the KDS or delivery at the POS terminal.

11. The method of claim 9, further comprising:
generating, based at least in part on first information associated with a first order, a first order ticket for the first customer order, wherein the first input associated with the first order ticket includes the first order ticket; and
generating, based at least in part on second information associated with a second order, a second order ticket for the second customer order, wherein the second input associated with the second order ticket includes the second order ticket, wherein the first order ticket and the second order ticket include at least:
an identity associated with an order ticket;
an indication of item ordered by a customer from the merchant; and
a timer indicating a length of time since receiving an order.

12. The method of claim 11, further comprising:
determining, by machine learning models, that the second order ticket should be scheduled before the first order ticket.

13. The method of claim 9, further comprising:
determining, by the payment processor and based on a history of order tickets processed at the KDS, an average processing time taken to process an order similar to the second customer order, wherein the average processing time is based on a historical average of time taken by the KDS to prepare an item included in the second customer order; and
determining, by the payment processor, depth of a queue based on a relative position of the second customer standing in the queue behind the first customer;
scheduling, based at least on a comparison between the average processing time and the depth of the queue, a time period to send the second customer order corresponding to the second customer to the KDS; and
sending, by the payment processor, the second customer order to the KDS for preparation or delivery.

14. The method of claim 9, further comprising:
if items in the first customer order and the second customer order are substantially similar, aggregating the first customer order and the second customer order into a single order ticket; and
scheduling the single order ticket for preparation or delivery to the first and the second customer in a contemporaneous fashion.

15. The method of claim 9, further comprising:
generating, by the payment processor and on a customer device, a receipt having thereon a status indicator which when read reflects status of the second customer order as the second customer order transitions from one station to another station in a kitchen, wherein the status indicator is one of a barcode, a quick response code, or a uniform resource locator; and
sending, to the POS terminal, status update of the second customer order.

16. The method of claim 9, further comprising:
determining, by the payment processor, a wait time for the second customer, wherein the wait time indicates an average time taken for the second customer to move to a position of the first customer, where the second customer is behind the first customer in a queue;
scheduling, by the payment processor, the second customer order at a lapse of the wait time corresponding to the second customer; and
sending, by the payment processor, the second customer order to the KDS for preparation or delivery.

17. One or more non-transitory computer-readable media storing instructions that, when executed, cause one or more processors to perform acts comprising:
receiving, by a payment processor and via an instance of an application executing on a point-of-sale (POS) terminal, of a merchant, first input corresponding to a first customer order associated with a first transaction between the merchant and a first customer, the first customer order including at least a first set of items;
receiving, by the payment processor and contemporaneous to the first input and from a mobile data capture device associated with the merchant, second input corresponding to a second customer order associated with a second transaction between the merchant and a second customer, the second customer order including at least a second set of items;
determining, by the payment processor, a preparational sequence of the first customer order and the second customer order based at least in part on real-time information and customer information associated with at least the first customer or the second customer, the customer information indicating customer behavior; and
causing, by the payment processor and based at least in part on determining the preparational sequence, a user interface of a kitchen display system (KDS) associated with the merchant, to present the first customer order and the second customer order as per the preparational sequence.

18. The one or more non-transitory computer readable media of claim 17, the acts further comprising:
generating, based at least in part on first information associated with a first order, a first order ticket for the first customer order, wherein the first input associated with the first order ticket includes the first order ticket; and
generating, based at least in part on second information associated with a second order, a second order ticket for the second customer order, wherein the second input associated with the second order ticket includes the second order ticket, wherein the first order ticket and the second order ticket include at least:
an identity associated with an order ticket;
an indication of item ordered by a customer from the merchant; and
a timer indicating a length of time since receiving an order.

19. The one or more non-transitory computer readable media of claim 18, the acts further comprising:
determining, by machine learning models, that the second order ticket should be scheduled before the first order ticket.

20. The one or more non-transitory computer readable media of claim 17, the acts further comprising:
determining, by the payment processor and based on a history of order tickets processed at the KDS, an average processing time taken to process an order similar to the second customer order, wherein the average processing time is based on a historical average of time taken by the KDS to prepare an item included in the second customer order; and
determining, by the payment processor, depth of a queue based on a relative position of the second customer standing in the queue behind the first customer;
scheduling, based at least on a comparison between the average processing time and the depth of the queue, a time period to send the second customer order corresponding to the second customer to the KDS; and
sending, by the payment processor, the second customer order to the KDS for preparation or delivery.

\* \* \* \* \*